US012416189B1

(12) United States Patent
Schroder

(10) Patent No.: US 12,416,189 B1
(45) Date of Patent: Sep. 16, 2025

(54) FENESTRATION SYSTEM WITH HEAD SLIDE

(71) Applicant: Pella Corporation, Pella, IA (US)

(72) Inventor: Paul D. Schroder, Pella, IA (US)

(73) Assignee: Pella Corporation

( * ) Notice: Subject to any disclaimer, the term of this patent is extended or adjusted under 35 U.S.C. 154(b) by 0 days.

(21) Appl. No.: 18/603,338

(22) Filed: Mar. 13, 2024

(51) Int. Cl.
*E05D 15/48* (2006.01)
*E05D 15/58* (2006.01)
*E06B 3/50* (2006.01)

(52) U.S. Cl.
CPC ............. *E05D 15/48* (2013.01); *E05D 15/58* (2013.01); *E06B 3/5072* (2013.01); *E05D 2015/485* (2013.01)

(58) Field of Classification Search
CPC ..... E05D 15/48; E05D 15/58; E05D 15/0604; E05D 2015/485; E05D 2015/586; E06B 3/5072; E06B 3/50; E06B 3/36; E05C 3/165
See application file for complete search history.

(56) References Cited

U.S. PATENT DOCUMENTS

| | | | |
|---|---|---|---|
| 782,139 A | | 2/1905 | Jones |
| 1,328,043 A | | 1/1920 | Hill |
| 2,317,312 A | | 4/1943 | Swanson et al. |
| 2,680,268 A | | 6/1954 | Rutherford |
| 3,041,680 A | | 7/1962 | Gurniak |
| 3,226,777 A | | 1/1966 | Kollsman |
| 3,300,897 A | * | 1/1967 | Wikkerink ............ E06B 3/5072 49/141 |
| 3,303,612 A | | 2/1967 | Baker |
| 3,466,805 A | * | 9/1969 | Muessel .................... E06B 3/50 49/141 |
| 3,810,330 A | | 5/1974 | Daggy |
| 4,324,072 A | | 4/1982 | Sterner, Jr. |
| 4,384,429 A | | 5/1983 | Rokicki et al. |
| 4,438,594 A | | 3/1984 | Bunzl |
| 4,570,381 A | | 2/1986 | Sterner, Jr. |
| 4,603,452 A | | 8/1986 | Paciorek |
| 4,619,074 A | | 10/1986 | Leung et al. |
| 4,682,455 A | | 7/1987 | Klompenburg |
| 5,058,321 A | | 10/1991 | Harbom et al. |
| 5,131,449 A | | 7/1992 | Winn et al. |
| 5,153,034 A | | 10/1992 | Telchuk et al. |
| 5,394,648 A | | 3/1995 | Kordes |

(Continued)

FOREIGN PATENT DOCUMENTS

| | | | |
|---|---|---|---|
| CA | 2969055 | A1 | 6/2016 |
| DE | 2912256 | A1 | 10/1980 |

(Continued)

OTHER PUBLICATIONS

Hoppe. "Parallel-Retract and Slide," product brochure, available at least as early as Dec. 12, 2017, 2 pages.

(Continued)

*Primary Examiner* — Justin B Rephann
(74) *Attorney, Agent, or Firm* — FAEGRE DRINKER BIDDLE & REATH

(57) ABSTRACT

A sliding and pivoting fenestration unit, such as a sliding door, with screen. Embodiments of the fenestration unit include a locking and height-adjustable pivot rider, a head slide, a screen carrier, and a method of operation.

22 Claims, 38 Drawing Sheets

(56) References Cited

U.S. PATENT DOCUMENTS 5,448,858 A 9/1995 Briggs et al.
5,486,026 A 1/1996 Borgardt
5,548,926 A 8/1996 Jarmo
5,596,842 A 1/1997 Jarmo
5,749,172 A * 5/1998 Isopahkala .............. E05D 15/58 49/127
5,832,980 A 11/1998 Cianciolo
5,927,014 A 7/1999 Goldenberg
5,996,282 A 12/1999 Giovannetti
6,052,867 A 4/2000 Haab et al.
6,142,082 A 11/2000 Burke et al.
6,148,896 A 11/2000 Pinto et al.
6,167,936 B1 1/2001 Stover et al.
6,170,207 B1 1/2001 Saindon
6,176,041 B1 1/2001 Roberts
6,216,392 B1 4/2001 DiGinosa
6,233,888 B1 5/2001 Wu
6,238,374 B1 5/2001 Winkler
6,276,092 B1 8/2001 Neo
6,336,246 B1 1/2002 Giovannetti
6,374,456 B1 4/2002 Fort et al.
6,405,781 B2 6/2002 Davies et al.
6,446,696 B1 9/2002 Davies et al.
6,454,320 B1 9/2002 Weinerman et al.
6,470,947 B1 10/2002 Holevas
6,497,072 B2 12/2002 Fries
6,526,695 B1 3/2003 Nguyen
6,550,184 B1 4/2003 O'Donnell et al.
6,618,994 B1 9/2003 Nussbaum
6,618,998 B1 9/2003 Thomas et al.
6,826,867 B1 12/2004 Mcdonald et al.
6,840,009 B2 1/2005 Ronay et al.
6,860,064 B2 3/2005 Bakalar
6,860,078 B1 3/2005 Geisthardt
6,899,362 B1 5/2005 Weinerman et al.
7,003,916 B2 2/2006 Nestell et al.
7,124,538 B1 10/2006 Kline
7,155,861 B2 1/2007 Berry et al.
7,155,863 B2 1/2007 Daniel et al.
7,219,470 B2 5/2007 Lahnala
7,255,045 B2 8/2007 Owens
7,451,802 B2 11/2008 Cianciolo et al.
7,584,574 B2 9/2009 Kinross et al.
7,610,718 B2 11/2009 Kopish
7,647,728 B2 1/2010 Bortoluzzi
7,647,729 B2 1/2010 Polus
7,673,419 B2 3/2010 Arimoto
D616,566 S 5/2010 Desrosiers et al.
D616,567 S 5/2010 Desrosiers et al.
D616,568 S 5/2010 Desrosiers et al.
7,735,897 B2 6/2010 Seiple et al.
7,819,167 B2 10/2010 Morin
7,861,475 B2 1/2011 Sprague
7,934,342 B2 5/2011 Lahnala
7,963,070 B2 6/2011 Recker
7,980,027 B2 7/2011 Kraus et al.
8,065,779 B2 11/2011 Kuchas
8,112,954 B2 2/2012 Gosling et al.
8,113,607 B2 2/2012 Slager et al.
8,181,394 B2 5/2012 Michaels
8,235,085 B2 8/2012 Coleman et al.
8,261,500 B2 9/2012 Sprague
8,297,334 B2 10/2012 Chu
8,375,645 B2 2/2013 Iwauchi et al.
8,375,646 B2 2/2013 Newkirk et al.
8,381,443 B2 2/2013 Smith et al.
8,381,444 B1 2/2013 Mcdonald et al.
8,387,309 B2 3/2013 Tseng
8,438,783 B2 5/2013 Giovannetti
8,443,549 B2 * 5/2013 Salvietti .................. E05D 15/48 49/141
8,448,688 B2 5/2013 Goodman et al.
8,479,798 B2 7/2013 Goodman
8,496,038 B2 7/2013 Kondash et al.
8,627,604 B2 1/2014 Seymour et al.
8,665,582 B2 3/2014 Robinson et al.
8,677,688 B2 3/2014 Skibinski et al.
8,756,864 B2 6/2014 Hamaker et al.
8,756,865 B2 6/2014 Nicholson et al.
8,757,238 B2 6/2014 Goodman et al.
8,826,964 B2 9/2014 Goodman
8,905,500 B2 12/2014 Larson et al.
8,919,860 B2 12/2014 Thiele
8,950,114 B1 2/2015 Groening
8,955,195 B2 2/2015 Chang et al.
8,955,260 B2 2/2015 Newkirk et al.
8,960,257 B2 2/2015 Goodman
8,984,810 B2 3/2015 Bortoluzzi et al.
9,016,762 B2 4/2015 Ojima et al.
9,027,295 B2 5/2015 Kopish et al.
9,074,420 B2 7/2015 Goodman et al.
9,157,264 B2 10/2015 Bortoluzzi et al.
9,200,860 B1 12/2015 Groening
9,282,831 B2 3/2016 Scibetta et al.
D757,300 S 5/2016 Haberland et al.
9,416,576 B2 8/2016 Andersson et al.
9,447,579 B2 9/2016 Kopish et al.
9,470,028 B2 10/2016 Header et al.
9,637,961 B2 5/2017 Header
9,637,970 B1 5/2017 Rendon et al.
9,663,980 B2 5/2017 Bakalar
9,970,232 B2 5/2018 Koenitz
10,077,588 B1 9/2018 Header
10,407,960 B2 9/2019 Wolfe
10,415,289 B2 9/2019 Hailey et al.
10,472,872 B2 11/2019 Ingram et al.
10,526,831 B2 1/2020 Haworth
10,641,031 B2 5/2020 Koenitz
10,822,863 B2 11/2020 Bernhagen et al.
11,098,514 B2 8/2021 Vander et al.
11,286,709 B2 3/2022 Bernhagen et al.
2001/0037613 A1 11/2001 Owens
2003/0070363 A1 4/2003 Bakalar
2003/0150165 A1 8/2003 Ronay et al.
2005/0044798 A1 3/2005 Daniel et al.
2006/0150512 A1 * 7/2006 Heithe .................... E05B 65/10 49/141
2006/0225357 A1 10/2006 Bortoluzzi
2007/0062122 A1 3/2007 Polus
2007/0261799 A1 11/2007 Chu
2008/0078216 A1 4/2008 Fleming
2008/0100093 A1 5/2008 Seiple et al.
2008/0302016 A1 12/2008 Halfon et al.
2008/0302021 A1 12/2008 Gosling et al.
2009/0126279 A1 5/2009 Kopish
2010/0199563 A1 8/2010 Bortoluzzi
2010/0205865 A1 8/2010 Iwauchi et al.
2010/0212233 A1 8/2010 Robinson et al.
2010/0281931 A1 11/2010 Slager et al.
2010/0299871 A1 12/2010 Kondash et al.
2011/0093095 A1 4/2011 Goodman et al.
2011/0126463 A1 6/2011 Skibinski et al.
2011/0185638 A1 8/2011 Giovannetti
2011/0186249 A1 8/2011 Coleman et al.
2012/0005960 A1 1/2012 Tseng
2012/0043865 A1 2/2012 Newkirk et al.
2012/0073205 A1 * 3/2012 Hamaker ................ E05D 15/48 49/163
2012/0255230 A1 * 10/2012 Smith ................... E06B 3/5063 49/257
2013/0082582 A1 4/2013 Newkirk et al.
2014/0013685 A1 1/2014 Coleman et al.
2014/0182212 A1 7/2014 Bortoluzzi et al.
2015/0376939 A1 12/2015 Bakalar
2018/0291662 A1 10/2018 Hilliaho
2019/0323275 A1 10/2019 Stell
2019/0338581 A1 11/2019 Bernhagen et al.
2020/0002986 A1 1/2020 Smith
2020/0011109 A1 * 1/2020 Patel ....................... E06B 3/509
2020/0217124 A1 7/2020 Bernhagen et al.
2021/0131165 A1 5/2021 Bernhagen et al.
2021/0222473 A1 7/2021 Procton et al.

(56) References Cited

U.S. PATENT DOCUMENTS

| | | | |
|---|---|---|---|
| 2021/0254394 | A1 | 8/2021 | Bernhagen et al. |
| 2024/0093546 | A1 | 3/2024 | Bernhagen et al. |

FOREIGN PATENT DOCUMENTS

| | | | |
|---|---|---|---|
| DE | 29614902 | U1 | 1/1998 |
| DE | 102010037604 | A1 | 9/2011 |
| EP | 0605353 | A1 | 7/1994 |
| EP | 3075938 | A1 | 10/2016 |
| EP | 3315700 | A1 | 5/2018 |
| FR | 3018306 | A1 | 9/2015 |
| FR | 3095224 | A1 | 10/2020 |
| GB | 2558375 | A | 7/2018 |
| WO | 2007/068789 | A1 | 6/2007 |

OTHER PUBLICATIONS

Omnitrack. “9820 Omnitrack High Capacity Ball transfer Unit,” Revision 1, Jun. 22, 2012, 1 page. Retrieved from <URL:https://resources.omnitrack.com/files/pdf/9820_2D.pdf>.

* cited by examiner

FENESTRATION SYSTEM WITH HEAD SLIDE

CROSS REFERENCE TO RELATED APPLICATIONS

Reference is hereby made to the following applications filed on even date herewith:

1. application Ser. No. 18/603,320 entitled Pivoting Fenestration System with Pivot Wheel Assembly.
2. application Ser. No. 18/603,330 entitled Locking and Height-Adjustable Pivot Rider.
3. application Ser. No. 18/603,345 entitled Fenestration System with Screen Carrier.

TECHNICAL FIELD

Various aspects of this disclosure relate to fenestration products, such as sliding doors and windows. In some specific examples, the disclosure relates to sliding doors and windows with one or more hinged or pivoting panels, and which may also include a screen.

BACKGROUND

Sliding doors and windows also capable of hinged or pivotal motion to open positions outside of their frames are generally known, and disclosed, for example, in U.S. Patent Application Publication 2020/0217124 entitled Sliding and Pivot Fenestration Unit, which is incorporated herein by reference in its entirety and for all purposes.

There remains a continuing need for improved sliding and pivot fenestration units and components for such units.

SUMMARY

Various examples of this disclosure relate to fenestration units and systems, such as for example doors and windows, with first and/or second panels mounted with respect to a frame. Some aspects relate to slide and/or pivot capabilities and features of the units and panels. Aspects also relate to components to provide the slide and/or pivot features and/or capabilities of the panels. Yet other aspects relate to methods for sliding and/or pivoting operation of the panels.

A first example is a fenestration unit with a locking pivot wheel assembly, The fenestration unit may comprise a frame, a first panel supported by the frame, and a locking pivot rider assembly. In embodiments, the frame defines a frame plane and includes a sill, a head opposite the sill, a first jamb and a second jamb opposite the first jamb. The locking pivot rider assembly couples the first panel to the frame and facilitates slide mode operation and pivot mode operation of the first panel. During the slide mode operation, the first panel is in a slide position generally parallel to the frame plane and can slide within the frame between the first and second jambs. During the pivot mode operation the first panel can pivot outwardly to a pivot open position beyond the frame plane. The locking pivot rider assembly may include a rider coupling the first panel to the frame for the slide mode operation; a pivot rotatably coupling the first panel to the rider for the pivot mode operation; and a lock coupled to the rider and the pivot, to releasably lock the rider with respect to the frame. Rotation of the pivot during the pivot mode operation of the first panel from the slide position to the pivot open position actuates the lock and causes the lock to inhibit sliding movement of the rider on the frame. Rotation of the pivot during the pivot mode operation of the first panel from the pivot open position to the slide position releases the lock and allows sliding movement of the rider on the frame.

In some embodiments, the lock is configured to engage the rider to the frame when actuated, and to disengage the rider from the frame when released.

In any or all of these embodiments of this first example, the lock may include one or more lock pins, each lock pin movable within the rider between a retracted position disengaged from the frame, and an extended position engaged to the frame; and an actuator coupling the pivot to each of the one or more lock pins, wherein the actuator causes each of the lock pins to move from the retracted position to the extended position when the first panel rotates from the slide position to the pivot open position In any or all of these embodiments of this first example, the lock may further include one or more biasing members for biasing each of the one or more lock pins from the extended position to the retracted position.

In any or all of these embodiments of the first example, the actuator may include a cam coupling the pivot to each of the one or more lock pins, wherein the cam rotates with the pivot.

In any or all of these embodiments of the first example, the rider may include a first end which for example is shown in the illustrated embodiments as a conical surface including a central apex region; a second end opposite the first end; one or more bores extending between and through the conical or other surface of the first end and the second end, and wherein each of the one or more bores receives one of the one or more lock pins; and wherein the cam rotates on the first end of the rider. Other embodiments of the rider have a first end with other (e.g., not conical) surfaces (not shown)

Any or all of these embodiments of the first example may further include a releasable lock to inhibit sliding motion of the first panel during an initial portion of the rotation of the first panel from the pivot ready position to the pivot open position before at least one of the one or more lock pins is moved to the extended position, and to inhibit sliding motion of the first panel during a final portion of the rotation of the first panel from the pivot open position to the pivot ready position after all of the one or more lock pins is moved from the retracted position. In embodiments, the releasable lock may include a panel member mounted to the first panel; and a sill member mounted to the sill, wherein the panel member and the sill member engage to facilitate rotation of the first panel, and to inhibit sliding motion of the first panel, during the initial portion and the final portion of the rotation of the first panel.

Any or all of these embodiments of the first example may further include a height adjuster to adjust a height of the first panel with respect to the rider. The height adjuster may include a height-adjustable mount coupling the pivot to the rider; and an adjustment mechanism for actuating the height-adjustable mount. In some embodiments, the height-adjustable mount includes a threaded shaft coupling the pivot to the rider; and the adjustment mechanism includes a rotating mechanism to rotate the threaded shaft. In some embodiments, the adjustment mechanism is accessible and operable from an exterior of the first panel.

In any or all of these embodiments of the first example, the adjustment mechanism may include a beveled gear set.

In any or all of these embodiments of the first example, the pivot may include a bearing plate mounted to the first panel, and wherein the threaded shaft is rotatably coupled to the bearing plate.

In any or all of these embodiments of the first example, the rider may include a housing; and a wheel rotatably mounted to the housing and positioned on the frame.

In any or all of these embodiments of the first example, the locking pivot rider assembly may couple a bottom portion of the first panel to the sill of the frame.

In any or all of these embodiments of the first example, when in the slide mode the first panel may be configured to slide between a slide closed position, a slide fully open position, and a pivot ready position, and wherein the pivot ready position is beyond the slide fully open position from the slide closed position.

A second example is a fenestration unit including a second panel in accordance with any or all of the above embodiments of the first example. The fenestration unit of the second example may further comprise a second panel supported by the frame; a hinge coupling the second panel to the frame and to facilitate hinge mode operation of the second panel, wherein during the hinge mode operation the second panel can pivot between a closed position generally parallel to the frame plane and an open position beyond the frame plane; wherein when the first panel is in the slide closed position and the second panel is in the closed position, the first panel and the second panel are parallel with one another, and wherein when the first panel is in the slide fully open position and the second panel is in the closed position, the first and second panels are parallel with one another and the first panel is at a lateral position that at least partially overlaps the second panel; and one or more stop members configured to prevent the first panel from sliding beyond its slide fully open position toward the pivot ready position during the slide mode operation when the second panel is in its closed position.

In any or all embodiments of the second example, each of the stop members may comprise a bumper coupled to the second panel. In embodiments, the stop members may be flexible members.

In any or all embodiments of the second example, the lock and/or frame may be configured to cause the lock to be disengaged with respect to the frame when the first panel is between its slide closed and slide fully open positions, and to allow the lock to engage with respect to the frame when the first panel is in the pivot ready position. The fenestration unit may further comprise a rider on the first panel at a location spaced apart from the locking pivot rider assembly; a track on the frame, wherein the rider is configured to engage the track during the slide mode operation of the first panel between its slide closed and slide fully open positions; and a gap in the track, wherein the gap is located at a position corresponding to the position of the rider when the first panel is at the pivot ready position, thereby allowing the rider to disengage from the track during the pivot mode operation of the first panel.

A third example is a locking pivot rider assembly. The rider assembly of the third example may support a panel on a frame, and may comprise a rider, a pivot, and a lock. The rider is configured to slide on the frame. The pivot is configured to rotatably couple the rider to the panel. The pivot is configured to rotate between a first position and a second position with rotation of the panel between a pivot closed position and a pivot open position with respect to the frame. The lock is coupled to the rider and the pivot to releasably lock the rider with respect to the frame. Rotation of the pivot from the first position to the second position in response to rotation of the panel from the pivot closed position toward the pivot open position actuates the lock to inhibit the rider from sliding on the frame. Rotation of the pivot from the second position to the first position in response to rotation of the panel from the pivot open position to the pivot closed position causes the lock to release and allow the rider to slide on the frame.

In some embodiments of the third example, the lock may be configured to engage the rider to the frame when actuated, and to disengage the rider from the frame when released.

In any or all embodiments of the third example, the lock may include one or more lock pins, each lock pin movable within the rider between a retracted position disengaged from the frame, and an extended position engaged to the frame; and an actuator coupling the pivot to each of the one or more lock pins, wherein the actuator causes each of the lock pins to move from the retracted position to the extended position when the first panel rotates from the slide position to the pivot open position. In embodiments, the lock may further include one or more biasing members for biasing each of the one or more lock pins from the extended position to the retracted position. In embodiments, the actuator may include a cam coupling the pivot to each of the one or more lock pins, wherein the cam rotates with the pivot. In embodiments, the rider may include a first end having a conical surface including a central apex region; a second end opposite the first end; one or more bores extending between and through the conical surface of the first end and the second end, and wherein each of the one or more bores receives one of the one or more lock pins; and wherein the cam rotates on the first end of the rider.

Any or all embodiments of the third example may further include a height adjuster to adjust a height of the pivot with respect to the rider. In embodiments, the height adjuster may include a height-adjustable mount coupling the pivot the rider; and an adjustment mechanism for actuating the height-adjustable mount. In some embodiments, the height-adjustable mount includes a threaded shaft coupling the pivot to the rider; and the adjustment mechanism includes a rotating mechanism to rotate the threaded shaft.

In any or all embodiments of the third example, the adjustment mechanism may be accessible and operable from an exterior of the panel.

In any or all embodiments of the third example, the adjustment mechanism includes a beveled gear set.

In any or all embodiments of the third example, the pivot may include a bearing plate mounted to the panel, and wherein the threaded shaft is rotatably coupled to the bearing plate.

In any or all embodiments of the third example, the rider may include a housing; and a wheel rotatably mounted to the housing.

A fourth example is a height-adjustable rider assembly. The rider assembly of the fourth example may support a panel on a frame, and may comprise a rider, a bearing plate, a height-adjustable mount, and an adjustment mechanism. The rider may be configured to slide on the frame. The bearing plate may be configured to be coupled to the panel. The height-adjustable mount may couple the rider to the bearing plate. The adjustment mechanism actuates the height-adjustable mount, to raise and lower the bearing plate with respect to the rider.

In some embodiments of the fourth example, the height-adjustable mount may include a threaded shaft coupling the bearing plate to the rider; and the adjustment mechanism may include a rotating mechanism to rotate the threaded shaft.

In any or all embodiments of the fourth example, the adjustment mechanism may be accessible and operable from an exterior of the panel.

In any or all embodiments of the fourth example, the adjustment mechanism may include a beveled gear set configured to rotate the threaded shaft.

In any or all embodiments of the fourth example, the panel may include an opening providing access the adjustment mechanism.

In any or all embodiments of the fourth example, the rider may include a housing; and a wheel rotatably mounted to the housing.

A fifth example is a fenestration system with a head slide. Embodiments of the fifth example may include a frame, a first panel, a slide assembly, and a latch actuator. The frame may include a sill, a head opposite the sill, a first jamb and a second jamb opposite the first jamb. The first panel may be supported by the frame. The slide assembly couples the first panel to the frame to facilitate slide mode operation and pivot mode operation of the first panel. During the slide mode operation the first panel can slide within the frame between the first and second jambs when the first panel is in a slide position generally parallel to the frame plane. During the pivot mode operation the first panel can pivot outwardly beyond the frame plane. Embodiments of the slide assembly include a slide body configured for sliding motion between the first and second jambs during the slide mode operation; a pivot rotatably coupling a second end portion of the first panel to a second end portion of the slide body; and a latch releasably coupling a first end portion of the first panel to a first end portion of the slide body, and operable between a latched position and an unlatched position. When the latch is in the latched position the latch couples the first panel to the slide body to facilitate the slide mode operation of the first panel. When the latch is in the unlatched position the latch releases the first panel from the slide body to facilitate the pivot mode operation of the first panel. The latch actuator may be coupled to the latch and operable by a user to cause the latch to move between the latched position and the unlatched position.

In any or all embodiments of the fifth example, the latch actuator may be located on the first panel.

In any or all embodiments of the fifth example, the slide assembly may be configured to slide the first panel between a slide closed position, a slide open position, and a pivot ready position beyond the slide open position from the slide closed position during the slide mode operation. The latch may further include a stop that inhibits actuation of the latch to the unlatched position unless the first panel is at the pivot ready position. In embodiments, the frame includes a slide assembly guide track, and the slide body of the slide assembly is slidably mounted in the slide assembly guide track. The slide assembly guide track may include a structure configured to cooperate with the stop of the latch when the first panel is at the pivot ready position to enable the actuation of the latch to the unlatched position. In embodiments, the guide track includes a structure configured to cooperate with the stop of the latch when the first panel is at and between its slide closed position and its slide open position, to inhibit the actuation of the latch to the unlatched position.

In any or all embodiments of the fifth example, the frame may include a slide assembly guide track, and the slide body of the slide assembly may be slidably mounted in the slide assembly guide track. In embodiments, the slide assembly guide track is on the head of the frame, and the slide assembly couples a top portion of the first panel to the head of the frame.

In any or all embodiments of the fifth example, the first panel is defined by first and second opposite ends; and the slide body may extend an entire distance between the first and second opposite ends of the first panel.

In any or all embodiments of the fifth example, the latch may comprise a catch movably mounted to the first panel; and a pin that is actuated by the latch actuator to releasably engage the catch. In embodiments, movement of the pin causes the latch to move between the latched position and the unlatched position. In embodiments, the catch comprises a base member; and an engagement member extending from the base member, wherein the engagement member includes a slot that can be engaged and disengaged by the pin. In embodiments, the base member is pivotally mounted to the first panel for rotational movement about a pivot axis extending in a direction between a top portion and a bottom portion of the first panel; and the engagement member extends in a generally perpendicular direction from the base member. In embodiments, the base member is pivotally mounted to one of a top portion or a bottom portion of the first panel; and the engagement member extends in a direction generally parallel to an end edge of the first panel.

Embodiments may further include a stop on the base member that inhibits actuation of the latch to the unlatched position unless the first panel is at the pivot ready position. In embodiments, the frame may include a slide assembly guide track, and wherein the slide body of the slide assembly is slidably mounted in the slide assembly guide track; and the slide assembly guide track includes a structure configured to cooperate with the stop on the base member when the first panel is at the pivot ready position to enable the actuation of the latch to the unlatched position. In embodiments, the guide track may include a structure configured to cooperate with the stop on the base member when the first panel is at and between its slide closed position and its slide open position, to inhibit the actuation of the latch to the unlatched position. In embodiments, the slot of the engagement member slopes to inhibit the actuation of the latch to the unlatched position when the first panel is at and between its slide closed and slide open positions.

A sixth example is a fenestration system with a screen carrier. Embodiments of the fenestration system of the sixth example may comprise a frame defining a frame plane and including a sill, a head opposite the sill, a first jamb and a second jamb opposite the first jamb; a second panel supported by the frame; a first panel supported by the frame; a screen supported by the frame; and screen carrier coupling the screen to the frame. The second panel may be configured for pivot mode operation, wherein during the pivot mode operation the second panel can pivot between a pivot closed position generally parallel to the frame plane and a pivot open position beyond the frame plane. The second panel extends over a second lateral portion of the frame when in its pivot closed position. The first panel may be configured for slide mode operation and pivot mode operation with respect to the frame. During the slide mode operation the first panel is in a slide position generally parallel to the frame plane and can slide within the frame between slide closed and slide open positions. During the pivot mode operation the first panel can pivot outwardly beyond the frame plane. When the first panel is in the slide closed position the first panel extends over a first lateral portion of the frame. The screen carrier may be configured to facilitate slide mode operation and pivot mode operation of the screen. During the slide mode operation the screen can slide within the frame between a slide closed position corresponding to the slide closed position of the first panel, a slide open position at least partially overlapping the second panel when the second panel is in its pivot closed position, and a pivot ready position engaged with the second panel when the second panel is in its pivot closed position. During its pivot mode operation the screen is in its pivot ready position and can move outwardly beyond the frame plane with the second panel during the pivot mode operation of the second panel.

In embodiments of the fenestration system of the sixth example, the screen carrier may include a first section mounted to the frame; and a second section mounted to the second panel, wherein the screen transitions between the first and second sections during its slide mode operation. In embodiments, the first section of the screen carrier extends over at least a portion of the first lateral portion of the frame, and supports and guides portions of the screen extending over the first lateral portion of the frame during the slide mode operation of the screen. The second section of the screen carrier extends over at least a portion of the second panel, and supports and guides portions of the screen extending over the second panel during the slide mode operation of the screen. In embodiments, the first section of the screen carrier extends of at least a portion of the second lateral portion of the frame, and supports and guides portions of the screen extending over the second lateral portion of the frame during the slide mode operation of the screen; and the screen carrier further includes a disengagement structure that causes the screen to disengage from the first section of the screen carrier when the screen is at its pivot ready position.

In embodiments, the first section of the screen carrier is mounted to the sill of the frame and supports and guides a bottom portion of the screen during the slide mode operation of the screen; the second section of the screen carrier is mounted to a top portion of the second panel and supports and guides a top portion of the screen during the slide mode operation of the screen; and the disengagement structure includes one or more ramps that cause the screen to disengage from the first section of the screen carrier when the screen is at its pivot ready position. In embodiments, one or more of the one or more ramps is located on the second section of the screen carrier. In embodiments, the screen includes one or more riders coupling the screen to the second section of the screen carrier; and each of the one or more ramps is configured to engage an associated one of the one or more riders.

In any or all embodiments of the fenestration system of the sixth example, the screen carrier may further include a third section mounted to the head of the frame, to support and guide at least portions of the screen extending over the first lateral portion of the frame during the slide mode operation. The second section and the third section of the screen carrier may be positioned with respect to one another to facilitate the top portion of the screen transitioning between the second section and the third section of the screen carrier during the slide mode operation of the screen.

A seventh example is a fenestration system with a pivot wheel assembly and a head slide. Embodiments of the fenestration system in accordance with the seventh example include a frame defining a frame plane and including a sill, a head opposite the sill, a first jamb and a second jamb opposite the first jamb; a first panel supported by the frame; a locking pivot rider assembly coupling one of a top or bottom portion the first panel to the frame and to facilitate slide mode operation and pivot mode operation of the first panel; a slide assembly; and a latch. During the slide mode operation the first panel is in a slide position generally parallel to the frame plane and can slide within the frame between the first and second jambs. During the pivot mode operation the first panel can pivot outwardly to a pivot open position beyond the frame plane. The locking pivot rider assembly may include a rider coupling the first panel to the frame for the slide mode operation; a pivot rotatably coupling the first panel to the rider for the pivot mode operation; and a lock coupled to the rider and the pivot, to releasably lock the rider with respect to the frame. Rotation of the pivot during the pivot mode operation of the first panel from the slide position to the pivot open position actuates the lock and causes the lock to inhibit sliding movement of the rider on the frame. Rotation of the pivot during the pivot mode operation of the first panel from the pivot open position to the slide position releases the lock to allow sliding movement of the rider on the frame. The slide assembly couples the other of the top or bottom of the first panel to the frame and to facilitate the slide mode operation and the pivot mode operation of the first panel. The slide assembly may include a slide body configured for sliding motion between the first and second jambs during the slide mode operation; a pivot rotatably coupling a second end portion of the first panel to a second end portion of the slide body; and a latch releasably coupling a first end portion of the first panel to a first end portion of the slide body, and operable between a latched position and an unlatched position. When the latch is in the latched position the latch couples the first panel to the slide body to facilitate the slide mode operation of the first panel. When the latch is in the unlatched position the latch releases the first panel from the slide body to facilitate the pivot mode operation of the first panel. The latch actuator is coupled to the latch and operable by a user to cause the latch to move between the latched position and the unlatched position.

Other embodiments of the fenestration system of the seventh example may include any or all features of the first though sixth examples.

An eighth example is a fenestration system with a pivot wheel assembly and a screen carrier. Embodiments of the fenestration system in accordance with the eighth example include a frame defining a frame plane and including a sill, a head opposite the sill, a first jamb and a second jamb opposite the first jamb; a second panel supported by the frame and configured for pivot mode operation; a first panel supported by the frame and configured for slide mode operation and pivot mode operation with respect to the frame; a locking pivot rider assembly coupling the first panel to the frame and to facilitate the slide mode operation and the pivot mode operation of the first panel; a screen supported by the frame; and a screen carrier coupling the screen to the frame. During the pivot mode operation the second panel can pivot between a pivot closed position generally parallel to the frame plane and a pivot open position beyond the frame plane, wherein the second panel extends over a second lateral portion of the frame when in its pivot closed position. During the slide mode operation the first panel is in a slide position generally parallel to the frame plane and can slide within the frame between slide closed and slide open positions, and during the pivot mode operation the first panel can pivot outwardly beyond the frame plane, and wherein when the first panel is in the slide closed position the first panel extends over a first lateral portion of the frame. The locking pivot rider assembly couples the first panel to the frame to facilitate the slide mode operation and the pivot mode operation of the first panel. The locking pivot rider assembly may include a rider coupling the first panel to the frame for the slide mode operation; a pivot rotatably coupling the first panel to the rider for the pivot mode operation; and a lock coupled to the rider and the pivot, to releasably lock the rider with respect to the frame. Rotation of the pivot during the pivot mode operation of the first panel from the slide position to the pivot open position actuates the lock and causes the lock to engage the frame. Rotation of the pivot during the pivot mode operation of the first panel from the pivot open position to the slide position releases the lock and allows sliding movement of the rider on the frame. The screen carrier couples the screen to the frame and facilitates slide mode operation and pivot mode operation of the screen. During the slide mode operation the screen can slide within the frame between a slide closed position corresponding to the slide closed position of the first panel, a slide open position at least partially overlapping the second panel when the second panel is in its pivot closed position, and a pivot ready position engaged with the second panel when the second panel is in its pivot closed position. During its pivot mode operation the screen is in its pivot ready position and can move outwardly beyond the frame plane with the second panel during the pivot mode operation of the second panel.

Other embodiments of the fenestration system of the eighth example may include any or all features of the first though sixth examples.

A ninth example is a fenestration system with a head slide and screen carrier. Embodiments of the fenestration system of the ninth example include a frame defining a frame plane and including a sill, a head opposite the sill, a first jamb and a second jamb opposite the first jamb; a second panel supported by the frame and configured for pivot mode operation, wherein during the pivot mode operation the second panel can pivot between a pivot closed position generally parallel to the frame plane and a pivot open position beyond the frame plane, wherein the second panel extends over a second lateral portion of the frame when in its pivot closed position; a first panel supported by the frame and configured for slide mode operation and pivot mode operation with respect to the frame, wherein during the slide mode operation the first panel is in a slide position generally parallel to the frame plane and can slide within the frame between slide closed and slide open positions, and during the pivot mode operation the first panel can pivot outwardly beyond the frame plane, and wherein when the first panel is in the slide closed position the first panel extends over a first lateral portion of the frame; a slide assembly coupling the first panel to the frame and to facilitate the slide mode operation and the pivot mode operation of the first panel; a latch actuator; a screen supported by the frame; and a screen carrier coupling the screen to the frame. The slide assembly may include a slide body configured for sliding motion between the first and second jambs during the slide mode operation; a pivot rotatably coupling a second end portion of the first panel to a second end portion of the slide body; and a latch releasably coupling a first end portion of the first panel to a first end portion of the slide body, and operable between a latched position and an unlatched position. When the latch is in the latched position the latch couples the first panel to the slide body to facilitate the slide mode operation of the first panel. When the latch is in the unlatched position the latch releases the first panel from the slide body to facilitate the pivot mode operation of the first panel. The screen carrier facilitates slide mode operation and pivot mode operation of the screen. During the slide mode operation the screen can slide within the frame between a slide closed position corresponding to the slide closed position of the first panel, a slide open position at least partially overlapping the second panel when the second panel is in its pivot closed position, and a pivot ready position engaged with the second panel when the second panel is in its pivot closed position. During its pivot mode operation the screen is in its pivot ready position and can move outwardly beyond the frame plane with the second panel during the pivot mode operation of the second panel. The latch actuator may be coupled to the latch and operable by a user to cause the latch to move between the latched position and the unlatched position.

Other embodiments of the fenestration system of the ninth example may include any or all features of the first though sixth examples.

A tenth example is a method for operating a fenestration system including a frame and first and second panels mounted with respect to the frame. Embodiments of the method of the tenth example may comprise sliding the first panel between slide closed and slide fully open positions with respect to the second panel when the second panel is at a closed position; pivoting the second panel from its closed position to a pivot open position when the first panel is at or between its slide fully open and slide closed positions; sliding the first panel to a pivot ready position beyond the slide fully open position and opposite the slide fully open position from the slide closed position after the second panel is pivoted to its pivot open position; pivoting the first panel from its pivot ready position to a pivot open position while simultaneously locking the first panel with respect to the frame to inhibit sliding motion of the first panel; pivoting the first panel from its pivot open position to its pivot ready position while simultaneously unlocking the first panel with respect to the frame to allow sliding motion of the first panel; sliding the first panel from its pivot ready position to a position at or between its slide fully open and slide closed positions; and pivoting the second panel from its pivot open position to its closed position when the first panel is at the position at or between its slide fully open and slide closed positions.

Embodiments of the method of the tenth example further comprise attempting, unsuccessfully because of restraint on sliding motion, to slide the first panel beyond its slide fully open position to its pivot ready position when the second panel is at its closed position.

In any and all embodiments of the tenth example, sliding the first panel to its pivot ready position may include sliding the first panel to its pivot ready position while the first panel is latched for sliding motion with respect to the frame; and the method may further include unlatching the first panel with respect to the frame to facilitate the pivoting of the first panel from its pivot open position when the first panel is at its pivot ready position. Embodiments may further comprise attempting, unsuccessfully because of restraint on pivoting motion, to pivot the first panel with respect to the frame when the first panel is not at its pivot ready position.

In any and all embodiments of the tenth example, pivoting and sliding the first panel, and pivoting the second panel, comprise applying force to the first and second panels to cause the pivoting and sliding of the first panel and the pivoting of the second panel.

Any and all embodiments of the tenth example may further comprise sliding a screen between a slide closed position and a slide open position with respect to the frame; sliding the screen from its slide open position to a pivot ready position opposite the slide open position from the slide closed position when the second panel is at its closed position, and engaging the screen with the second panel; pivoting the second panel from its closed position to its pivot open position includes pivoting the screen engaged with the second panel; pivoting the second panel from its pivot open position to its closed position includes pivoting the screen engaged with the second panel; and the method further comprises sliding the screen from its pivot ready position to its closed position when the second panel is at its closed position. In embodiments, sliding the screen between its slide closed and slide open positions includes sliding the screen on a guide track; sliding the screen from its slide open position to its pivot ready position comprises disengaging the screen from the guide track; and sliding the screen from its pivot ready position to its closed position comprises engaging the screen with the guide track.

DETAILED DESCRIPTION

Figure 1A:
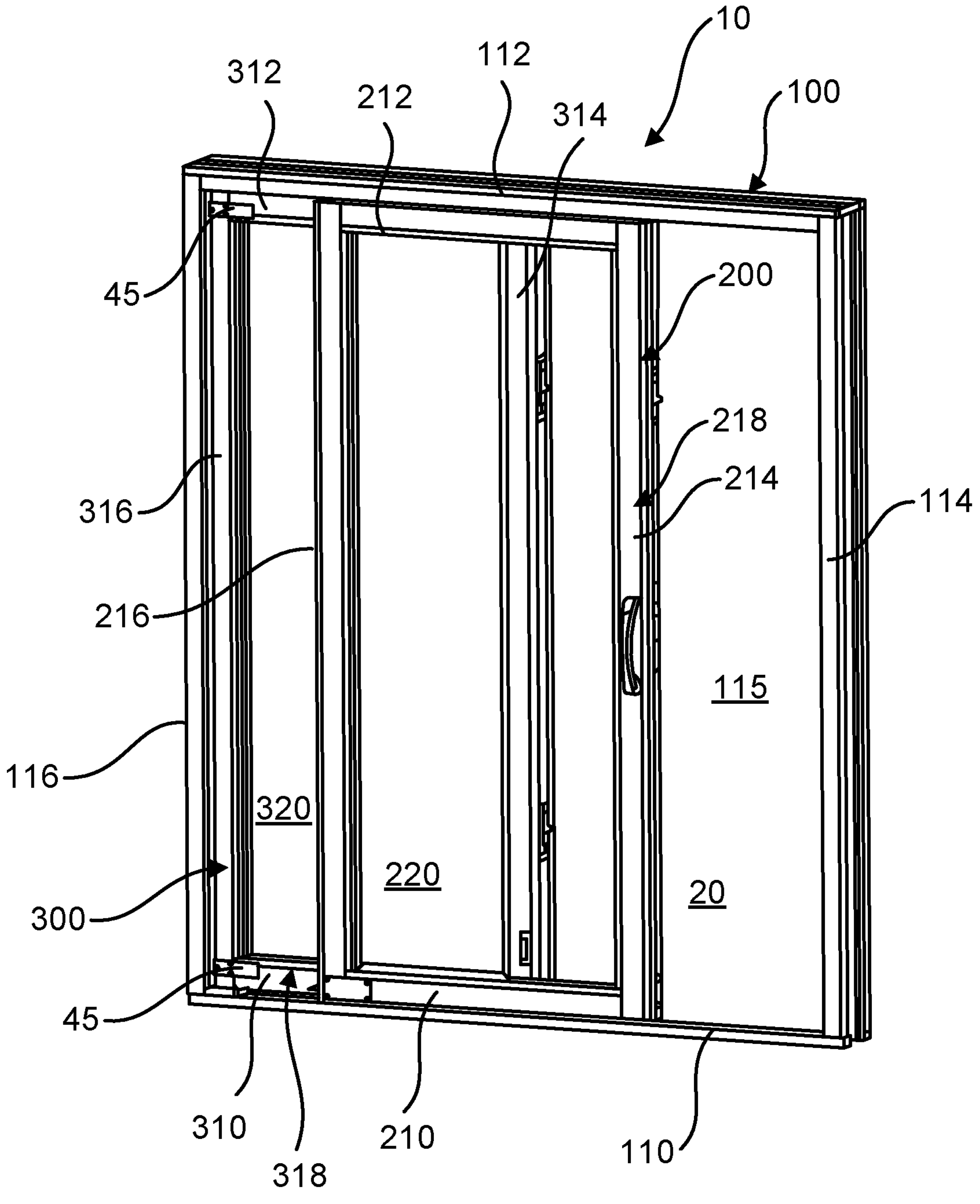
FIG. 1A is a perspective illustration of a first side of a fenestration unit in accordance with embodiments, showing a first panel, a second panel, a screen, and a frame.
Figure 1B:
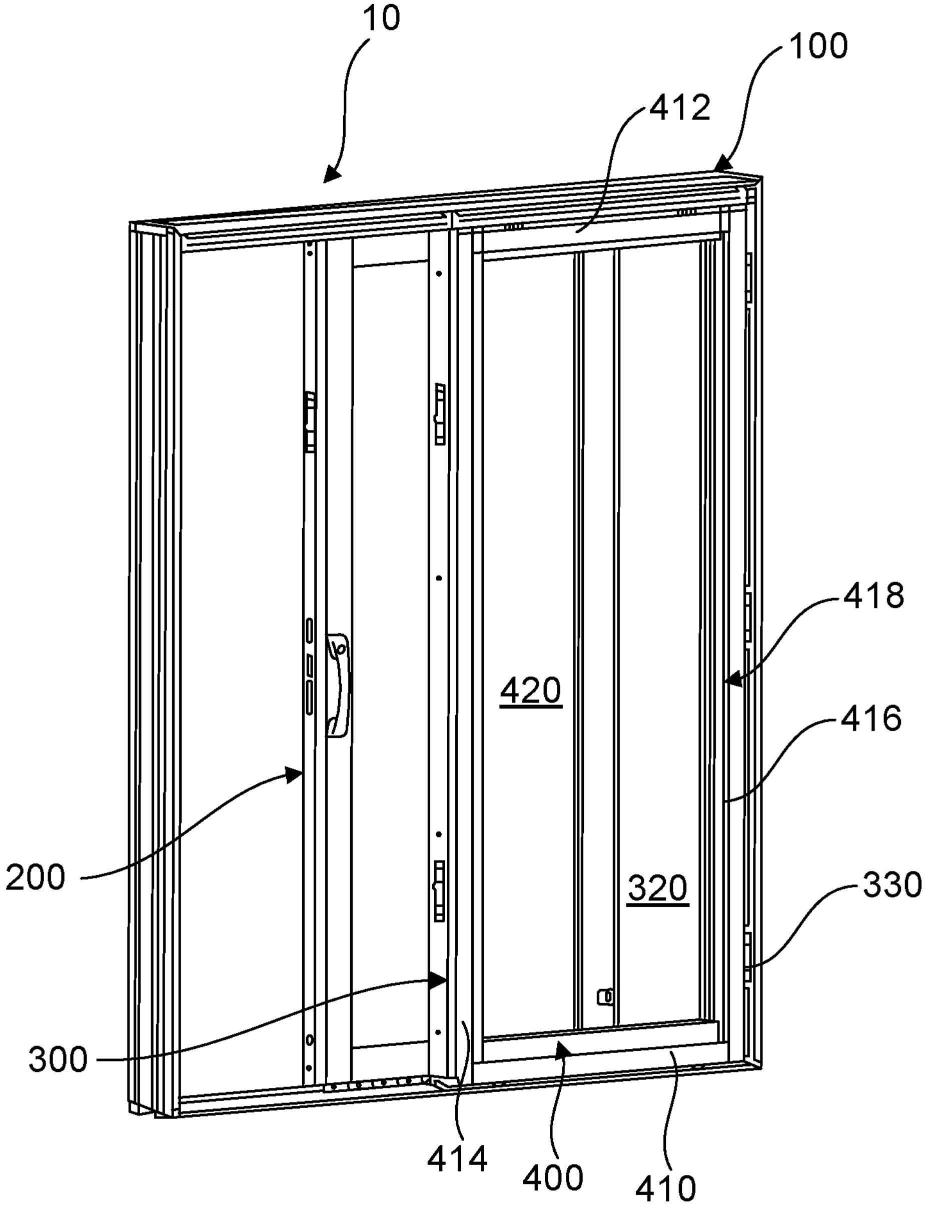
FIG. 1B is a perspective illustration of a second side of the fenestration unit shown in FIG. 1A, in accordance with embodiments.
Figure 1C:
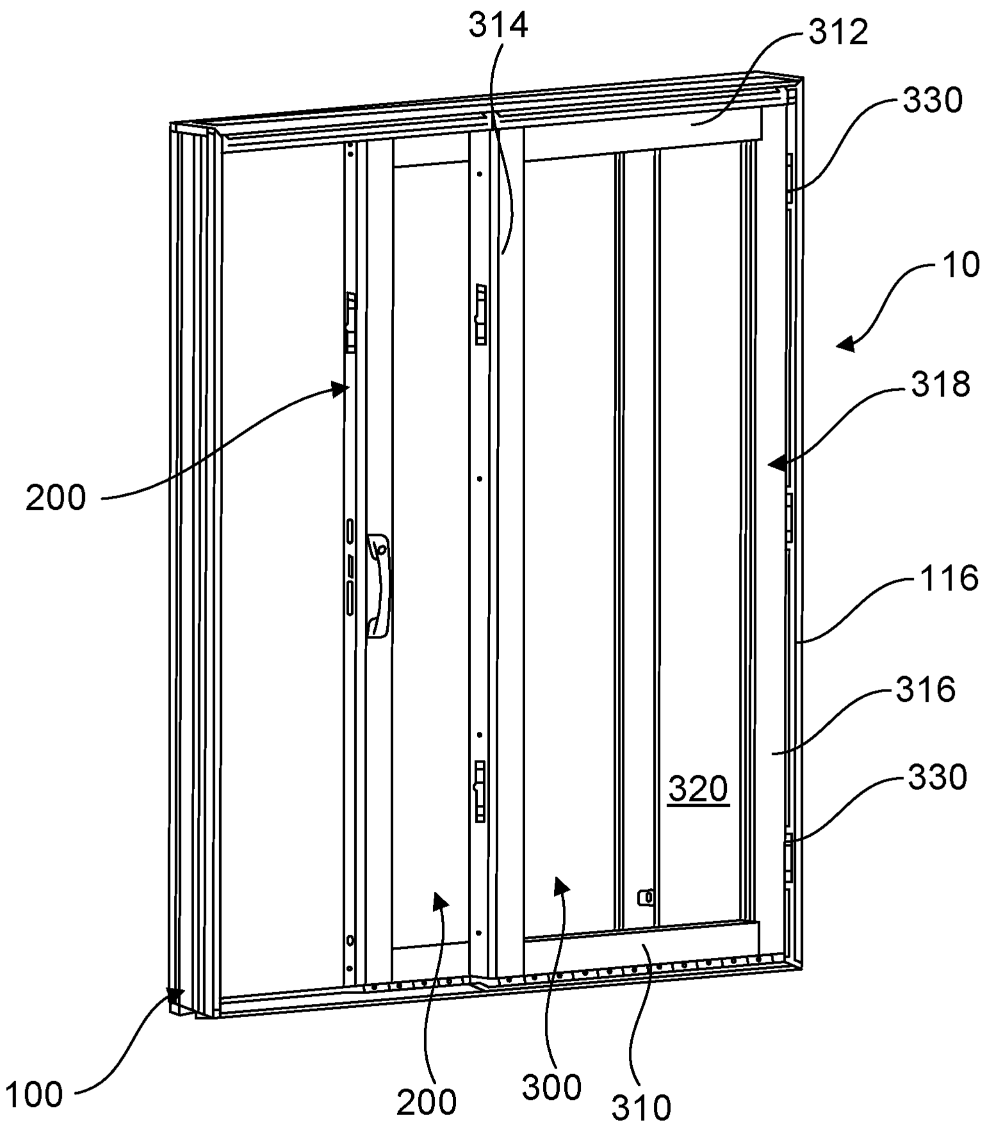
FIG. 1C is a perspective illustration of the second side of the fenestration unit shown in FIG. 1B, without the screen, in accordance with embodiments.

Fenestration units according to the inventive examples, including doors and windows having one or more sliding panels and/or one or more pivoting or hinged panels, optionally including a screen, are adapted to provide for versatility in how they may be opened. An exemplary fenestration unit 10 in the form of a door is illustrated in FIGS. 1A-1C. As shown, the fenestration unit 10 includes a frame 100 and a plurality of panels such as first panel 200, a second panel 300, and a third panel such as screen 400. The fenestration unit 10 is configured to define a boundary between a first space, for example an interior, and a second space, for example an exterior, of a building or other structure, while providing access through an opening 20 in the fenestration unit between the first and second spaces. FIG. 1A illustrates a first side of the fenestration unit 10, for example a side configured to face the interior space, and FIGS. 1B and 1C illustrate a second side of the fenestration unit 10, for example a side configured to face the exterior space. The screen 400 is not shown in FIG. 1C, to better illustrate other components of the fenestration unit 10, including the second panel 300.

As described in greater detail below, in the illustrated embodiments the second panel 300 is a pivoting or hinged panel that is configured to pivot or hinge with respect to the frame 100 between a closed position that is within and generally parallel to the frame, and a range of open positions at which the hinged panel extends beyond or outside of the frame (e.g., to operate in a pivot or hinge mode). The second panel 300 is shown in its closed position in FIGS. 1A-1C. When in its closed position, the second panel 300 extends over, and in in the illustrated embodiments covers, a second lateral portion of the frame 100.

In the illustrated embodiments, the first panel 200 is a sliding panel that is configured to operate with respect to the frame 100 in both a sliding mode and a pivot mode. When in the sliding mode, the first panel 200 is in a slide orientation or position within and generally parallel to the frame 100, and can slide between a slide closed position, a range of slide open positions including a slide fully open position, and a pivot ready position that is opposite or beyond the slide fully open position from the slide closed position. When the second panel 300 is in its open position and the first panel 200 is in its pivot ready position, the first panel can be operated in the pivot mode to pivot between the pivot ready position and a range of pivot open positions at which the second panel extends beyond or outside of the frame 100. The first panel 200 is shown in an open position in FIGS. 1A-1C, at which it is parallel to and partially overlaps the second panel 300. When in its closed position (e.g., shown in FIGS. 6A and 6B), the first panel 200 extends over, and in the illustrated embodiments covers, a first lateral portion of the frame 100 that is at least partially different than the second lateral portion of the frame that the second panel 300 extends over. Although not shown, in embodiments the fenestration unit 10 includes structures, such as for example clips, that cause the first panel 200 and the second panel 300 to interlock when the first and second panels are in their fully closed positions. These structures can, for example, effectively prevent the second panel 300 from moving toward its open position from its closed position when the first panel 200 is at its fully closed position.

In embodiments, the screen 400 is a sliding screen that is configured to operate with respect to the frame 100 and the second panel 300 in both a sliding mode and a pivot mode. When in the sliding mode, the screen 400 is in a slide orientation or position within and generally parallel to the frame 100, and can slide between a slide closed position, a range of slide open positions, and a hinge- or pivot ready position. When the screen 400 is in its slide closed position, it may extend across the first lateral portion of the frame 100 corresponding to the location of the first panel 200 when the first panel is in its slide closed position (e.g., shown in FIGS. 5A and 5B). The first panel 200 may also be opened when the screen 400 is in its slide closed position, with the screen thereby providing a screened opening through the frame 100. When the screen 400 is in any of its slide open positions (with the first panel 200 in any of its slide closed or slide open positions), the screen at least partially overlaps the second panel 300 when the second panel is in its closed position (e.g., extends over at least a portion of the second lateral portion). When the screen 400 is in its pivot ready position, it is engaged with or coupled to the second panel 300, and disengaged from the frame 100, thereby allowing the screen to move with the second panel (e.g., to swing outwardly) when the second panel pivots or hinges between its open and closed positions.

The illustrated embodiments of the frame 100 include a sill 110, a head 112, a first jamb 114 and a second jamb 116 that generally define a frame opening 115. The sill 110 is a structural frame element that generally defines a bottom portion of the frame 100 and fenestration unit 10. The head 112 is a structural frame element that generally defines a top portion of the frame 100 and the fenestration unit 10. The sill 110 and head 112 each generally extend laterally between the first and second jambs 114 and 116. The first and second jambs 114 and 116 are structural frame elements that extend vertically between the sill 110 and head 112, and generally define first and second end portions of the frame. In embodiments, the head 112 may be supported by each of the first and second jambs 114 and 116.

The illustrated embodiments of the first panel 200 include a bottom rail 210, a top rail 212, a first stile 214 and a second stile 216. The bottom rail 210, top rail 212, first stile 214 and second stile 216 collectively define a frame 218 of the first panel 200. In embodiments, an insert 220, such as a glass panel insert, is mounted within the frame 218. It will be appreciated that inserts 220 other than glass inserts, such as for example wood, plastic and/or metal, may be mounted to the frame 218. It will also be appreciated that the insert 220 need not be a structure that is impervious to atmospheric substances such as air, and may for example be a screen that permits air flow therethrough. Yet other embodiments of the first panel 200 (not shown) do not include a separate frame such as 218 (e.g., are frameless). The bottom rail 210, top rail 212, first stile 214 and second stile 216 generally define a bottom portion, a top portion, a first end portion and a second end portion, respectively, of the first panel 200.

The illustrated embodiments of the second panel 300 include a bottom rail 310, a top rail 312, a first stile 314 and a second stile 316. The bottom rail 310, top rail 312, first stile 314 and second stile 316 collectively define a frame 318 of the second panel 300. In embodiments, an insert 320, such as a glass panel insert, is mounted within the frame 318. It will be appreciated that inserts 320 other than glass inserts, such as for example wood, plastic and/or metal, may be mounted to the frame 318. It will also be appreciated that the insert 320 need not be a structure that is impervious to atmospheric substances such as air, and may for example be a screen that permits air flow therethrough. Yet other embodiments of the second panel 300 (not shown) do not include a separate frame such as 318 (e.g., are frameless). The bottom rail 310, top rail 312, first stile 314 and second stile 316 generally define a bottom portion, a top portion, a first end portion and a second end portion, respectively, of the second panel 300.

The second panel 300 is mounted to the frame 100 by pivoting structures such as hinges 330 to enable the pivoting or hinging opening and closing of the second panel. The illustrated embodiment includes three hinges 330 coupling the second stile 316 of the second panel 300 to the second jamb 116 of the frame 100. Other embodiments (not shown)

include other structures for mounting the second panel 300 for hinging or pivoting operation with respect to the frame 100.

Embodiments of the screen 400 may include a bottom rail 410, a top rail 412, a first stile 414 and a second stile 416. In embodiments, the bottom rail 410, top rail 412, first stile 414 and second stile 416 collectively define a frame 418 of the screen 400. In embodiments, an insert 420, such as a screen panel insert, is mounted within the frame 418. Although described as a screen 400 in the illustrated embodiments, it will be appreciated the third panel may take other forms, such as for example those of the first panel 200 and the second panel 300 described above. The bottom rail 410, top rail 412, first stile 414 and second stile 416 generally define a bottom portion, a top portion, a first end portion and a second end portion, respectively, of the screen 400.

FIGS. 1A-1C show the first panel 200 configured for slide mode operation and in a slide open position, the second panel 300 in its closed position, and the screen 400 (FIG. 1B) in its pivot ready position engaged with the second panel 300 and disengaged from the frame 100. With the first panel 200, second panel 300 and screen 400 in these positions, an opening 20 is defined in the frame 100 (between the first stile 214 of the first panel 200 and the first jamb 114 of the frame), permitting passage through the fenestration unit 10.

Figure 2A:
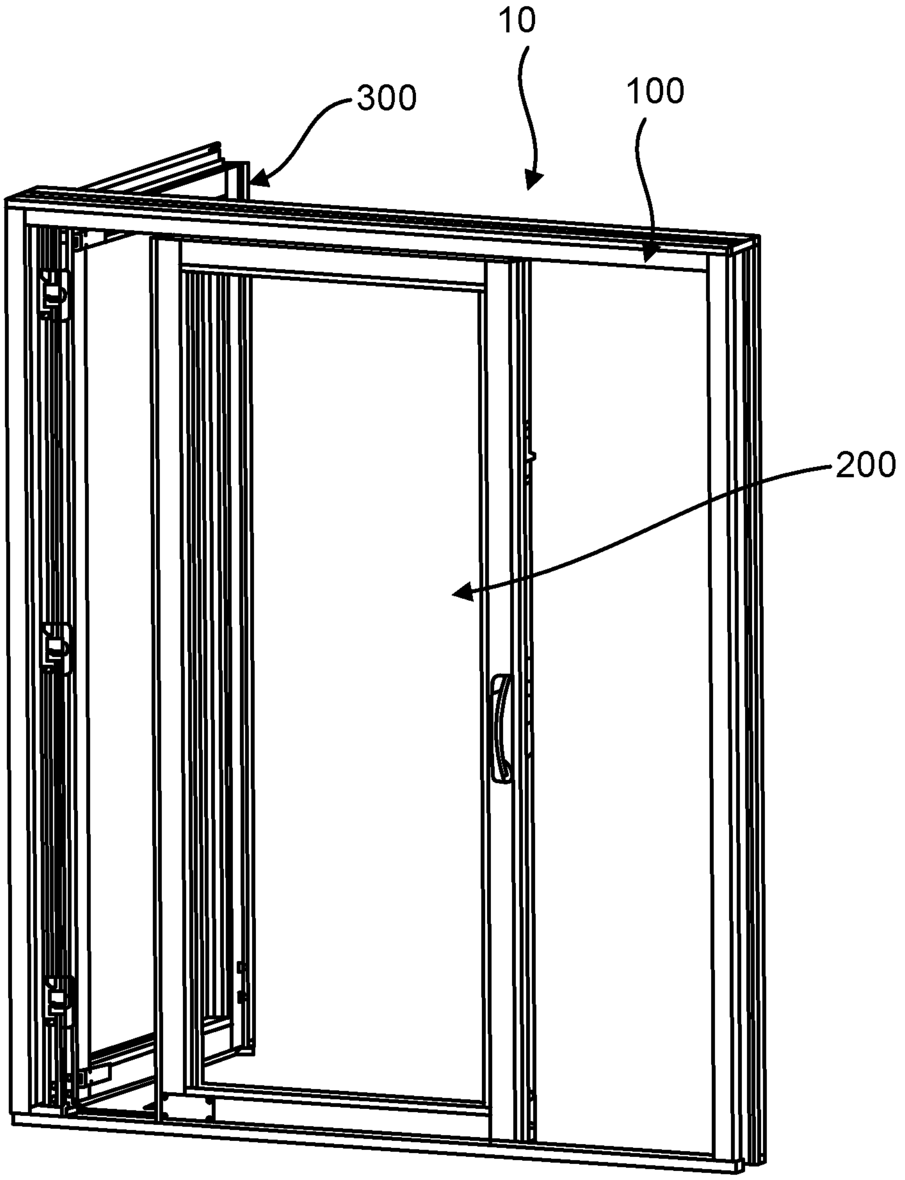
FIGS. 2A-2B are perspective illustrations of the first and second sides, respectively, of the fenestration unit shown in FIGS. 1A and 1B, but with the first panel, the second panel, and the screen, in various positions with respect to the frame.
Figure 2B:
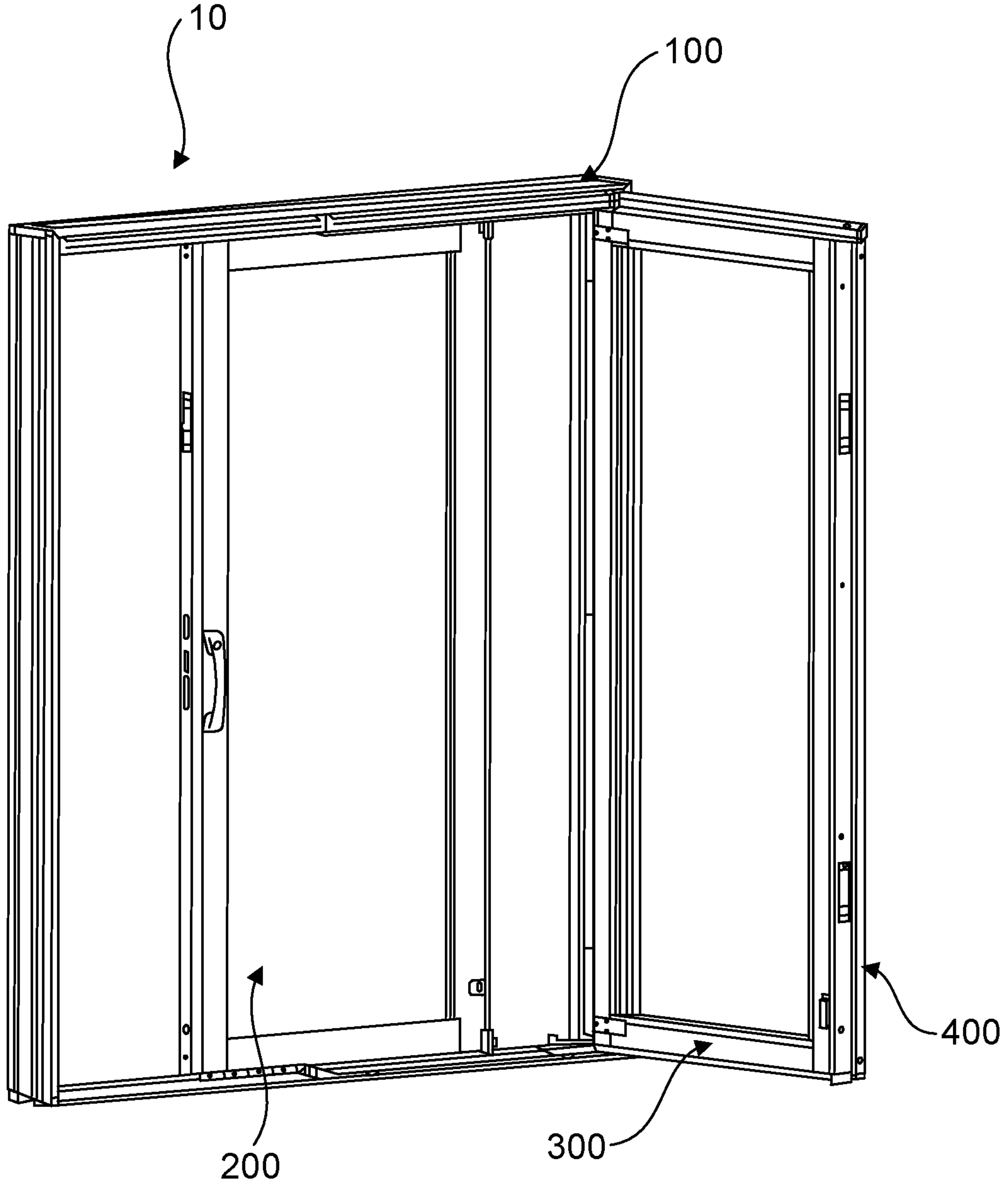

FIG. 2A illustrates the first side of the fenestration unit 10 with the second panel 300, and the screen 400 coupled to the second panel, hinged or pivoted outwardly to their open positions outside of the frame 100. In FIG. 2A the first panel 200 is at the same open position shown in FIGS. 1A-1C. FIG. 2B illustrates the second side of the fenestration unit 10 with the first panel 200, second panel 300 and screen 400 at the positions shown and described above in connection with FIG. 2A.

Figure 3A:
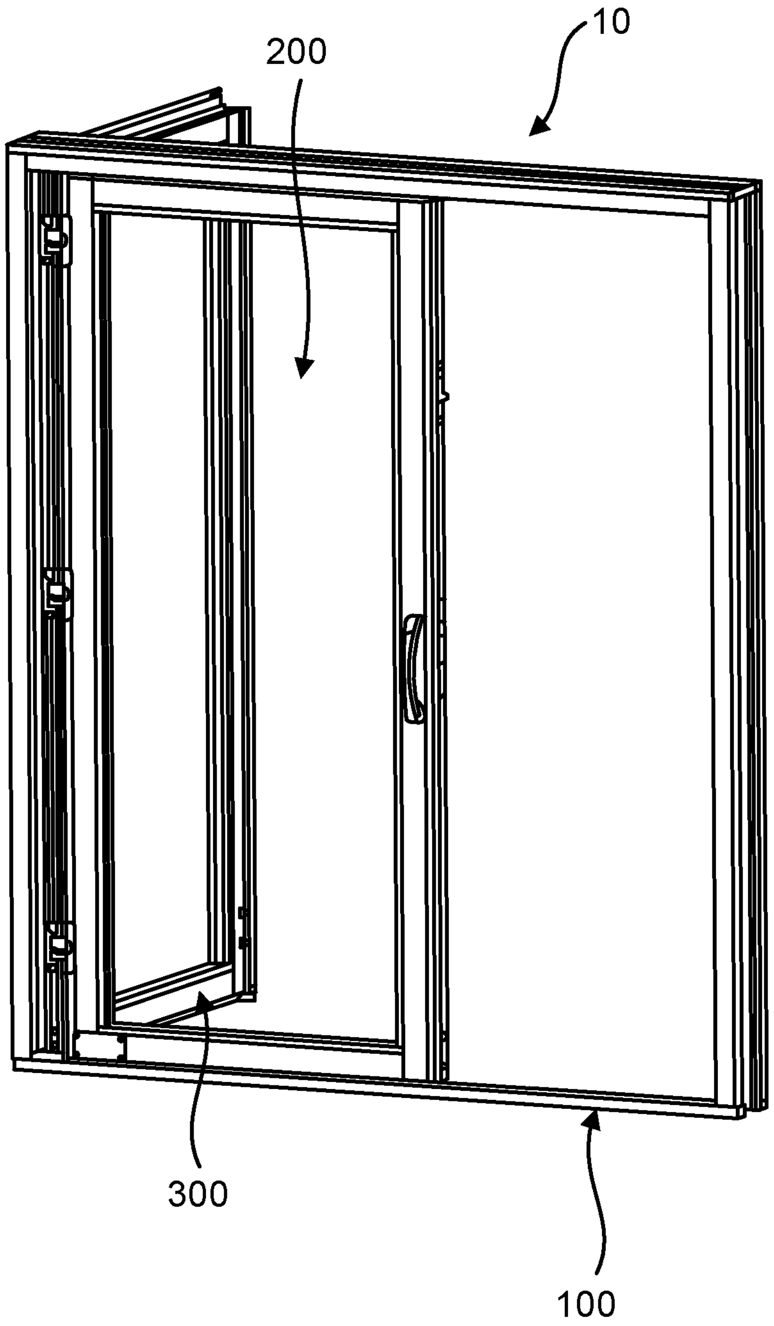
FIGS. 3A-3B are perspective illustrations of the first and second sides, respectively, of the fenestration unit shown in FIGS. 1A and 1B, but with the first panel, the second panel, and the screen, in various positions with respect to the frame.
Figure 3B:
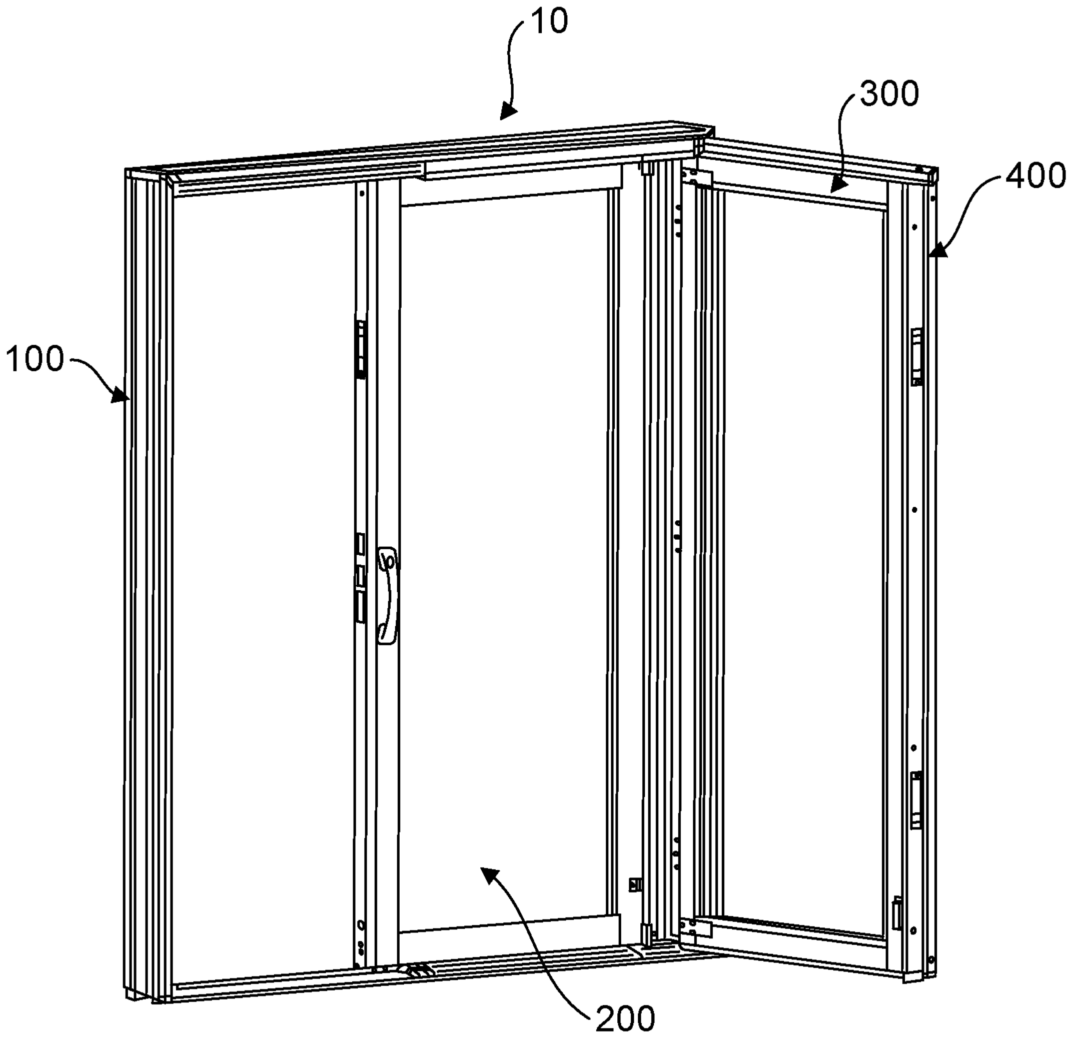

FIG. 3A illustrates the first side of the fenestration unit 10 with the second panel 300 and screen 400 at their hinged or pivot open positions shown and described above in connection with FIGS. 2A and 2B, and the first panel 200 in its slide mode and at its pivot ready position. FIG. 3B illustrates the second side of the fenestration unit 10 with the first panel 200, second panel 300 and screen 400 at the positions shown and described above in connection with FIG. 3A.

Figure 4A:
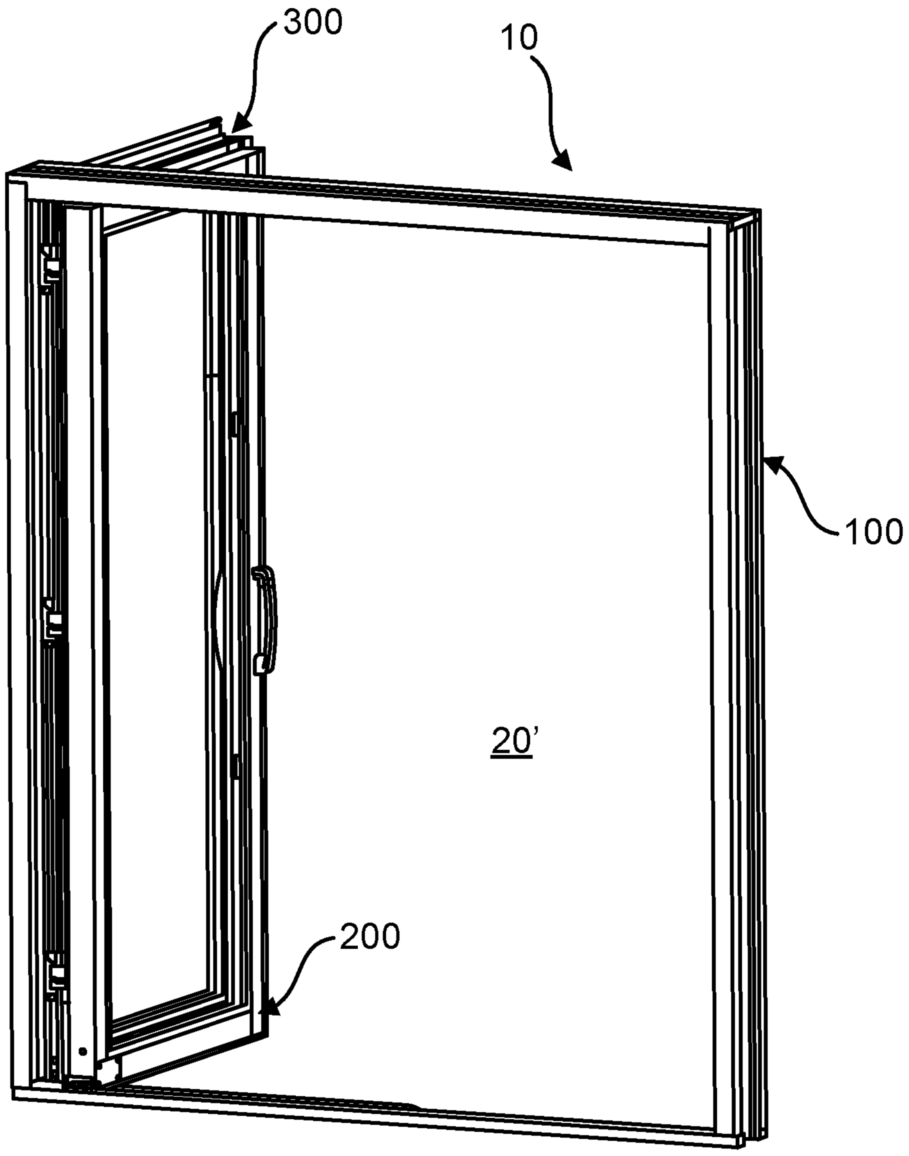
FIGS. 4A-4B are perspective illustrations of the first and second sides, respectively, of the fenestration unit shown in FIGS. 1A and 1B, but with the first panel, the second panel, and the screen, in various positions with respect to the frame.
Figure 4B:
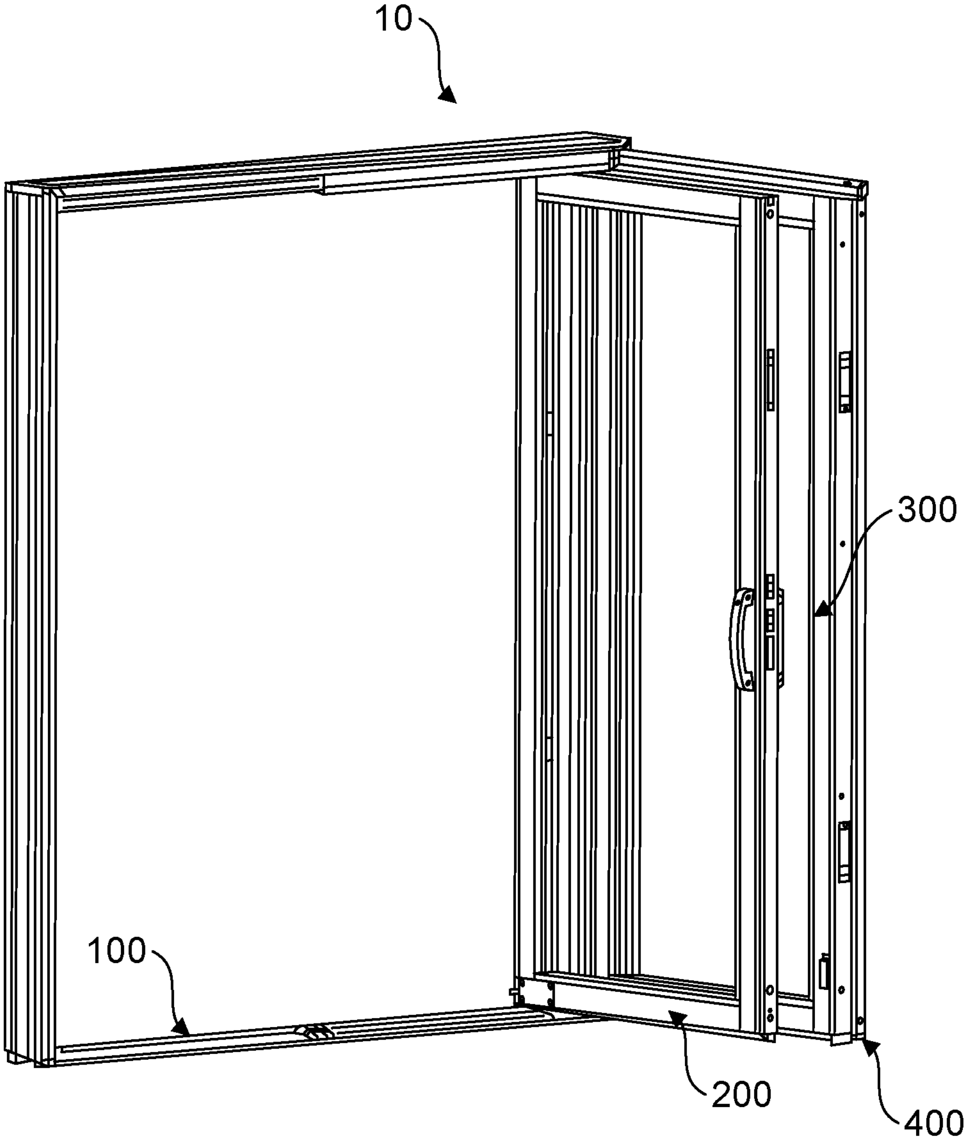

FIG. 4A illustrates the first side of the fenestration unit 10 with the second panel 300 and screen 400 at their hinged or pivot open positions shown and described above in FIGS. 2A and 2B, and the first panel 200 at a pivot open position following operation in the pivot mode. FIG. 4B illustrates the second side of the fenestration unit 10 with the first panel 200, second panel 300 and screen 400 at the positions shown and described above in connection with FIG. 4A. With the first panel 200, second panel 300 and screen 400 in these positions, an opening 20' is defined in the frame 100 (between the first panel and the jamb 114 of the frame). The opening 20' is larger than the opening 20 (e.g., as shown in FIG. 1A) because both the first panel 200 and second panel 300 (with the screen 400 attached thereto) are swung open outside of the frame 100.

Figure 5A:
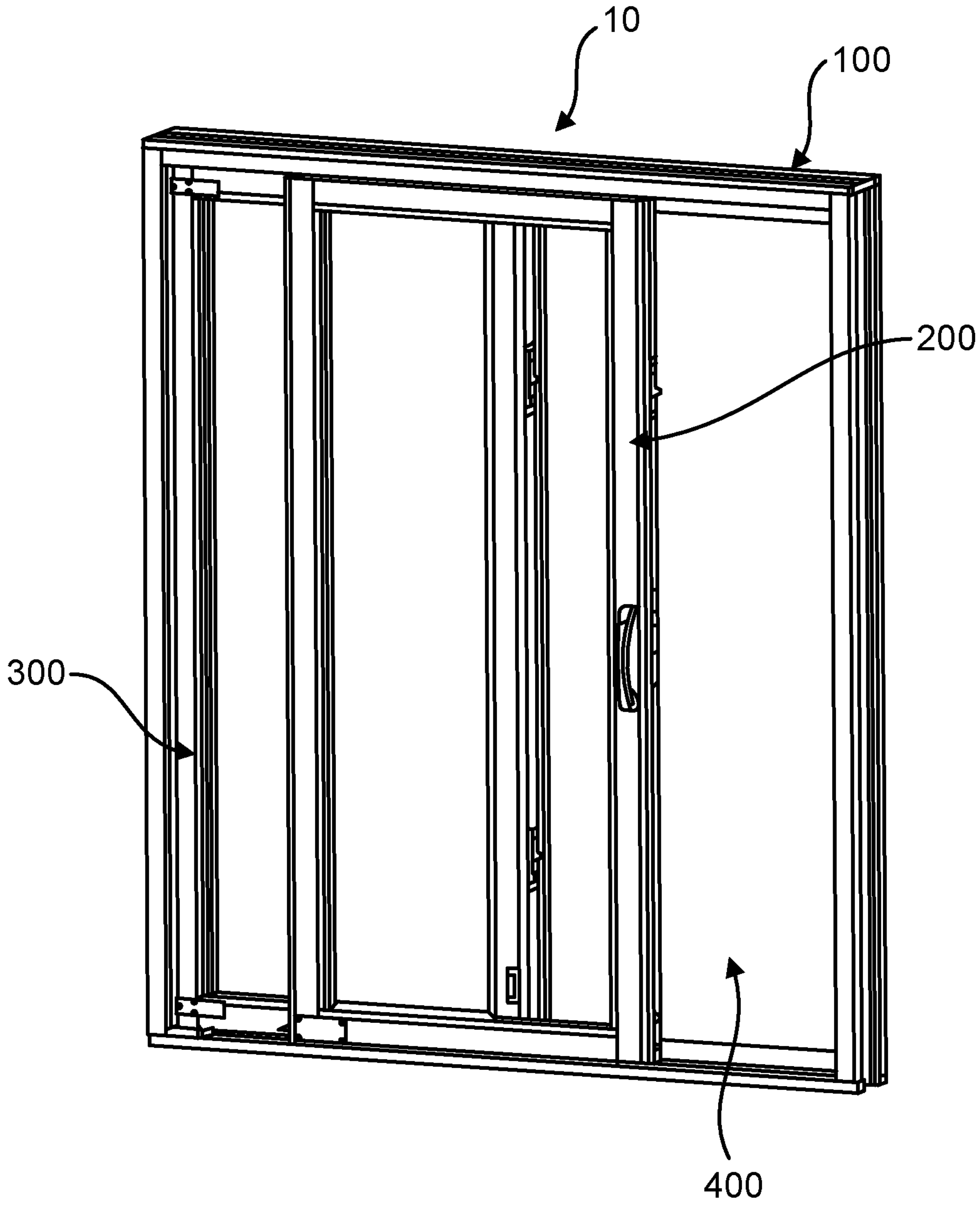
FIGS. 5A-5B are perspective illustrations of the first and second sides, respectively, of the fenestration unit shown in FIGS. 1A and 1B, but with the first panel, the second panel, and the screen, in various positions with respect to the frame.
Figure 5B:
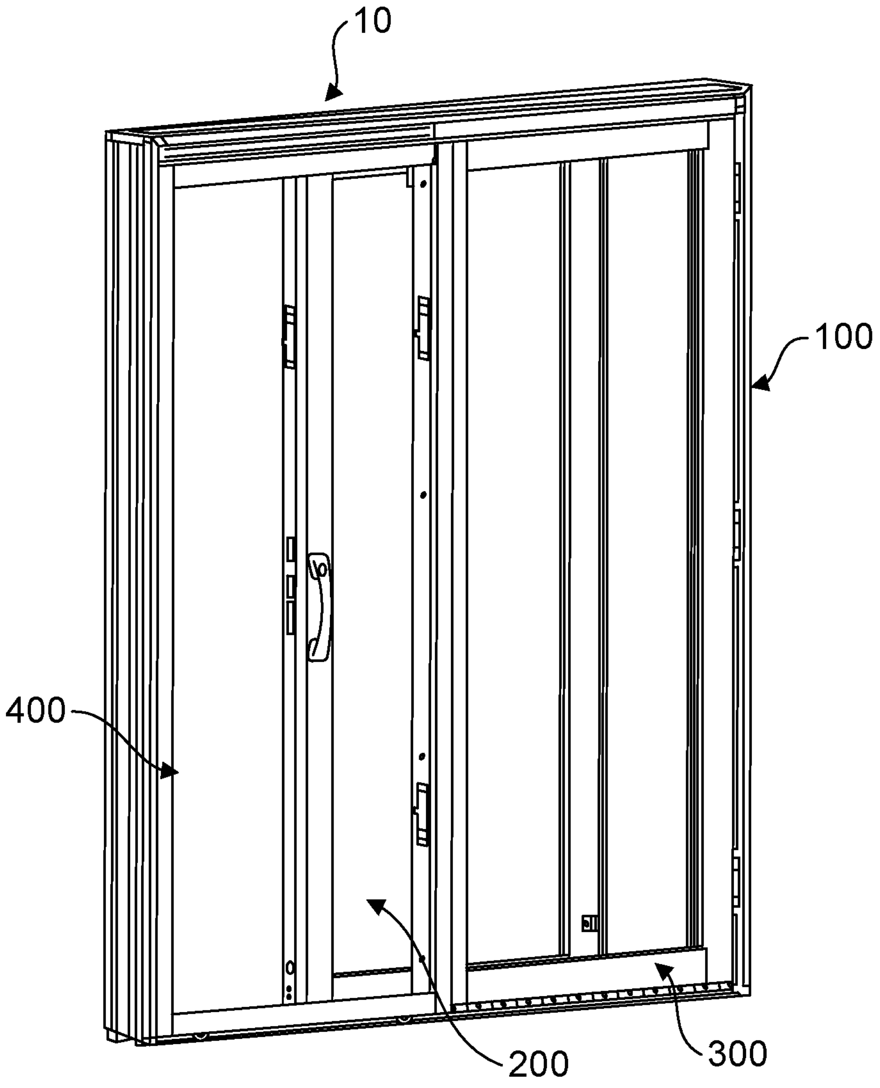

FIG. 5A illustrates the first side of the fenestration unit 10 with the first panel 200 configured for operation in its slide mode and at a slide open position, and the second panel 300 in its closed position (e.g., as in FIGS. 1A and 1B), but with the screen 400 configured for slide mode operation and at its slide closed position. The screen 400 thereby provides a screen barrier across the opening 20 between the first panel 200 and the frame 100. FIG. 5B illustrates the second side of the fenestration unit 10 with the first panel 200, second panel 300 and screen 400 at the positions shown and described above in connection with FIG. 5A.

Figure 6A:
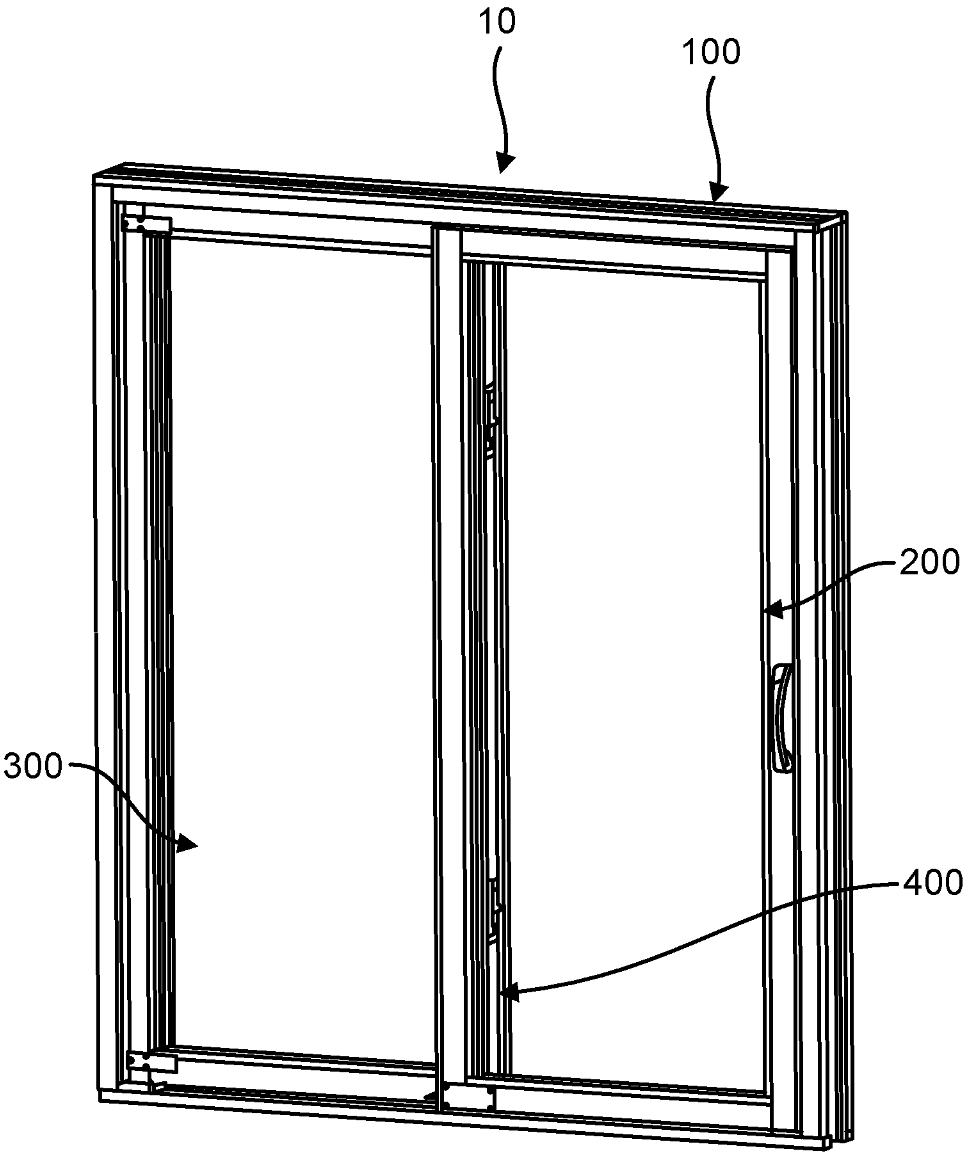
FIGS. 6A-6B are perspective illustrations of the first and second sides, respectively, of the fenestration unit shown in FIGS. 1A and 1B, but with the first panel, the second panel, and the screen, in various positions with respect to the frame.
Figure 6B:
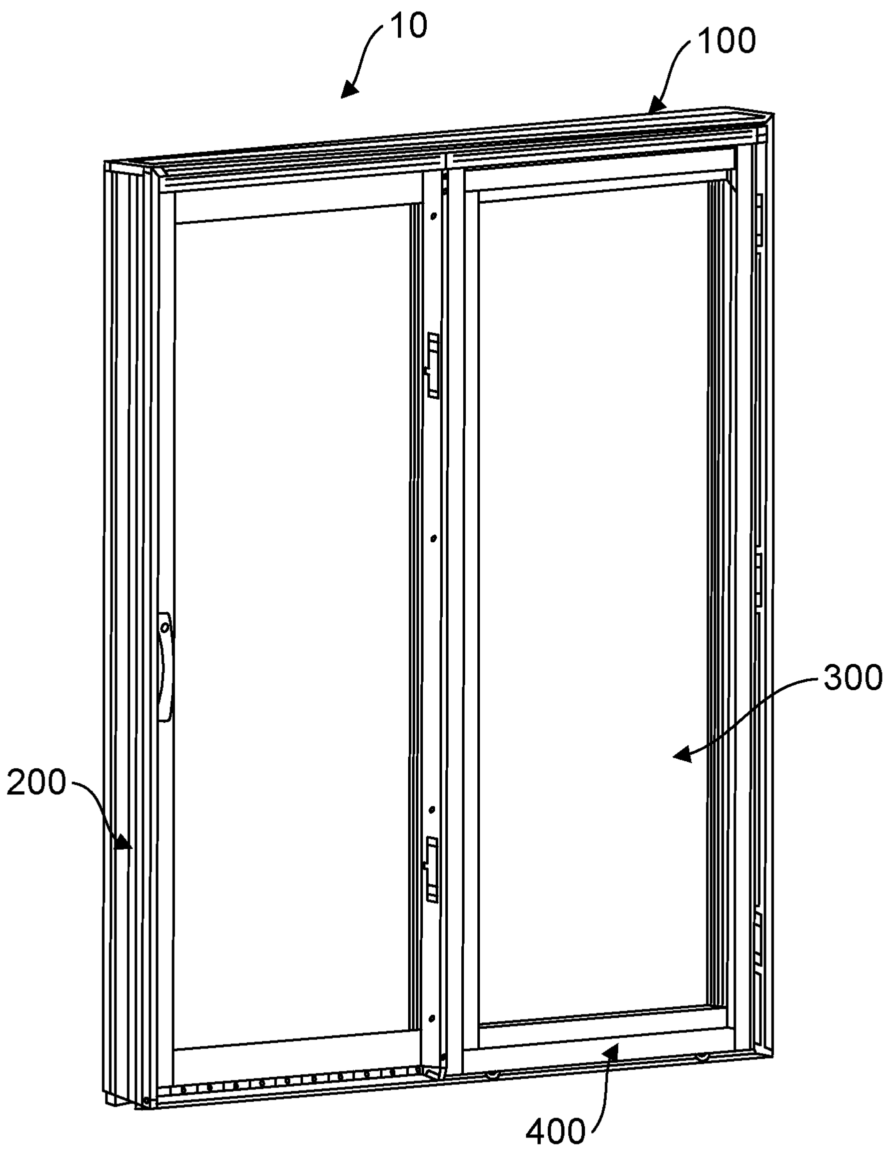

FIG. 6A illustrates the first side of the fenestration unit 10 with the first panel 200 configured for slide mode operation and at its slide closed position, the second panel 300 in its closed position, and the screen 400 in an open position. FIG. 6B illustrates the second side of the fenestration unit 10 with the first panel 200, second panel 300 and screen 400 at the positions shown and described above in connection with FIG. 6A. In the illustrated embodiments the entire opening along the length of the frame 100 (e.g., between the first jamb 114 and the second jamb 116), including the first lateral portion and the second lateral portion, are closed by the first panel 200 and the second panel 300 when the first and second panels are in these positions shown in FIGS. 6A and 6B. Although not shown, the screen 400 can be operated in its slide mode and positioned at a range of slide open positions between its slide closed position shown in FIGS. 5A and 5B, and its pivot ready position shown in FIG. 1B.

The illustrated embodiments of fenestration system 10 include one first panel 200 configured to operate in the slide mode and pivot mode, and one second panel 300 configured to pivot between open and closed positions. And as noted above, when the first panel 200 is in its slide closed position and the second panel 300 is in its closed position, the first and second panels extend over the first and second lateral portions of the frame 100, and effectively close the opening defined by the frame. In the illustrated embodiments the first panel 200 and the second panel 300 are parallel and transversely offset (e.g., about an axis perpendicular to the major planar surfaces of the panels) with respect to one another. The first panel 200 and the second panel 300 also overlap one another (e.g., adjacent the second stile 216 of the first panel and the first stile 314 of the second panel) when the first panel is in its slide closed position and the second panel is in its closed position as shown in the illustrated embodiments. Similarly, the screen 400 is parallel to and transversely offset with respect to the first panel 200 and the second panel 300 when the first panel is in its slide closed position and the second panel 300 is in its closed position. However, it will be appreciated that other embodiments may include other configurations panels such as the first and second panels and the screen. Other embodiments may also include more than one first panel, more than one second panel, and/or more than one screen FIGS. 7A-7D are detailed illustrations of a bottom portion of the first panel 200, including the bottom rail 210 and the first and second stiles 214 and 216, on a portion of the sill 110 of the frame 100. As shown, an elongated guide track 40 is located on the side of the sill 110 facing the frame opening 115. In embodiments, the guide track 40 may be a member mounted to the sill 110. In other embodiments the sill 110 may be a molded or extruded member including the guide track 40 integrally formed therein. Although the guide track 40 is shown as including a raised rail 41 extending from the sill 110 in the illustrated embodiments, the guide track 40 may take other forms in other embodiments (not shown). A first rider 500 and a second rider 502 are mounted to the bottom portion of the first panel 200 at spaced-apart locations, and are configured to support the first panel with respect to the sill 110 and guide track 40, and to cooperate with the sill and guide track to facilitate the slide mode operation and the pivot mode operation of the first panel with respect to the sill and guide track. The first rider 500 and second rider 502 are mounted within the frame 218 of the first panel 200 in the illustrated embodiments, and are shown in phantom in FIGS. 7A-7D. In the illustrated embodiments, the first rider 500 is mounted to the first panel 200 at a location on the bottom portion and first end portion of the first panel, and is shown for purposes of example in the first stile 214. Similarly, in the illustrated embodiments the second rider 502 is mounted to the first panel 200 at a location on the bottom portion and second end portion of the first panel, and is shown for purposes of example in the second stile 216. The first rider 500 and the second rider 502 are guided by the guide track 40 during the slide mode operation of the first panel 200, and provide smooth and relatively low friction sliding movement of the first panel 200 during the slide mode operation of the first panel.

FIGS. 8A-8E are detailed perspective illustrations of the second rider 502 and associated portions of the sill 110 and guide track 40 at which the second rider will be located when the first panel 200 (not shown in FIGS. 8A-8D) is configured for slide mode operation and located at its pivot ready position. The second rider 502 is shown isolated from the first panel 200 in FIGS. 8A-8D. The first panel 200 is shown with portions removed in FIG. 8E.

The second rider 502 is a locking pivot rider assembly in the illustrated embodiments, and includes a rider 510, a pivot 512 a lock 514 and a height adjuster 516. With the possible exception of a lower portion of the rider 510 that engages the guide track 40, the illustrated embodiments of the second rider 502 are configured to be mounted within a bore or other recess in the first panel 200, such as for example in the second stile 216. The illustrated embodiments of the rider 510 include a body 520 having a bottom portion 522 that is configured to engage and slide on the sill 110 while being guided by the guide track 40. As described in greater detail below, the body 520 is rotatably mounted to the first panel 200 to facilitate the pivot mode operation of the first panel. The illustrated embodiment of the rider 510 includes a wheel 524 that is rotatably mounted to the body 520 and positioned to engage and roll on the rail 41 of the guide track 40 during the slide mode operation of the first panel 200. Other embodiments of the rider 510 may include different and/or other features to provide the functions, including the sliding and guiding functions, described herein.

The pivot 512 is rotatably mounted to the rider 510 (e.g., to the body 520 in the illustrated embodiments). The illustrated embodiments of the pivot 512 include a a bearing plate 530 mounted to a first or upper end of a rod 532 that extends from a top or upper portion 534 of the body 520. The bottom portion of the rod 532 is mounted to and extends from the upper portion 534 of the body 520. The bearing plate 530 may be fixedly mounted to the first panel 200, for example by screws or other fasteners (not shown) that may extend through bores 536 in the bearing plate and into the first panel.

Figure 26A:
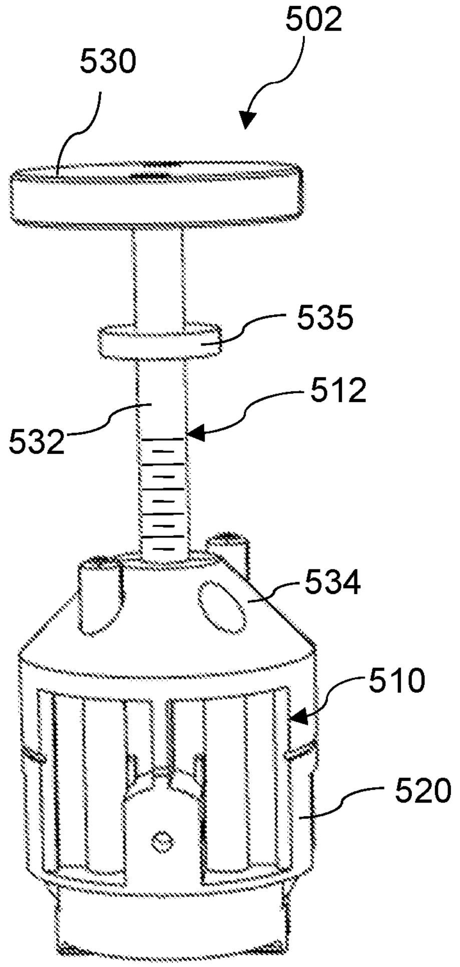
FIGS. 26A and 26B are detailed perspective illustrations of the second rider, illustrating the pivot.
Figure 26B:
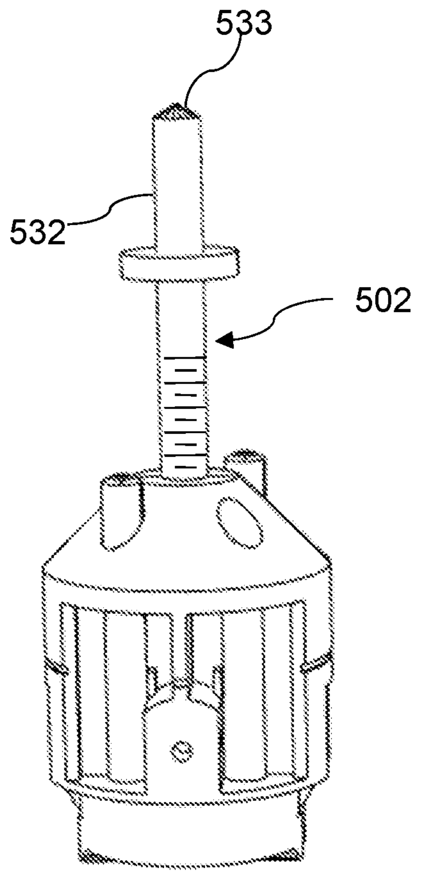

FIGS. 26A and 26B are detailed illustrations of the second rider 502 with portions removed to illustrate the pivot 512. In the illustrated embodiments the rod 532 extends from the body 520 of the rider 510 and includes a tapered end 533 on its end opposite the rider. The bearing plate 530 engages and rotates on the tapered end 533 of the rod 532 in these embodiments. As described in greater detail below, in the illustrated embodiments the pivot 512 also includes structures that facilitate the functionality of the lock 514 and the height adjuster 516. In particular, and as shown in FIGS. 26A and 26B, at least the lower portion of the rod 532 may be a threaded member that is threadedly and rotatably mounted in a threaded bore in the body 520 of the rider 510. A bushing 535 mounted to the rod 532 facilitates mounting of one or more components of the lock 514 to the rod 532. Because the bearing plate 530 is rotatably mounted to the body 520 (e.g., by the rod 532), during the pivot mode operation of the first panel 200, the first panel and the bearing plate can pivot or rotate with respect to the body while the body remains engaged with sill 110 and guide track 40.

Referring back to FIGS. 8A-8E, the illustrated embodiments of lock 514 include cam body 540 and one or more lock pins 542 (two are shown in the illustrated embodiments). Each of the lock pins 542 is slidably mounted within a respective bore 544 extending through the body 520, and between and though the upper portion 534 and the bottom portion 522 of the body. Each of the lock pins 542 is moveable between a retracted position shown in FIGS. 8A-8C at which the lower end of the lock pin is disengaged from the sill 110, and an extended position shown in FIG. 8D at which the lower end of the lock pin is engaged with the sill. Embodiments may include biasing members, such as for example leaf or coil springs (not shown) to bias each of the lock pins 542 toward its retracted position. In the illustrated embodiments, the upper portion 534 of the body 520 through which the lock pins 542 extend is convex in shape.

The cam body 540 is rotatably mounted with respect to the body 520 of the rider 510, above the upper portion 534 of the rider body. In the illustrated embodiments, for example as shown in FIG. 8B, a hex nut 533 is threaded onto the rod 532 (and can therefore rotate with respect to the rod 532, and seats within a hex-shaped recess in the upper portion of the cam body 540. The cam body 540 is coupled to the pivot 512 (e.g., by the height adjuster 516, adjustment mechanism 517, including key 556, and rod 532 as described in greater detail below), and rotates with respect to the body 520 of rider 510 during the rotation of the first panel 200 during its pivot mode operation.

A lower portion of the cam body 540 includes a cam surface 550 that includes retract portions 552 and extend portions 554 configured to engage the lock pins 542 as the cam body rotates. As noted above, the cam body 540 is configured to rotate with the bearing plate 530 of the pivot 512 and the first panel 200 when the first panel 200 is operated in its pivot mode.

Figure 8A:
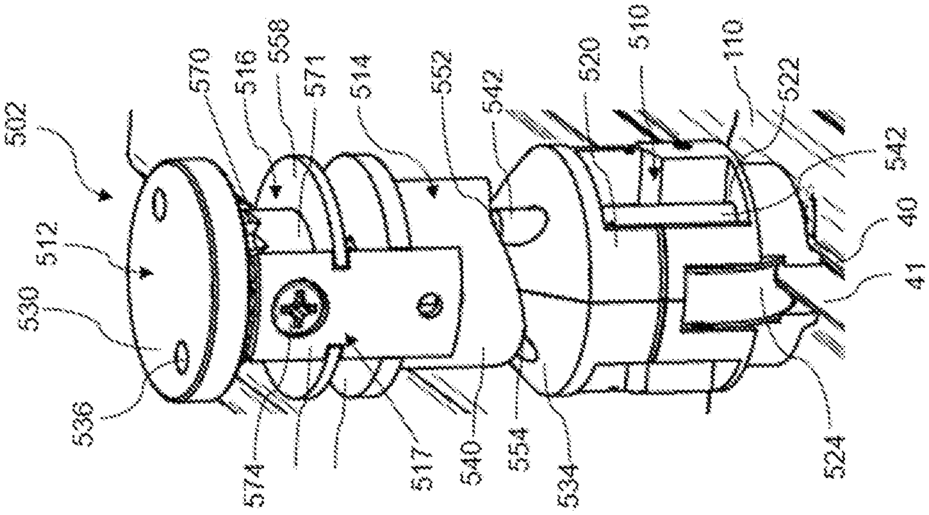
FIGS. 8A-8E are detailed perspective illustrations of a second rider for coupling a bottom portion of the first panel to the sill of the frame, in accordance with embodiments.
Figure 8B:
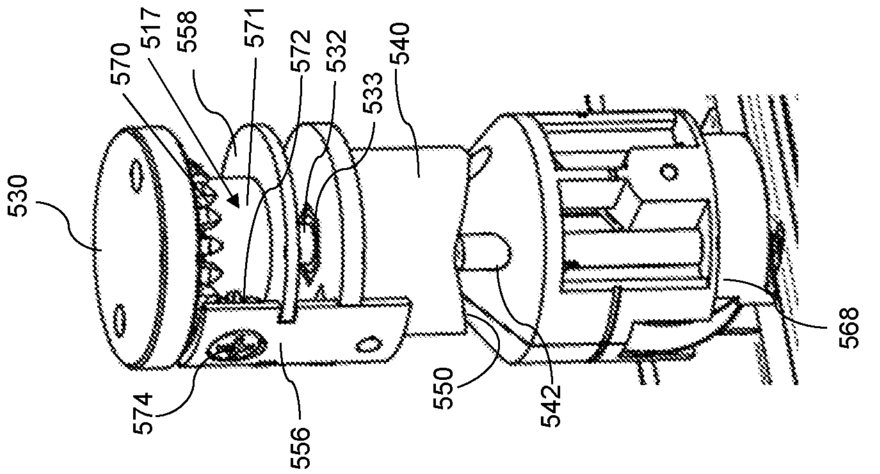
Figure 8C:
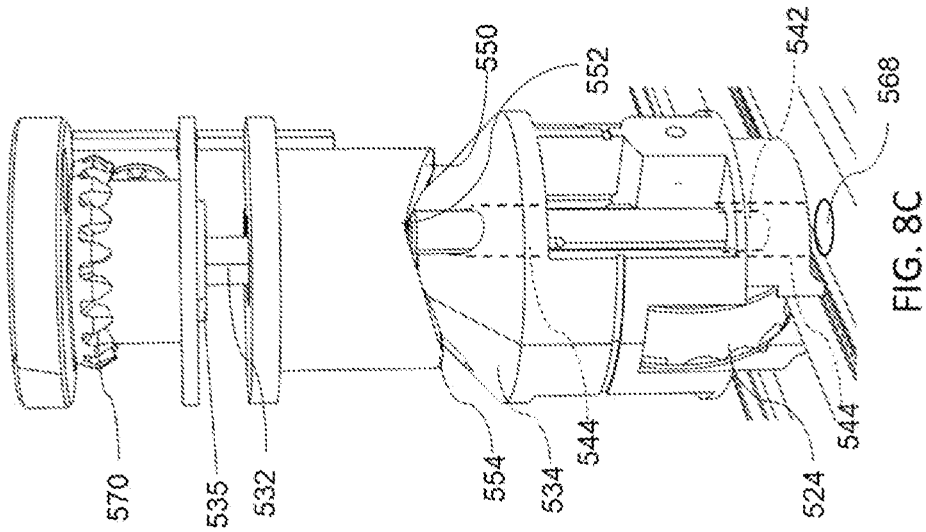

The body 520 of the rider 510 and cam body 540 are mounted with respect to one another so that when the first panel 200 is configured to operate in its slide mode, the cam body is positioned with the retract portions 552 of the cam surface 550 adjacent to the lock pins 542 as shown in FIGS. 8A-8C. The lock pins 542 can then be in their retracted positions, disengaged from the sill 110 and allowing the second rider 502 and the first panel 200 to slide between the slide closed and pivot ready positions during the slide mode operation.

Figure 8D:
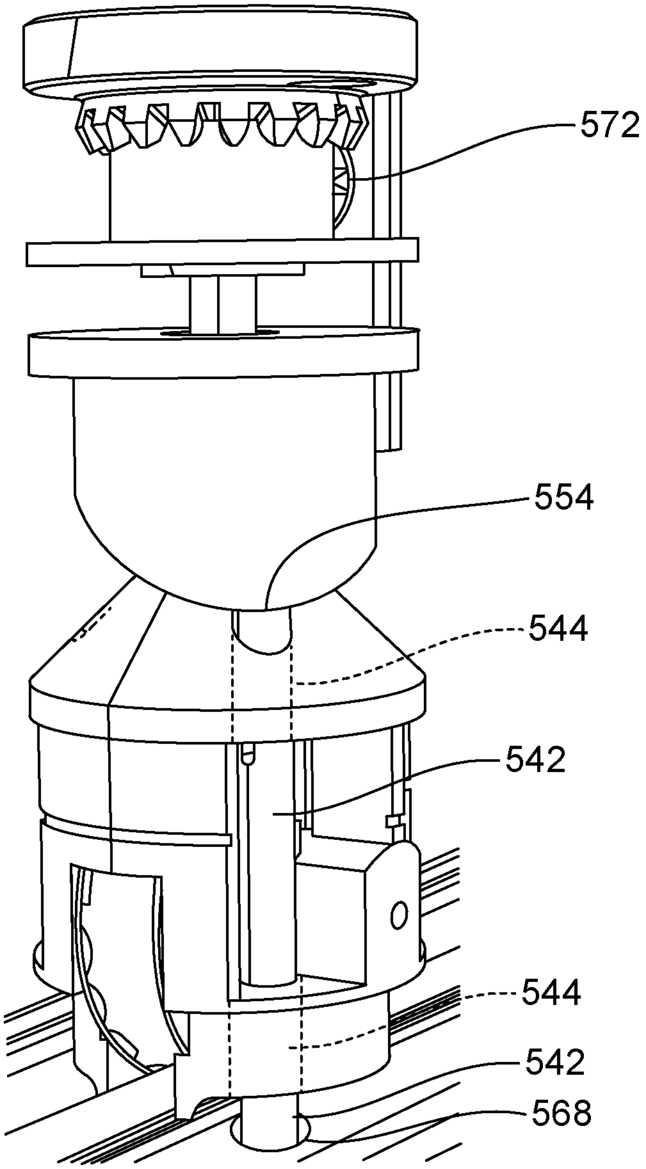

When the first panel 200 is rotated from the pivot ready position to the pivot open position, the rotation will cause the cam body 540 to rotate with respect to the body 520 of the rider 510, with the cam surface 550 engaging the lock pins 542 and forcing the lock pins to their extended positions. The lock pins 542 will be in their fully extended positions when the cam body 540 is positioned with the extend portions 554 of the cam surface 550 adjacent to the lock pins as shown in FIG. 8D.

In embodiments, the sill 110 may include recesses such as 568 that are configured and located to receive the lock pins 542 in the extended positions when the first panel 200 is at the pivot ready position. Although the lock pins 542 releasably engage the sill 110 in the illustrated embodiments, other embodiments (not shown) of the lock include additional or alternative structures to lock movement of the second rider 502 with respect to the sill. For example, in embodiments with a rotating wheel, the lock may releasably lock the wheel with respect to the structure to which it is rotatably mounted, to prevent rotation of the wheel.

Figure 8E:
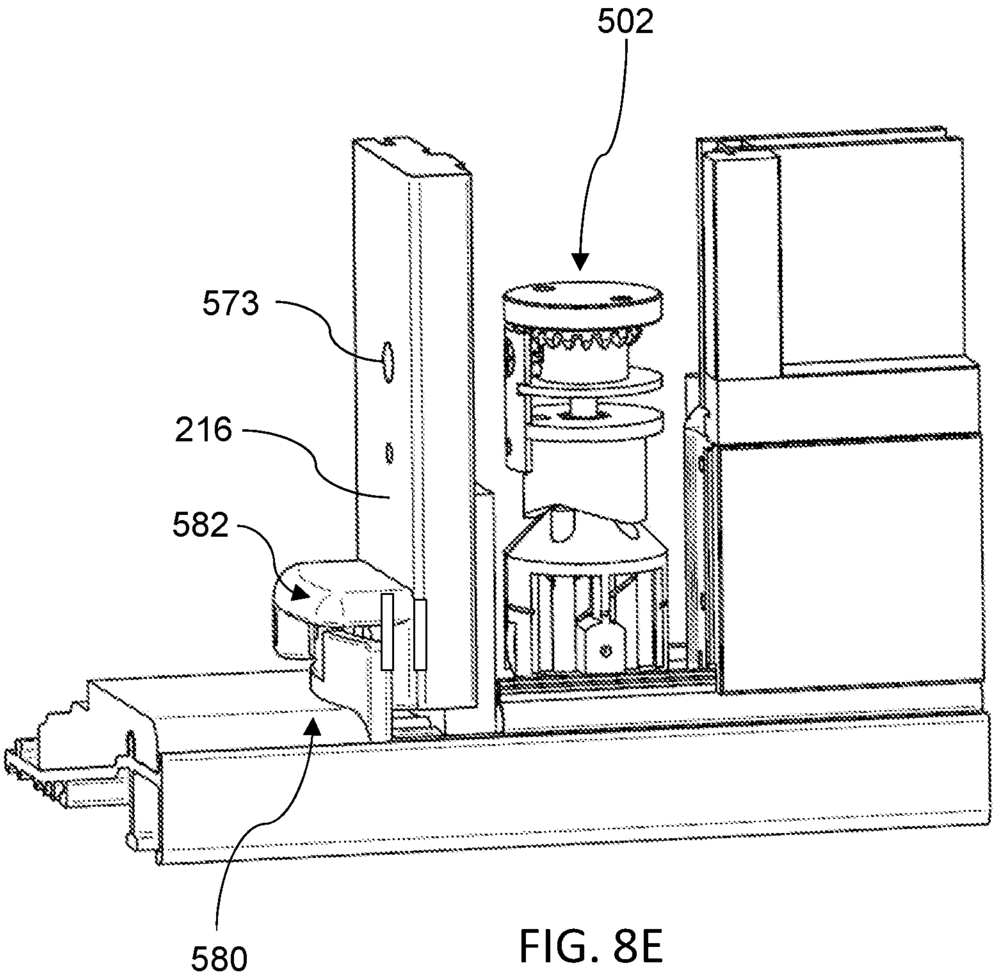
Figure 27:
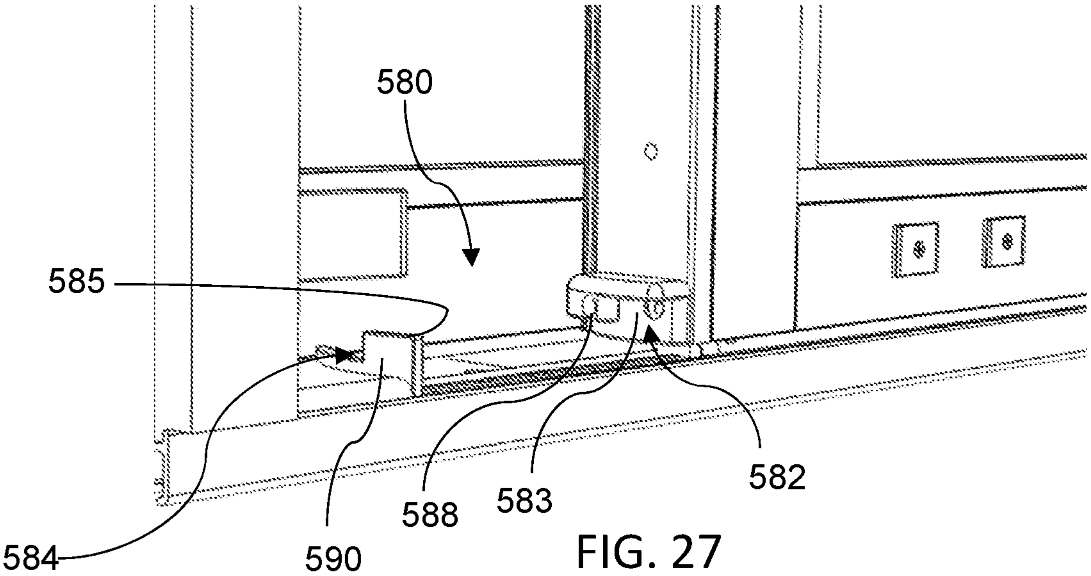
FIG. 27 is a detailed perspective illustration of a bottom portion of the second end portion of the first panel and the sill of the frame, illustrating the first panel at a slide open position and components of a releasable hook, in accordance with embodiments.
Figure 28:
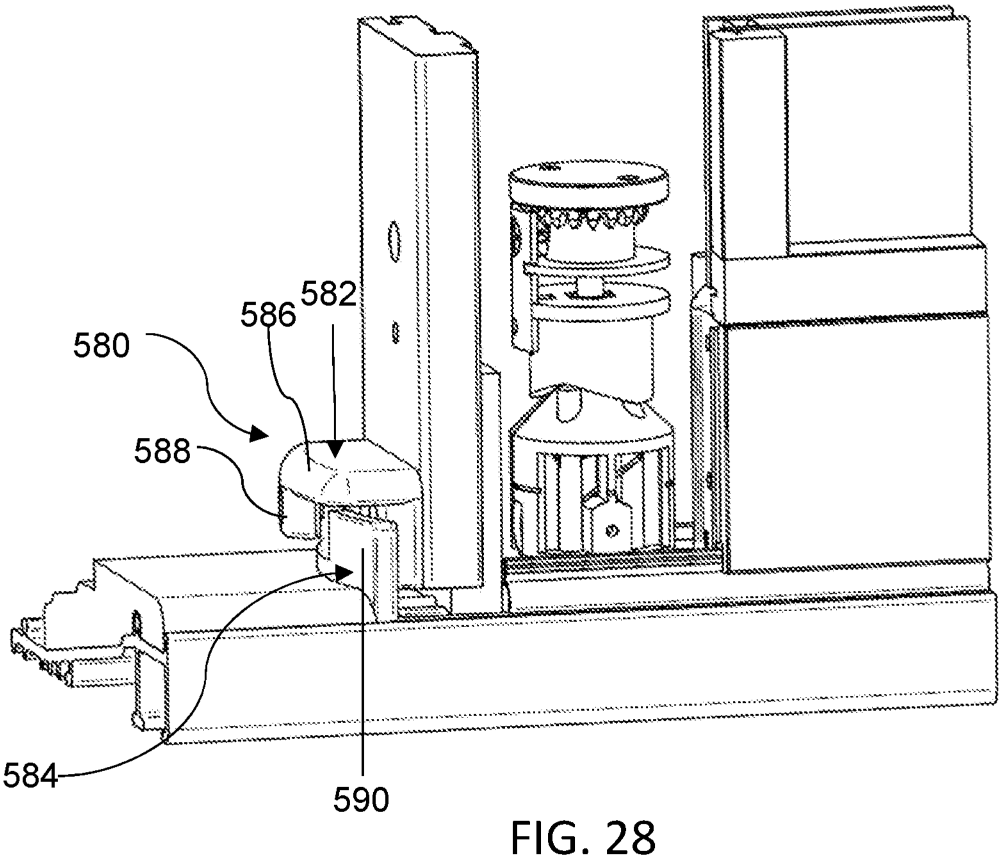
FIG. 28 is a detailed perspective illustration of a bottom portion of the second end portion of the first panel and the sill of the frame, with portions of the second stile of the first panel removed to show the second rider, and illustrating the first panel at the pivot ready position and a releasable hook, in accordance with embodiments.

FIGS. 8E, 27 and 28 illustrate a releasable hook 580 that may be incorporated into embodiments of the fenestration system 10 to facilitate the pivot mode operation of the first panel 200. Because of the configuration of the cam surface 550 (e.g., the sloping surface between the retract portions 552 and the extend portions 554), during initial portions of the rotation of the first panel 200 (and the cam body 540) when the first panel is rotated from its pivot ready position toward the pivot open position during the pivot mode operation, the lock pins 542 are moved toward the sill 110, but may not have been moved a sufficient distance toward their extended positions to engage the sill. The lock 514 therefore may not effectively lock the second rider 502 to the sill 110 during these initial portions of the pivot mode operation. Similarly, the lock 514 may effectively release the second rider 502 from the sill 110 during final portions of the rotation of the first panel 200 back to its pivot ready position during the pivot mode operation. To prevent sliding movement of the first panel 200 along the sill 110 during these initial and final portions of rotation during the pivot mode operation, and to position the first panel 200 at the pivot ready position, the illustrated embodiments of fenestration unit 10 include the releasable hook 580.

In the illustrated embodiments, the releasable hook 580 includes a panel member 582 and a sill member 584. The panel member 582 includes a stop surface 583 adjacent the end edge portion of the second stile 216 of the first panel 200, an extending portion 586 that extends from the end edge portion of the second stile 216, and a lip 588 that extends toward the sill 110 from the extending portion at a location spaced from the second stile. The sill member 584 includes a lip 590 that extends upwardly, away from the sill 110. As perhaps best shown in FIGS. 27 and 28, the lip 588 of the panel member 582 extends only partially across a thickness of the end edge of the second stile 216, and is located toward the second side of the first panel 200. The lip 590 of the sill member 584 is complementary to the lip 588 of the panel member 582, and extends only partially across a width of the sill 110, and is located on the side of the sill toward the first side of the first panel 200.

As the first panel 200 is moved from a slide open position such as that shown in FIG. 27 to the pivot ready position shown in FIG. 28, the stop surface 583 of the panel member 582 engages a stop surface 585 on a side of the lip 590 facing the first panel 200. The stop surfaces 583 and 585, which in embodiments are complimentary curved surfaces, are located and configured so that the first panel 200 is at the pivot ready position when the surfaces are engaged. During this movement of the first panel 200, the lip 588 of the panel member 582 passes by the lip 590 of the sill member 584. During the initial and final portions of the rotation of the first panel 200 during the pivot mode operation, the lip 588 of the panel member 582 moves past the lip 590 of the sill member 584 on the side of the sill member opposite the first panel. As shown, the lips 588 and 590 may be curved to facilitate the relative movement of these members during the pivot mode operation of the first panel 200. Although facilitating rotation of the first panel 200 with respect to the sill 110 during these initial and final portions of rotation of the first panel during the pivot mode operation, the panel member 582 and sill member 584 of the releasable hook 580 cooperate to prevent the first panel from sliding on the sill when the lock pins 542 of the lock 514 are not engaged with the sill 110.

Referring back to FIGS. 8A-8E, 26A and 26B, the illustrated embodiments of height adjuster 516 include an adjustable mount of the pivot 512 to the rider 510, and an adjustment mechanism 517 for actuating the adjustable mount. The adjustable mount facilitates the height adjustment of the pivot 512 with respect to the rider 510, and in the illustrated embodiments is provided by the threaded coupling of the rod 532 to the body 520 of the rider 510. Rotation of the rod 532 causes the rod to extend further out of the body 520, or to retract further within the body, thereby adjusting the height or distance of the bearing plate 530 with respect to the rider 510. In the illustrated embodiments, the adjustment mechanism 517 is operable to rotate the rod 532, and thereby cause the height adjustment.

The illustrated embodiments of the adjustment mechanism 517 includes a body 571, an annular gear 570, a key 556, and a pinion gear 572. Body 571 is rotatably mounted to the rod 532 via a bushing 535 The bushing 535 is fixedly mounted to the rod 532, and supports the body 571. The annular gear 570 is fixedly mounted to the rod 532, and is therefore fixedly mounted with respect to the bushing 535. Annular gear 570 and rod 532 can thereby rotate within the body 571 and the cam body 540 during actuation of the adjustment mechanism 517. Key 556 is a generally planar member, but curved to match the radii of the components to which it is coupled in the illustrated embodiments, and is fixedly mounted to the body 571. In the illustrated embodiments the key 556 is engaged in a cutout or slot of a flange or shoulder 558 that extends from a central portion of the body 571. The pinion gear 572 is rotatably mounted to both the key 556 and the central portion of the body 571 about an axis that extends generally perpendicular to the longitudinal axis of the rod 532. The pinon gear 572 engages the annular gear 570. A portion of the key 556 is slidably engaged with the cam body 540 of the lock 514 to facilitate motion of the key upwardly and downwardly with respect to the cam body in directions generally parallel to the rod 532, while being retained at a fixed position about the circumference of the cam body. In the illustrated embodiments, this functionality is provided by locating portions of the key 556 in a cutout or slot of a flange or shoulder 560 that extends from the cam body 540.

Annular gear 570 and pinion gear 572 comprise a bevel gear set in the illustrated embodiments. Rotation of the pinion gear 572, for example by a screwdriver engaged with the Phillips-head slot in the head 574 of the pinion gear, causes rotation of the rod 532 of the pivot 512 via the rotation of the annular gear 570. This rotation of the pivot 512 causes the pivot and its bearing plate 530 to extend or retract with respect to the body 520 of rider 510 and the cam body 540, and thereby raises or lowers the first panel 200 with respect to the rider and the sill 110. Key 556 is configured to prevent rotation of the body 571 of the adjustment mechanism 517 with respect to the cam body 540 of the lock 514 during actuation of the adjustment mechanism. However, because the key 556 can slide with respect to the cam body 540, the key facilitates movement of the body 571, annular gear and pinion gear as the pivot 512 extends and retracts with respect to the rider 510 during actuation of the adjustment mechanism 517. In the illustrated embodiments, the bearing plate 530 is fixedly mounted to the first panel 200, and the actuation of the adjustment mechanism 517 causes the rider 510 to move with respect to the first panel 200.

During the rotation of the first panel 200 during its pivot mode operation, the rod 532 and the cam body 540 mounted thereto rotate with respect to the body 520 of the rider 510 by the treaded coupling of the body 520 to the rod 532. Because of this relative movement between the cam body 540 and the body 520 of the rider 510 along the axis of the rod 532 during the pivot mode operation of the panel 200, the cam body and the body of the rider are configured with sufficient space between them to accommodate the relative movement during the pivot mode operation of the first panel.

Figure 7A:
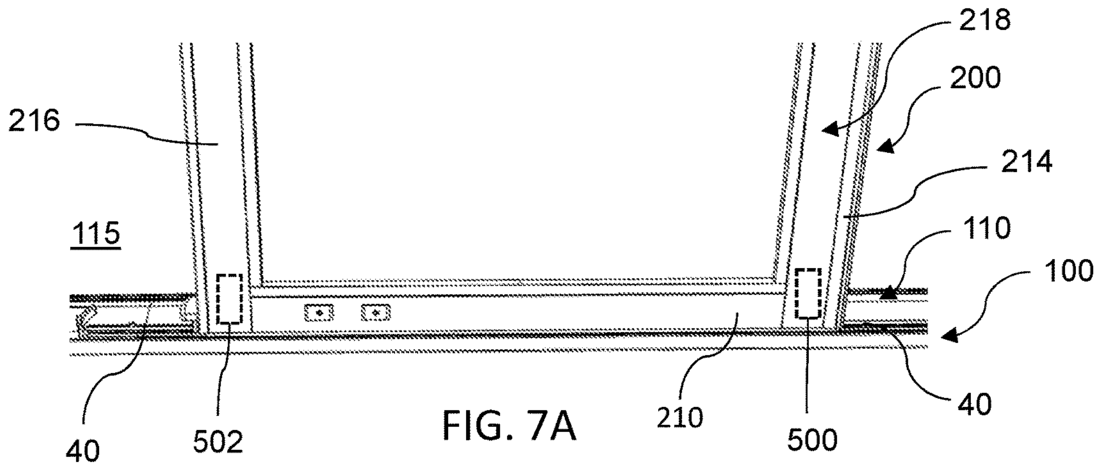
FIGS. 7A-7D are detailed perspective illustrations of a bottom portion of the first panel and portions of a sill of the frame, in accordance with embodiments.
Figure 7B:
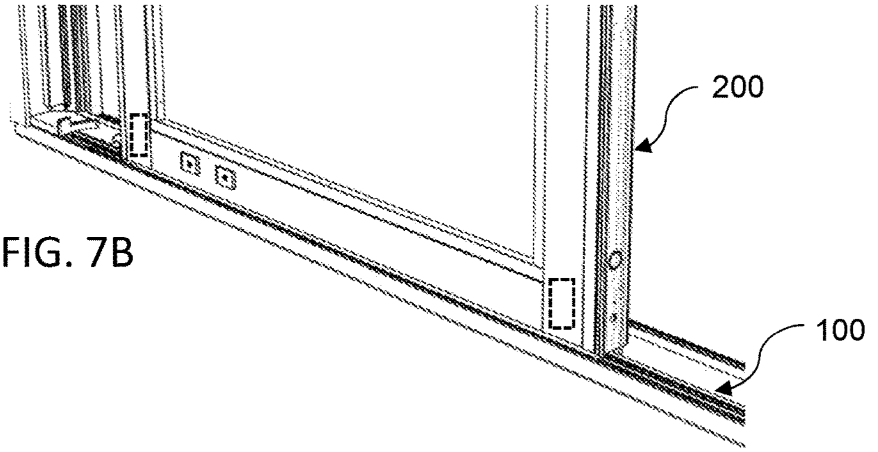
Figure 7D:
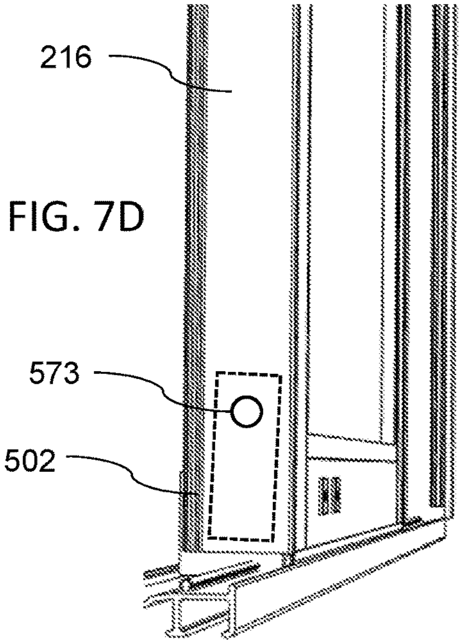
Figure 7C:
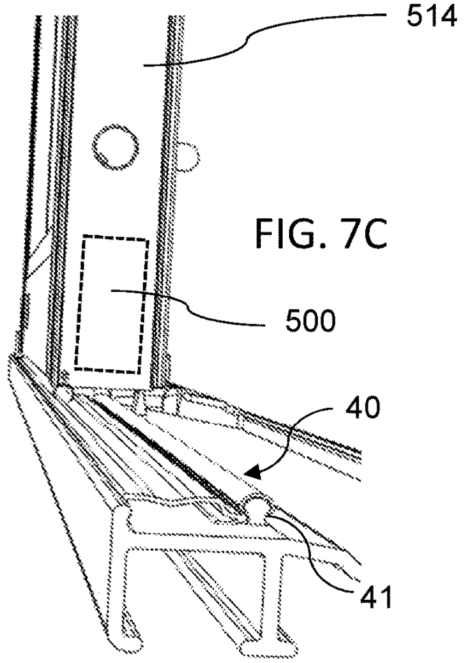

As shown for example in FIGS. 7D and 8E, the head 574 of the pinion gear 572 may be accessed through an opening 573 through the end edge of the second stile 216 so that the adjustment mechanism 517 of the height adjuster 516 can be actuated from outside of the first panel 200. The height adjuster 516 may be actuated to adjust the height of the second end portion of the first panel 200 during set up and adjustment operations of the first panel. Other embodiments of the second rider 502 (not shown) include other height adjustment mechanisms or structures, or no height adjuster.

Figure 9:
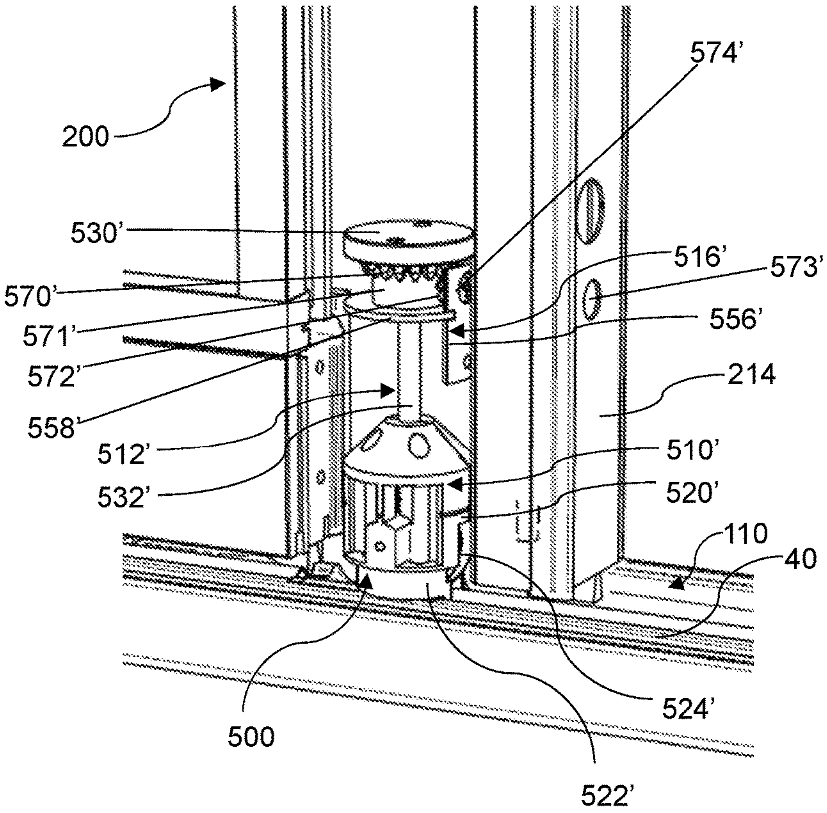
FIG. 9 is a detailed perspective illustration of a bottom portion of the first panel and the sill of the frame, with portions of the first panel removed, illustrating a first rider for coupling the bottom portion of the first panel to the sill, in accordance with embodiments.

FIG. 9 is a perspective illustration of the bottom and first end portions of the first panel 200 and adjacent portions of the sill 110 and guide track 40, with portions of the first stile 214 removed to illustrate the first rider 500. In the illustrated embodiments, portions of the first rider 500 are substantially the same as or similar to the second rider 502 described above in connection with FIGS. 8A-8E, and similar features are identified by similar reference numbers. As shown, first rider 500 is an assembly that includes a rider 510' and a height adjuster 516'. With the possible exception of a lower portion of the rider 510' that engages the guide track 40, the illustrated embodiment of the first rider 500 is configured to be mounted with a bore or other recess in the first panel 200, such as for example in the first stile 214. The illustrated embodiments of the first rider 500 includes a body 520' having a bottom or lower portion 522' that is configured to engage and slide on the sill 110 while being guided by the guide track 40. The illustrated embodiment of the body 520' includes a wheel 524' that is rotatably mounted to the body and positioned to engage and roll on the rail 41 of the guide track 40 during the slide mode operation of the first panel 200.

The height adjuster 516' of the first rider 500 can be substantially the same as or similar to that of the height adjuster 516 of the second rider 502, and includes an adjustable mount of the pivot 512' to the rider 510', and an adjustment mechanism 517' for actuating the adjustable mount. The adjustable mount facilitates the height adjustment of the pivot 512' with respect to the rider 510', and in the illustrated embodiments is provided by the threaded coupling of the rod 532' to the body 520' of the rider 510'. Rotation of the rod 532' causes the rod to extend further out of the body 520', or to retract further within the body, thereby adjusting the height or distance of the bearing plate 530' with respect to the rider 510'. In the illustrated embodiments, the adjustment mechanism 517' is operable to rotate the rod 532', and thereby cause the height adjustment.

The illustrated embodiments of the adjustment mechanism 517' include a body 571', an annular gear 570', a key 556', and a pinion gear 572'. Body 571' is rotatably mounted to a bushing (not shown in FIG. 9). The bushing is fixedly mounted to the rod 532'. The annular gear 570' is fixedly mounted to the rod 532' and the bushing. Annular gear 570' and rod 532' can thereby rotate within the body 571' during actuation of the adjustment mechanism 517'. Key 556' is fixedly mounted to the body 571'. In the illustrated embodiments the key 556' is engaged in a cutout or slot of a flange or shoulder 558' that extends from a central portion of the body 571'. The pinion gear 572 is rotatably mounted to both the key 556' and the central portion of the body 571' about an axis that extends generally perpendicular to the longitudinal axis of the rod 532'. The pinon gear 572' engages the annular gear 570'. A portion of the key 556' is fixedly coupled to the first panel 200, for example by a screw, bolt or other fastener (not shown) that attaches the key to the first stile 314.

Rotation of the pinion gear 572', for example by a screwdriver engaged with the Phillips-head slot in the head 574' of the pinion gear, causes rotation of the rod 532' of the pivot 512' via the rotation of the annular gear 570'. This rotation of the pivot 512' causes the body 520' of the rider 510' to extend or retract with respect to the pivot and its bearing plate 530', and thereby raises or lowers the first end portion of the first panel 200 with respect to the rider and the sill 110. Key 556' is configured to prevent rotation of the body 571' and pinion gear 572' of the adjustment mechanism 517' with respect to the rider 510' during actuation of the adjustment mechanism, but because the key can move with respect to the rider 510', the key facilitates movement of the body 571', annular gear and pinion gear as the pivot 512' extends and retracts with respect to the rider 510'.

As shown for example in FIGS. 7D and 8E, the head 574' of the pinion gear 572' may be accessed through an opening 573' through the end edge of the first stile 214 so that the adjustment mechanism 517' of the height adjuster 516' can be actuated from outside of the first panel 200. The height adjuster 516' may be actuated to adjust the height of the first end portion of the first panel 200 during set up and adjustment operations of the first panel. Other embodiments of the first rider 502' (not shown) include other height adjustment mechanisms or structures, or no height adjuster. Although the first rider 502' couples the bottom portion of the first panel 200 to the sill 110 in the illustrated embodiments, in other embodiments the first rider may couple the top portion of a panel such as 200 to the frame 100.

Figure 10A:
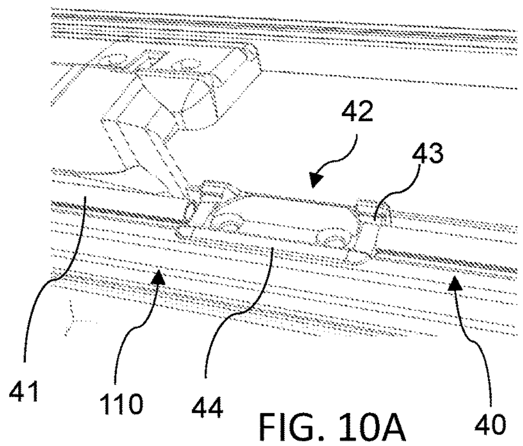
FIGS. 10A and 10B are detailed perspective illustrations of a portion of the sill and a guide track, illustrating portions of the sill and guide track at which the first rider will be located when the first panel is at the pivot ready position, in accordance with embodiments.
Figure 10B:
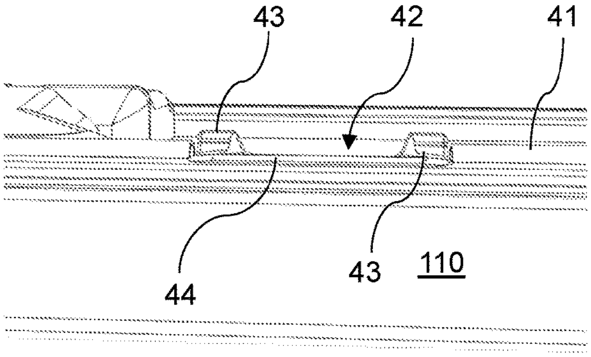

FIGS. 10A and 10B illustrate portions of the sill 110 and guide track 40 at which the first rider 500 of the first panel 200 will be located when the first panel is at the pivot ready position. When the first panel 200 is at the pivot ready position and the first panel is pivoted outwardly during the pivot mode operation, portions of the first panel, including the first end portion and the first stile 214, swing outwardly beyond the frame 100. To facilitate this pivot mode operation, the guide track 40, and in the illustrated embodiments the rail 41, include a gap 42 located at the position where the first rider 500 will be positioned when the first panel 200 is at its pivot ready position.

In the illustrated embodiment the gap 42 in the guide track 40 is defined by a wheel stop 44 on the sill 110. In the illustrated embodiments the wheel stop 44 is a raised projection or wall that is transversely offset from the gap 42 in a direction opposite the gap from the side of the sill 110 that the first rider 500 moves toward during the pivot mode operation (e.g., toward the first side of the fenestration unit 10 from the guide track 40). The wheel stop 44 is positioned to engage the rider 500 when the rider is aligned with the guide track (e.g., when the wheel 524' of the rider is aligned with the rail 41). The wheel stop 44 therefore prevents to first panel 200 from being moved beyond the position at which it is aligned with the guide track 40 and configured for slide mode operation when the first panel is being closed during pivot mode operation. Projections 43 on the opposite ends of the gap 42, and at positions transversely offset from the gap in a direction opposite the gap from the wheel stop 44 (e.g., toward the second side of the fenestration unit 10 from the guide track 40), engage the first rider 500 and inhibit slide mode operation of the first panel 200 if the first panel is not fully moved to the position at which it is aligned with the guide track 40 and configured for slide mode operation when the first panel is being closed during pivot mode operation. Because of the gap 42 and its location on the guide track 40, when the first panel 200 is at its pivot ready position, the first rider 500, including its wheel 524', are disengaged from the guide track 40, thereby enabling the first panel to operate in its pivot mode. In embodiments, when the first panel 200 is at other positions along the frame 100 during its slide mode operation, including positions between its slide closed and slide fully open positions, the first rider 500 is engaged with the guide track 40, thereby inhibiting pivot mode operation of the first panel.

FIG. 1A illustrates stop members 45 (two are shown for purposes of example) that are configured to engage the first panel 200 when the first panel reaches the slide fully open position during slide mode operation, and to prevent the first panel from sliding beyond the slide fully open position when the second panel 300 is in its closed position. Stop members 45 are mounted to the second panel 200 in the illustrated embodiments, and engage the second end edge of the first panel 200 when the first panel is at the slide fully closed position. Other embodiments of the fenestration unit 10 include other configurations and/or structures that provide functions of the stop members 45.

In the illustrated embodiments, the stop members 45 function as travel limits, and inhibit motion of the first panel 200 from the slide fully closed position toward the pivot ready position when the second panel 300 is at the closed position. The first panel 200 is thereby effectively prevented from being moved to the pivot ready position, and effectively prevented from being operated in its pivot mode, while the second panel 300 is closed. However, the stop members 45 are configured so that when the second panel 300 is rotated to a pivot open position, the stop members no longer engage the first panel 200 during its slide mode operation, and allow or facilitate sliding motion of the first panel beyond the slide fully open position to the pivot ready position. The first panel 200 can then be operated in its pivot mode when the second panel 300 is in a pivot open position. In embodiments, the stop members 45 are elongated members mounted at an end thereof to the second panel 300. The stop members 45 may be flexible or otherwise configured to resist breakage, for example when engaged by the first panel 200 during the operation of the fenestration unit 10 (e.g., if the second panel 300 is closed when the first panel 200 is at its pivot ready position).

Figure 11A:
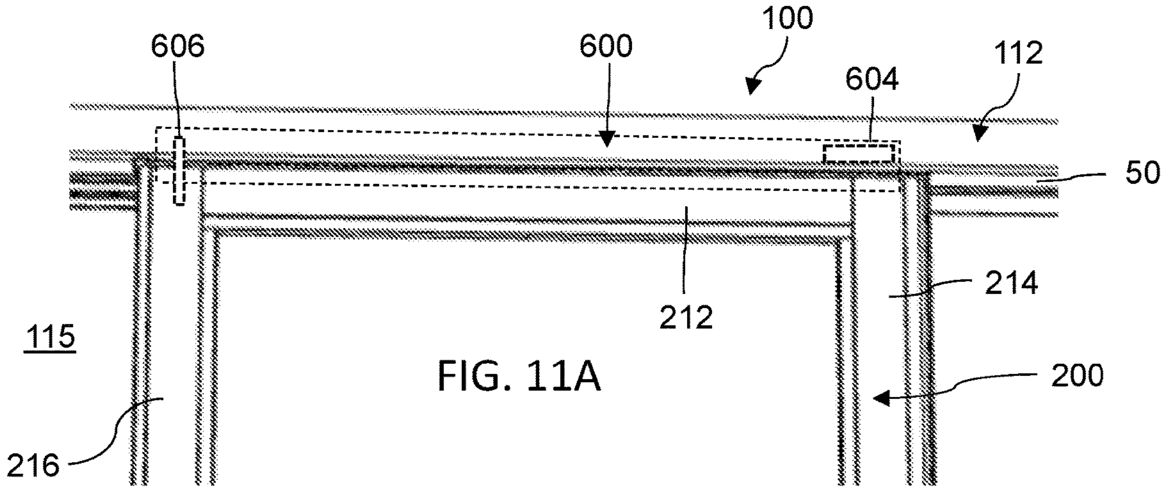
FIGS. 11A-11C are detailed perspective illustrations of a top portion of the first panel, and portions of a head of the frame and a guide track, illustrating a head slide coupling the top portion of the first panel to the head, in accordance with embodiments.
Figure 11B:
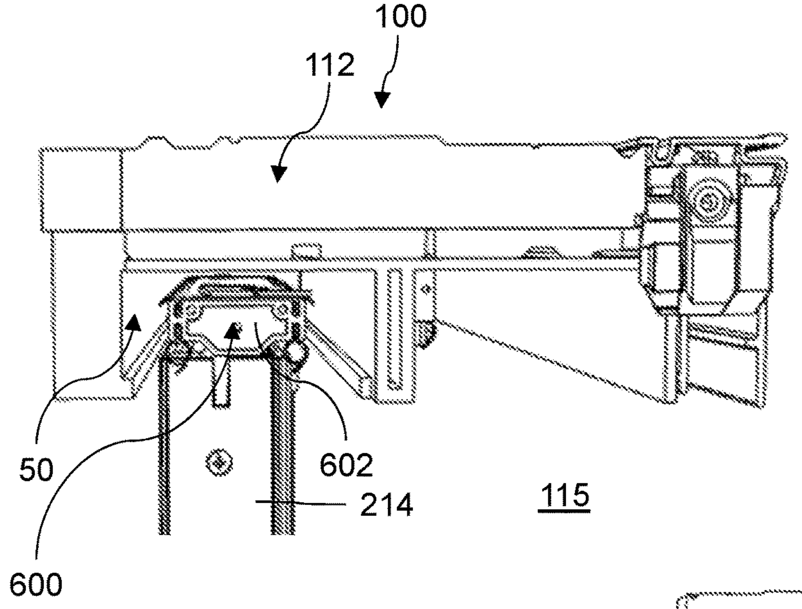
Figure 11C:
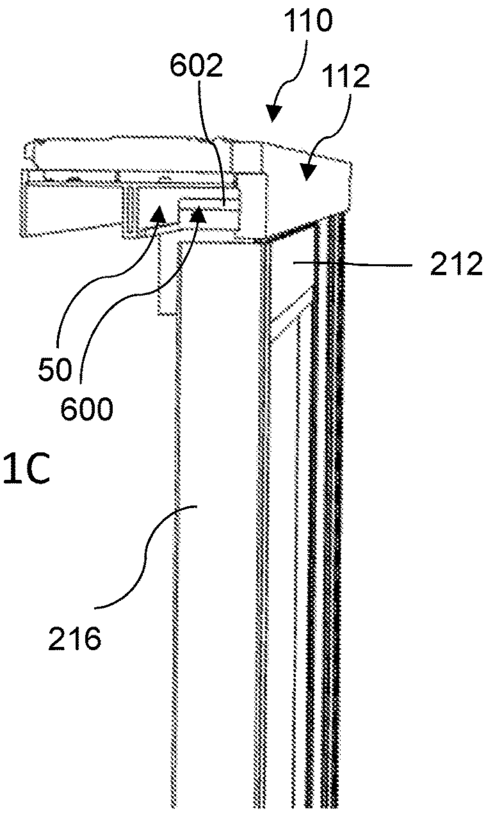

FIGS. 11A-11C are detailed illustrations of a top portion of the first panel 200, including the top rail 212 and the first and second stiles 214 and 216, on the head 112 of the frame 100. In particular, FIG. 11A shows the first side of the portions of the first panel 200 and head 112. FIG. 11B shows the portions of the first panel 200 and head 112 from the end of the first panel looking toward the first stile 214. FIG. 11C shows the portions of the first panel 200 and head 112 from the end of the first panel looking toward the second stile 216. As shown, an elongated channel-type guide track 50 is located on the side of the head 112 facing the frame opening 115. In embodiments, the guide track 50 may be a member mounted to the head 112. In other embodiments, the head 112 may be a molded or extruded member including the guide track 50 integrally formed therein.

A head slide 600 couples the top portion of the first panel 200 to the head 112 and guide track 50, and facilitates operation of the first panel in both its slide mode and pivot mode. The head slide 600 is an assembly in the illustrated embodiments and includes a body 602, a latch 604 that releasably couples the first end portion of the top portion of the first panel 200 (e.g., a portion adjacent to the first stile 214) to the body, and a pivot 606 that pivotally couples the second end portion of the top portion of the first panel (e.g., a portion adjacent to the second stile 216) to the body. The body 602 of the head slide 600 is configured to cooperate with the head 112 and guide track 50 to slide within and be guided by the guide track 50. As shown for example in FIGS. 11B and 11C, in the illustrated embodiments the cross-sectional shape and size of the body 602 are complimentary to the cross-sectional shape and size of the guide track 50 to facilitate the sliding and guided motion of the body within the guide track. When the first panel 200 is latched to the head slide 600 by the latch mechanism 604, the first panel is configured for slide mode operation by the cooperation of the body 602 and the guide track 50. When the first panel 200 is at its pivot ready position, the latch 604 can be actuated to disengage or release the first panel 200 from the head slide 600, thereby allowing the first panel to pivot about the pivot 606 and facilitate the pivot mode operation of the first panel. In the illustrated embodiments, the body 602 extends across all or substantially all of an entire width of the first panel 200, between and including the first stile 214 and the second stile 216, and includes seals such as 607 (FIG. 12) to provide an environmental seal between the adjacent edges of the top portion of the first panel and a bottom portion of the body.

Figure 12:
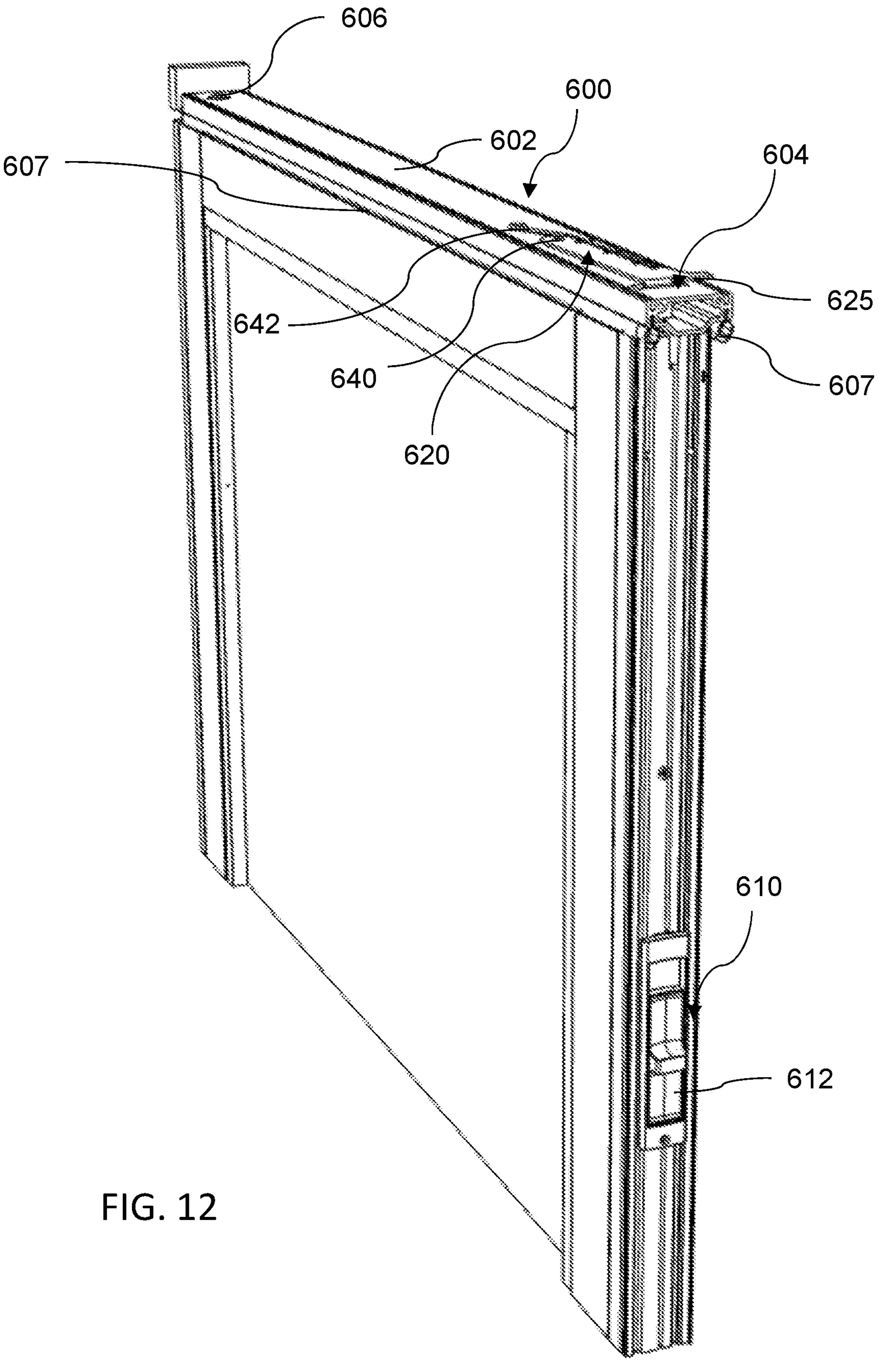
FIGS. 12-14 are perspective views of the top portion of the first panel, illustrating a latch and pivot of the head slide, and a latch actuator on the first panel, in accordance with embodiments.

Head slide 600, including latch 604 and pivot 606, and a latch actuator 610, can be described with reference to FIGS. 12-14, 15A and 15B. FIG. 12 is an illustration of the top portion of the first panel 200, and the head slide 600, showing the end edge of the first stile 214. As shown, in the illustrated embodiments the pivot 606 extends from the body 602 of the head slide 600 into the top portion of the second style 216 to pivotally couple the head slide to the first panel 200. The latch actuator 610 is shown at a location adjacent to the end edge of the first stile 214 in the illustrated embodiments, and includes a slide handle 612 that can be actuated by a user to latch and unlatch the latch 604.

Figure 13:
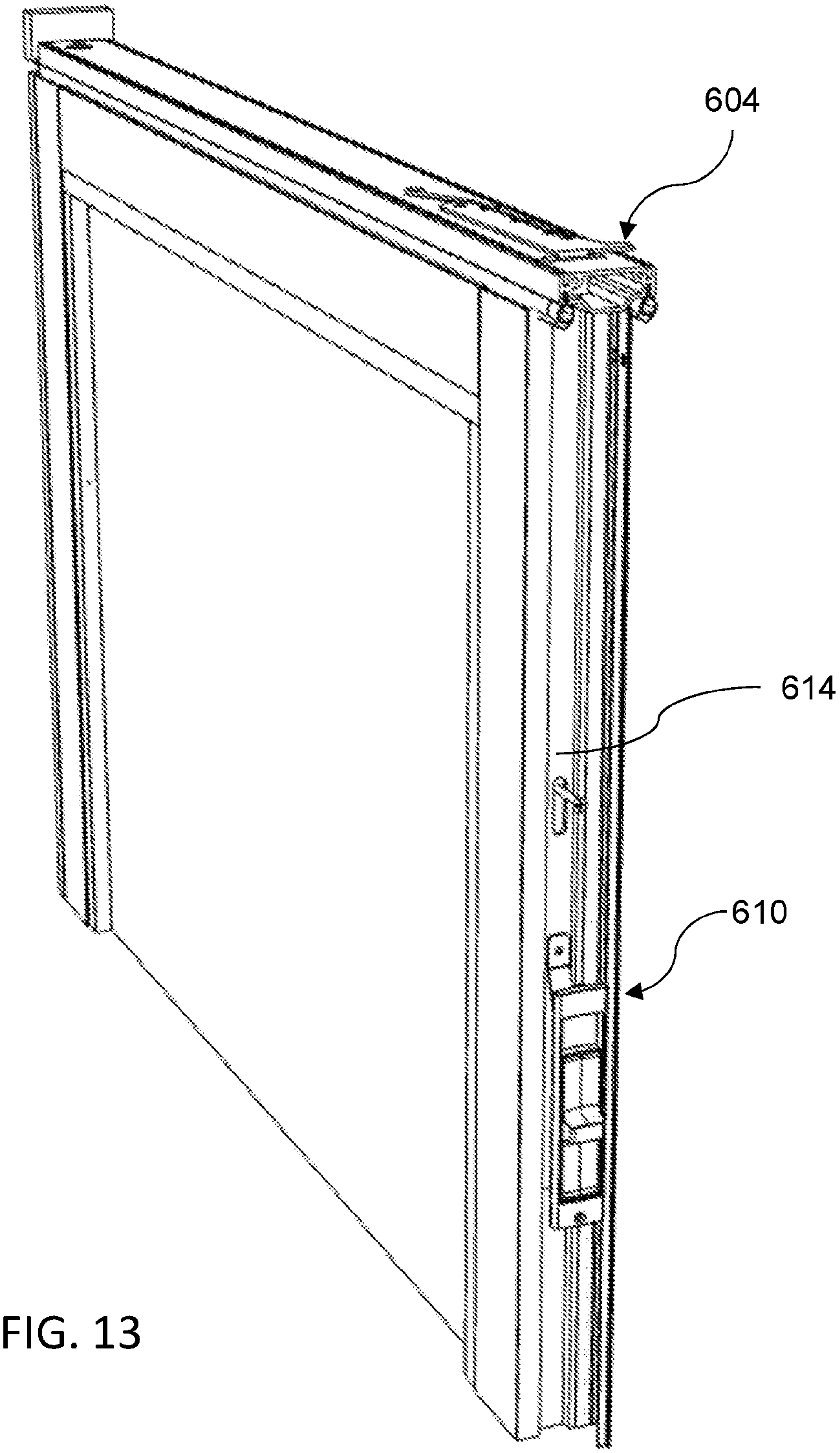
Figure 14:
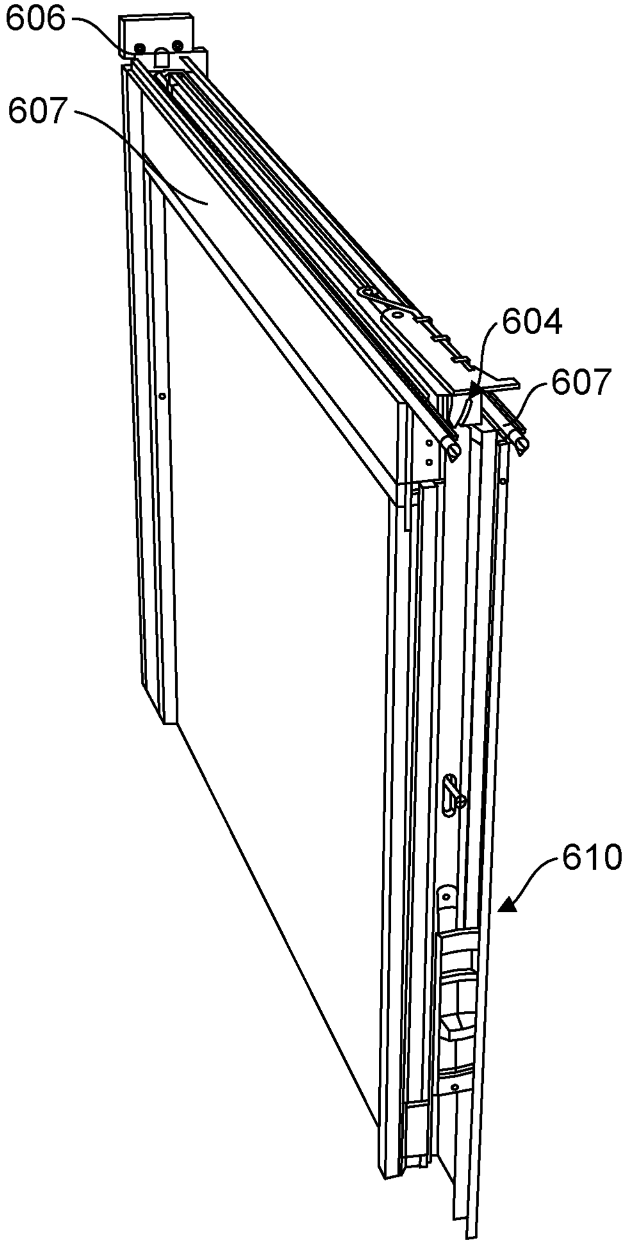

FIG. 13 is an illustration of the top portion of the first panel 200 and the head slide 600 as shown in FIG. 12, but with end edge portions of the first stile 214 removed to show a latch linkage 614 of the latch actuator 610 that couples the slide handle 612 to the latch 604. As shown, the latch linkage 614 is configured for reciprocal sliding motion on the first panel 200 in response to actuation of the slide handle 612 (e.g., in upwardly and downwardly directions in the illustrated embodiments). FIG. 14 is an illustration of the top portion of the first panel 200 as shown in FIG. 13, but with the body 602 of the head slide 600 removed to illustrate the manner by which the latch linkage 614 cooperates with the latch 604.

Figure 15A:
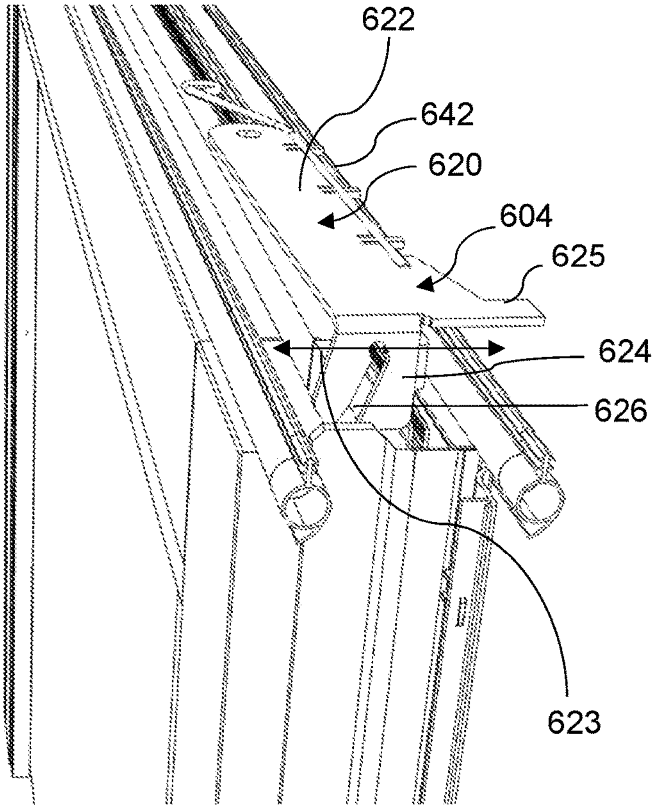
FIGS. 15A and 15B are detailed perspective illustrations of the latch and the latch actuator, in accordance with embodiments.
Figure 15B:
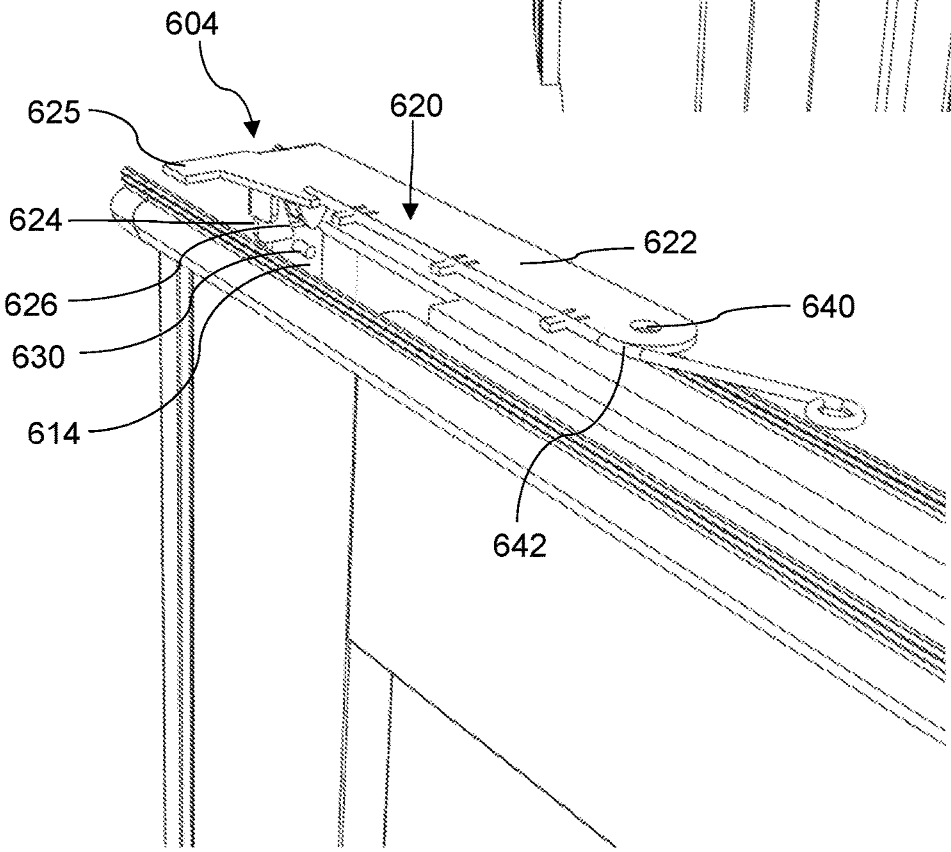

FIGS. 15A and 15B are detailed illustrations of the latch 604 and the latch linkage 614. In the illustrated embodiments, the latch 604 includes a catch 620 and a pin 630. Catch 620 includes a base member 622 and an engagement member 624 in the illustrated embodiments. The catch 620 is mounted to the body 602 of the head slide 600. In the illustrated embodiments the base member 622 is mounted to a top portion of the body 602 by a pivot 640 that extends in a direction between the top and bottom portions of the first panel 200. The base member 622 is thereby configured for rotational movement in a direction extending between the first and second opposite sides of the head slide 600 and first panel 200, as shown for example by line 623. The engagement member 624 extends downwardly in a direction parallel to an axis extending between the top and bottom portions of the head slide, and to a location adjacent a first end of the body 602 or adjacent to the first stile 214. In the illustrated embodiments the engagement member 624 extends in a generally perpendicular direction from the base member 622. The engagement member 624 is thereby configured to move in a direction such as that shown by line 623 between the first and second opposite sides of the head slide 600. As shown in FIG. 15B, the pin 630 is mounted to and extends from the latch linkage 614. Engagement member 624, which includes a slot 626 in the illustrated embodiments, extends to a position at which it can be engaged and disengaged by the pin 630.

The pin 630, which is driven by the latch linkage 614 in response to actuation of the slide handle 612, cooperates with the slot 626 to operate or move the latch 604, and actuate the latch between its latched and unlatched positions or configurations. Control over both the slide mode operation and the pivot mode operation of the first panel 200 are effectively controlled by the operation of the latch 604. In connection with the pivot mode operation control, when in the unlatched position shown in FIGS. 12-14, 15A and 15B, for example when the slide handle 612 is moved downwardly, the pin 630 is located below the engagement member 624 and the opening of the slot 626, disengaged from the catch 620. The first end portion of the first panel 200 is thereby released from head slide 600, facilitating operation of the first panel in its pivot mode. When the slide handle 612 is moved upwardly, the pin 630 is moved upwardly by the latch linkage 614 and into the slot 626 of the catch 620 to place the latch 604 in the latched position. The first end portion of the first panel 200 is thereby coupled to the head slide 600, inhibiting pivoting motion of the first panel and facilitating the slide mode operation of the first panel.

Figure 16:
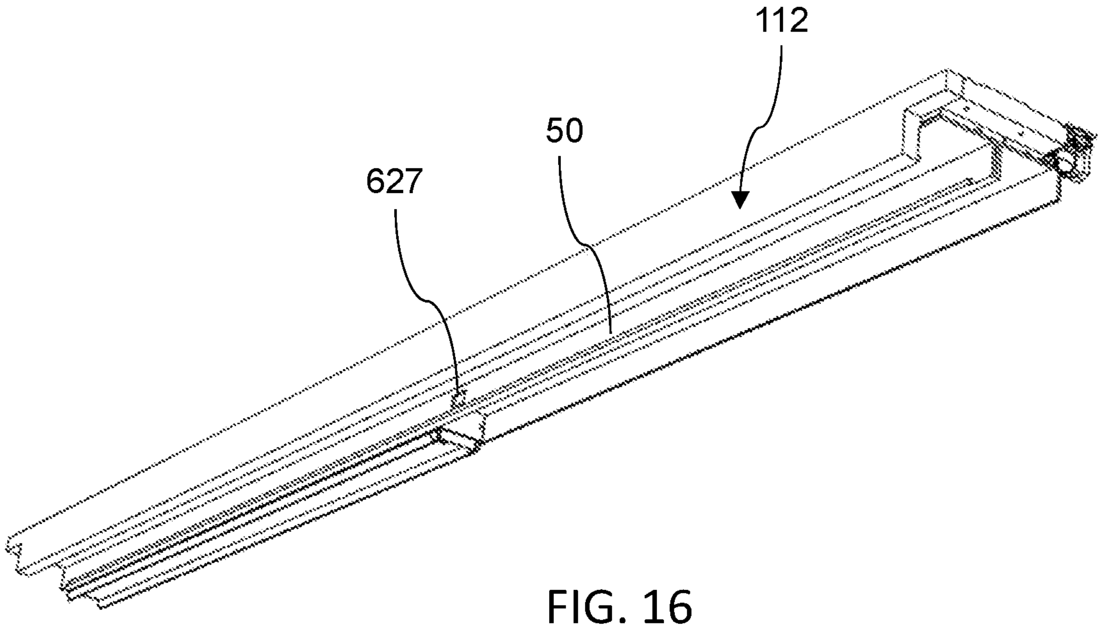
FIG. 16 is a perspective illustration of the guide track for the first panel on the head of the frame, illustrating portions that cooperate with the latch, in accordance with embodiments.

In connection with the slide mode operation control, the illustrated embodiments of the fenestration system 10 include a stop structure that inhibits the operation of the latch 604, e.g. the ability of the latch 604 to be unlatched, unless the first panel 200 is at its pivot ready position. The illustrated embodiments of the stop structure include a stop tab 625 on the catch 620 that cooperates with a stop recess 627 in the guide track 50 (shown in FIG. 16). The stop tab 625 extends from the catch 620, and in the illustrated embodiments extends from the base member 622. The catch 620 is pivotally coupled to the body 602 of the head slide 600 by the pivot 640. A biasing member such as spring 642 biases the catch 620 toward a stop position, which in the illustrated embodiments is a direction urging the catch to rotate about the pivot 640 away from the head slide 600 to a position where the stop tab 625 extends outwardly from the second side of the head slide toward the guide track 50. The slot 626 in the engagement member 624 includes portions that slope in a direction from the second side of the first panel 200 (e.g., the right side in FIG. 15A) toward the first side of the first panel (e.g., the left side in FIG. 15A) with increasing distance from the base member 622. Because of the slope of the slot 626 in the catch 620, the movement of the pin 630 into the slot when the latch 604 is being latched causes the catch to retract against the bias of the spring 642 to a retracted position.

The stop recess 627 is located in the guide track 50 at a position corresponding to the position of the stop tab 625 of the catch 620 when the first panel 200 is located at its pivot ready position. When the first panel 620 is at its pivot ready position and the slide handle 612 is actuated to move the latch to its unlatched position, the stop tab will enter the stop recess 627. However, if the first panel 200 is at other slide open positions, including slide open positions between the fully open position and the closed position, the stop tab 625 will engage the guide track 50 in response to attempts to unlatch the latch 604, thereby inhibiting movement of the catch 620 to its stop position and preventing the pin 630 from disengaging from the catch. The head slide 600 is thereby effectively locked into position with respect to the head 112 of the frame 100 when the first panel is located at the pivot ready position. Operation of the latch actuator 610 to configure the first panel 200 for pivot mode operation is also inhibited unless the first panel is at the pivot ready position. Other embodiments of the fenestration system 10 include other or additional structures (not shown) to provide the function of the stop structure described herein. For example, although the stop structure of the embodiments described herein operates effectively simultaneously with the latching functionality of the latch 604, in other embodiments the stop structure may be configured to operate separately from the latch.

Figure 17A:
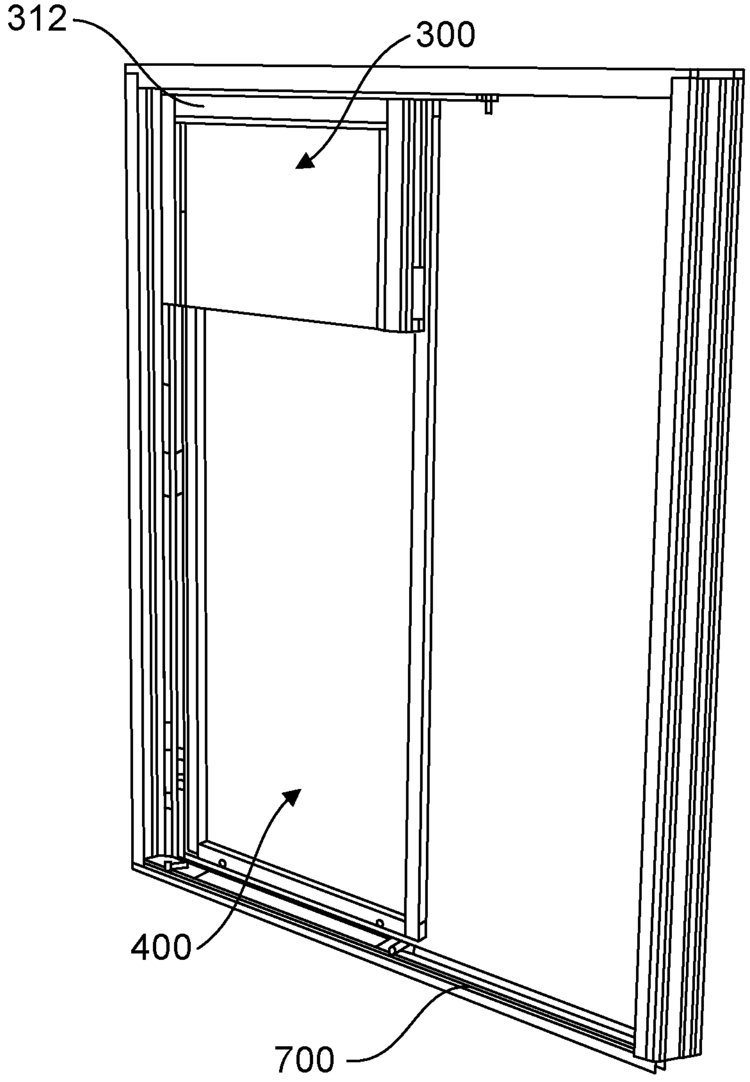
FIGS. 17A and 17B are perspective illustrations of the first and second sides of the frame and screen, including a top portion of the second panel.
Figure 17B:
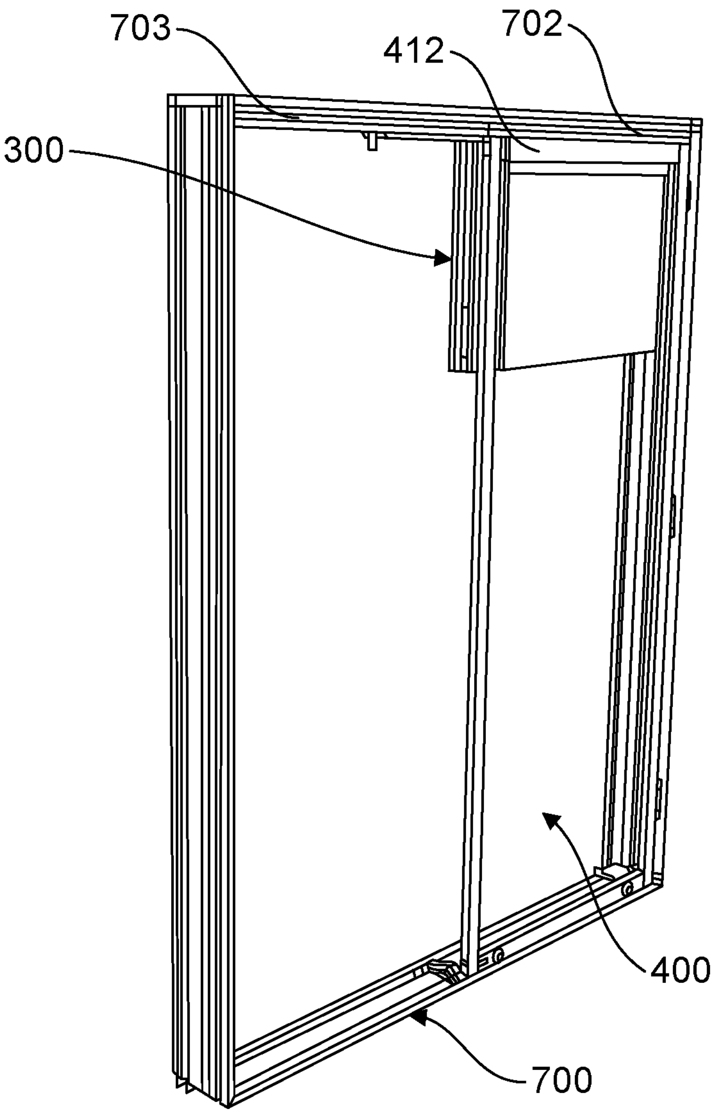

FIGS. 17A and 17B illustrate portions of the first and second sides of the fenestration system 10 including a screen carrier to support the screen 400 for operation in both its sliding mode and pivot mode. As described above, when in the sliding mode the screen 400 can slide between a slide closed position, a range of slide open positions, and a pivot ready position. When the screen 400 is in its slide closed position, it may extend across the first lateral portion of the frame 100 corresponding to the location of the first panel 200 when the first panel is in its slide closed position. When the screen 400 is in any of its slide open positions, the screen at least partially overlaps the second panel 300 when the second panel is in its closed position. When the screen 400 is in its pivot ready position (the position shown in FIGS. 17A and 17B), it extends over the second lateral portion of the frame 100 corresponding to the location of the second panel 300 when the second panel is in its closed position, and is engaged with or coupled to the second panel 300 and disengaged from the frame 100, thereby allowing the screen to move with the second panel when the second panel pivots or hinges between its open and closed positions. Frame 100, screen 400 and top portions of the second panel 300 are shown in FIGS. 17A and 17B, but other portions of the fenestration unit 10 are not shown for purposes of illustration of the screen carrier.

Figure 18:
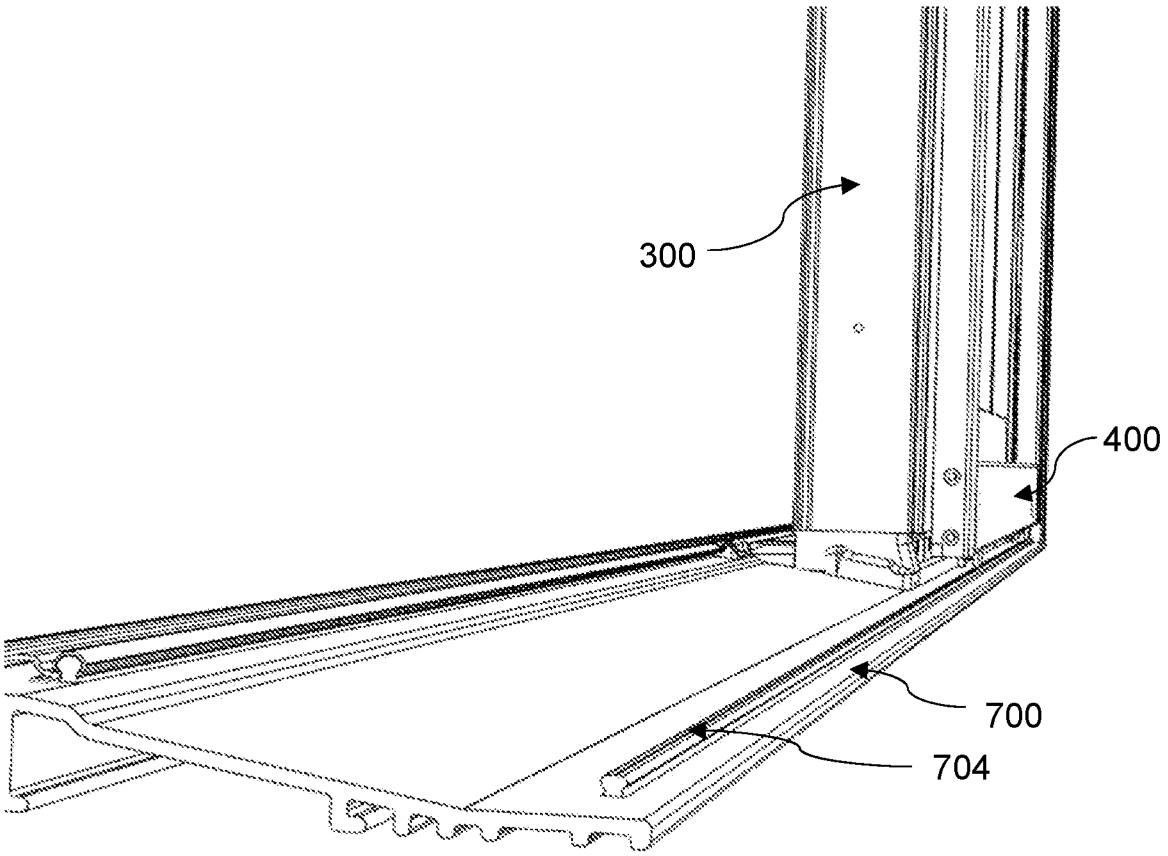
FIG. 18 is a perspective illustration of the sill and bottom portion of the screen and second panel, illustrating a first screen carrier section and guide track.

The illustrated embodiments of the screen carrier include a first carrier section 700 mounted to the frame 100, and a second carrier section 702 mounted to the second panel 300. In the illustrated embodiments, the first carrier section 700 is mounted to the sill 110 of the frame 100. Embodiments of the first carrier section 700 are shown in greater detail in FIG. 18, where the first carrier section 700 is shown extending over both the first lateral portion and the second lateral portion of the frame 100, and includes an elongated guide track 704 which is shown for example as a raised rail. In embodiments, the guide track 704 may be a member mounted to the sill 110. In other embodiments the sill 110 may be a molded or extruded member including the guide track 704 integrally formed therein.

Figure 19A:
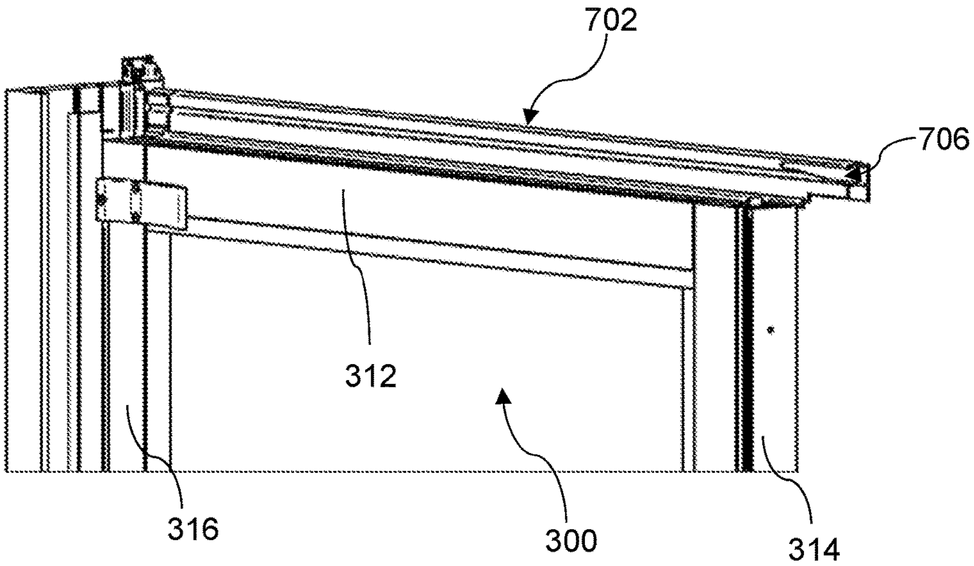
FIGS. 19A-19C are perspective illustrations of a top portion of the second panel, illustrating a second screen carrier section.
Figure 19B:
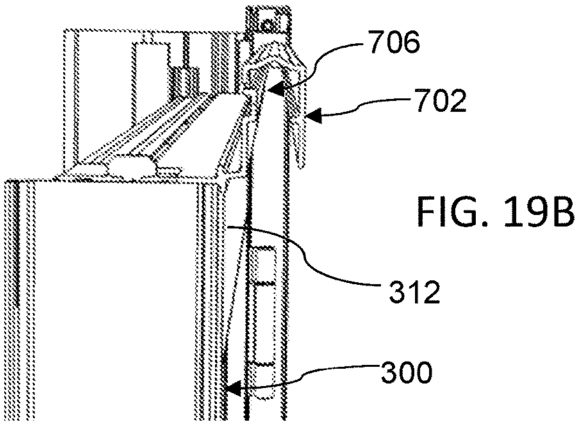
Figure 19C:
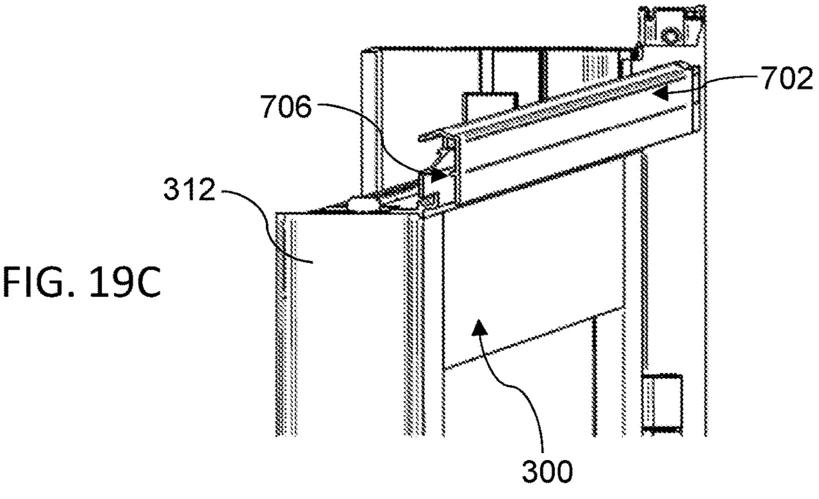

Referring back to FIGS. 17A and 17B, the second carrier section 702 is shown mounted to the top rail 312 of the second panel 300 in the illustrated embodiments. Embodiments of the second carrier section 702 are shown in greater detail in FIGS. 19A-19C, where the second carrier section 702 is shown extending over the second panel 300 between the first stile 314 and the second stile 316. The second carrier section 702 includes an elongated channel-type guide track 706 in the illustrated embodiments.

Figure 20A:
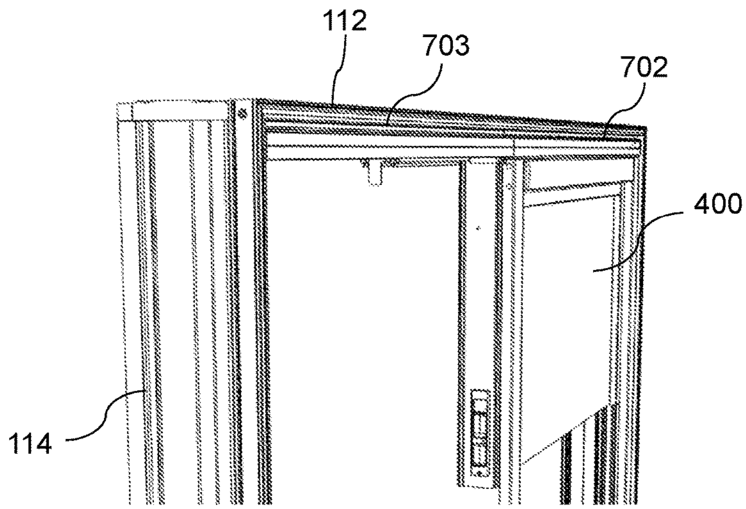
FIG. 20A is a perspective illustration of the second side of the frame, a top portion of the second panel, and a top portion of the screen.
Figure 20B:
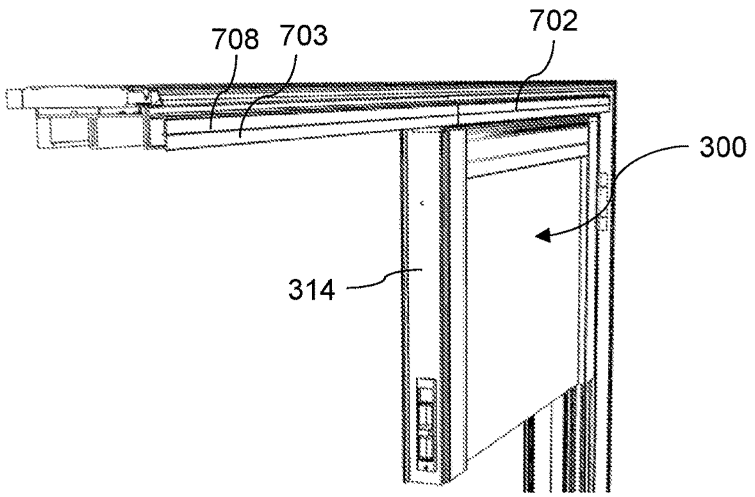
FIGS. 20B and 20C are perspective illustrations of the frame and top portion of the second panel as shown in FIG. 20A, but with the first jamb and screen removed.
Figure 20C:
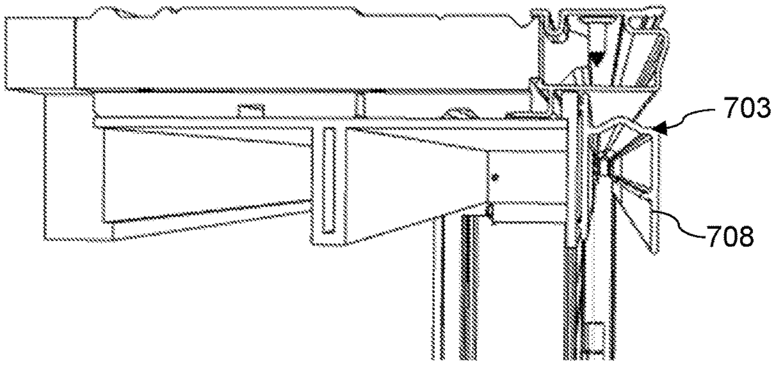

FIGS. 20A-20C illustrate top portions of the frame 100 and second panel 300. Top portions of the first jamb 114 and the screen 400 are also shown in FIG. 20A, but not in FIGS. 20B and 20C. As shown in FIGS. 17B and 20A-20C, embodiments of the screen carrier also include a third carrier section 703 that is mounted to the head 112 of the frame 100, and that extends over at least portions of the first lateral portion of the frame. The third carrier section 703 extends between the first jamb 114 of the frame 100, and a first end of the second carrier section 702 in the illustrated embodiments. The third carrier section 703 includes an elongated channel-type guide track 708 in the illustrated embodiments. When the second panel 300 is in its closed position, the first end of the second carrier section 702 and a second end of the third carrier section 703 are located adjacent to one another to facilitate the transition of the screen 400 between the second and third carrier sections during the slide mode operation of the screen. In the illustrated embodiments the second and third carrier sections 702 and 703 are colinear when the second panel 300 is in its closed position. When the second panel 300 is in its closed position, the channels defined by the guide tracks 706 and 708 are sufficiently aligned to facilitate transition of the screen 400 between the second and third carrier sections 702 and 703 during the slide mode operation of the screen. In the illustrated embodiments, the second carrier section 702 has a length that extends over the second panel 300, and over a portion of the first lateral portion of the frame 100. The third carrier section 703 extends over only a portion of the first lateral portion of the frame 100 in these embodiments. In other embodiments, the second carrier section 702 and third carrier section 703 have other lengths. For example, in such other embodiments the second carrier section 702 may extend over all or portions of the head 312 of the third panel 300, and the third carrier section 703 may extend over all or portions of the first lateral portion of the frame 100.

Figure 21A:
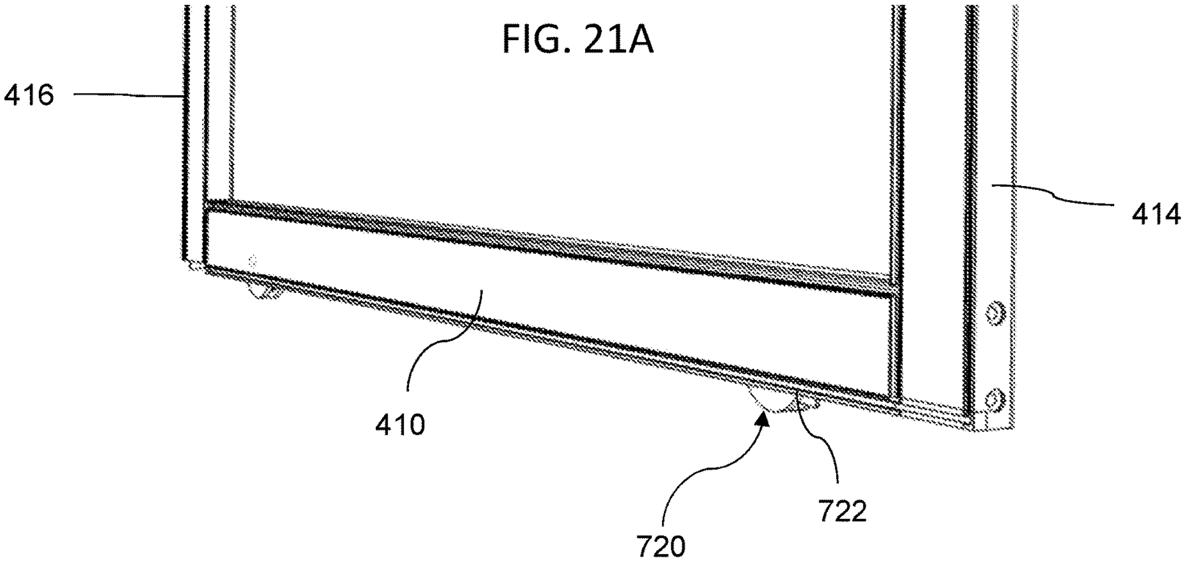
FIGS. 21A and 21B are detailed perspective illustrations of the first and second sides of the bottom portion of the screen, showing riders on the bottom portion of the screen.
Figure 21B:
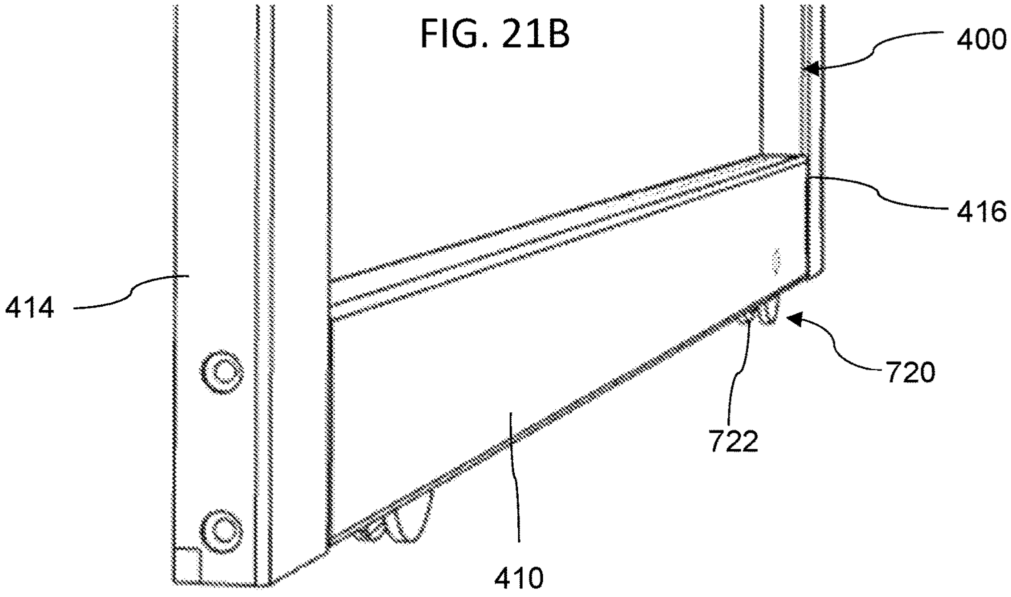

FIGS. 21A and 21B illustrate the first and second ends of the bottom portion of the screen 400. As shown, the screen 400 includes a plurality of riders 720 (two are shown for purposes of example) that are configured to engage and slide on the sill 110 of the frame 100 while being guided by the first carrier section 700. In the illustrated embodiments, the riders 720 include wheels 722 that are rotatably mounted to the bottom rail 410 of the screen 400, and positioned to engage and roll on the guide track 704 during the slide mode operation of the screen 400. Riders 720 can include additional or alternative structures in other embodiments (not shown).

Figure 22A:
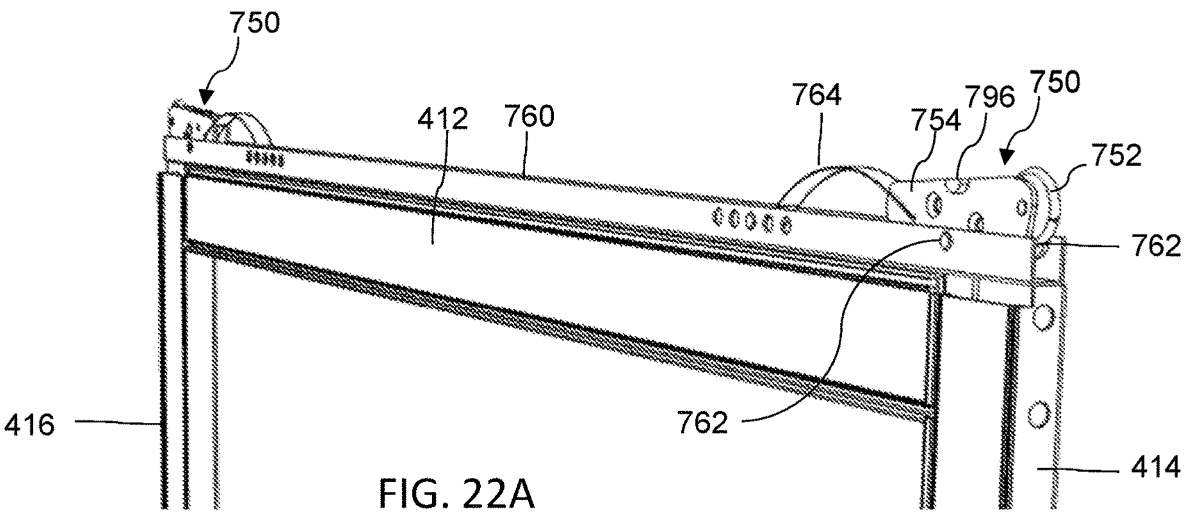
FIGS. 22A and 22B are detailed perspective illustrations of the first and second sides of the top portion of the screen, showing riders on the top portion of the screen.
Figure 22B:
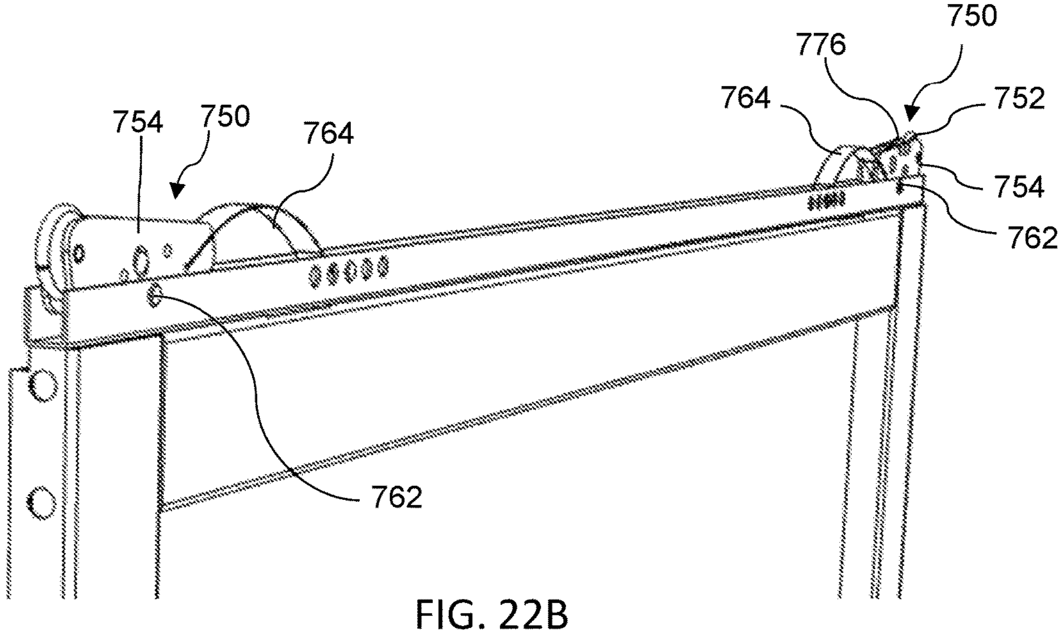

FIGS. 22A and 22B illustrate the first and second sides of the top portion of the screen 400. The illustrated embodiments of screen 400 include two riders 750 that are configured to engage and slide with respect to the head 112 of the frame 100, while being guided by the second carrier section 702 and the third carrier section 703. In the illustrated embodiments, each of the riders 750 is an assembly that includes a wheel 752 rotatably mounted to a frame 754. The riders 750 are pivotally mounted to the top rail 412 of the screen 400 in embodiments. In the illustrated embodiments, for example, a bracket 760 is mounted to the top portion of the screen 400 (e.g., the top rail 412 and/or top portions of the stiles 414 and 416), and the frames 754 of the riders 750 are pivotally mounted to the bracket 760 by pivots 762. A spring 764 associated with each of the riders 750 extends between the bracket 760 to an end of the frame 754 opposite the pivot 762 from the wheel 752. The springs 764 bias the riders 750 in a direction that urges the wheels 752 upwardly (e.g., in a direction away from the top portion of the screen 400) into engagement with the second and third carrier sections 702 and 703. When the screen 400 is mounted to the first, second and third carrier sections 700, 702 and 703, the riders 750 are therefore biased in a directions that forces the screen downwardly toward the first carrier section 700 to help keep the riders 720 on the bottom portion of the screen engaged with the guide track 704 of the first carrier section 700.

Figure 23A:
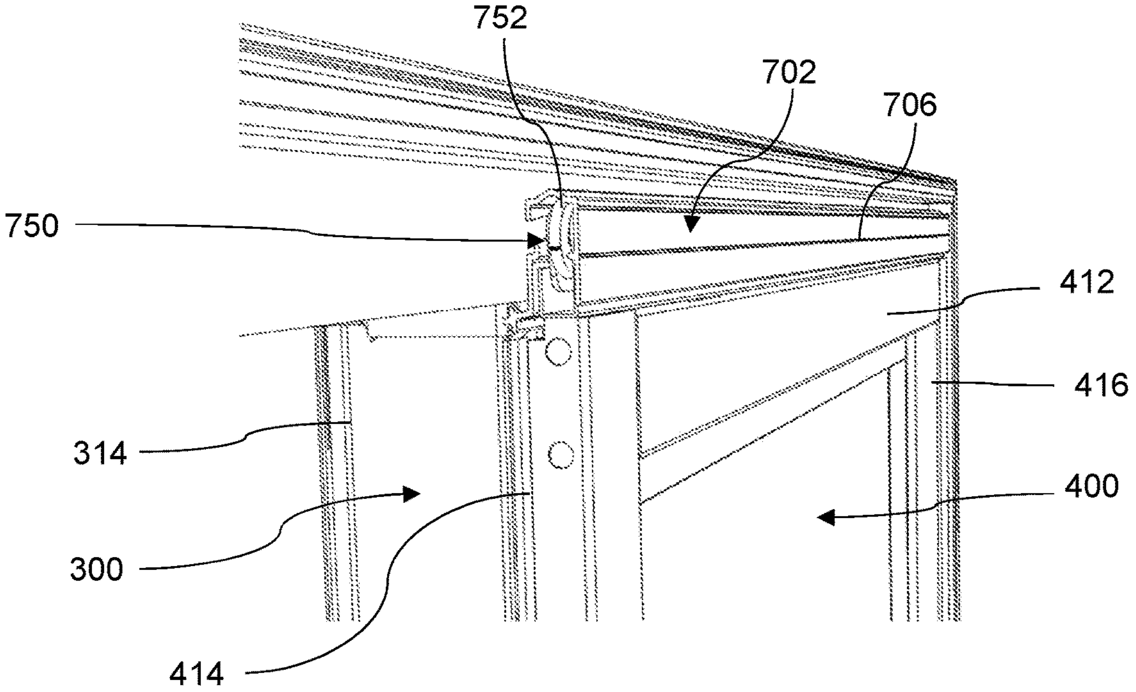
FIGS. 23A and 23B are detailed perspective illustrations of the top and bottom portions, respectively, of the screen and second panel, illustrating the second panel and screen in their pivot ready positions.
Figure 23B:
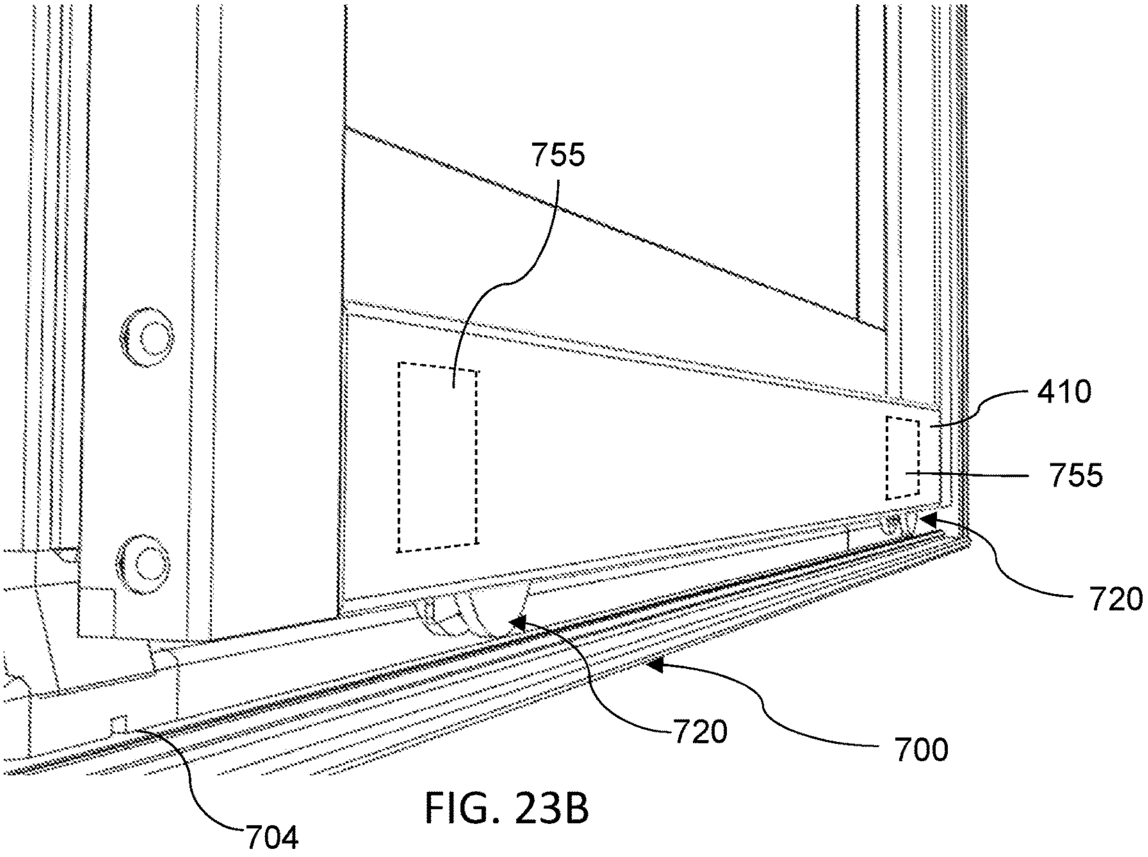

FIG. 23A illustrates the screen 400 in its pivot ready position engaged with the second panel 300, showing the rider 750 adjacent the first stile 414 supported in the guide track 706 of the second carrier section 702. Although not visible in FIG. 23A, the rider 750 adjacent the second stile 416 of the screen 400 is similarly supported in the guide track 706 of the second carrier section 702. FIG. 23B illustrates the bottom portion of the screen 400 in its pivot ready position. The riders 720, including the wheels 722, are disengaged from the sill 110 and guide track 704 when the screen 400 is in the pivot ready position shown in FIGS. 23A and 23B.

During the slide mode operation of the screen 400 at and between its slide closed position and the slide open positions (e.g., before the screen is slid to the pivot ready position shown in FIGS. 17A, 17B, 23A and 23B), the riders 720 on the bottom portion of the screen, including the wheels 722, are engaged with the first carrier section 700 and guide track 704 on the sill 110. The bottom portion of the screen 400 is therefore supported and guided by the first carrier section 700 during its slide mode operation at and between its slide closed position and its slide open positions. Similarly, during the slide mode operation of the screen 400 at and between its slide closed position and its slide open positions, the riders 750 on the top portion of the screen, including the wheels 752, are engaged with the second and/or third carrier sections 702 and 703. The riders 750 transition between the second carrier section 702 and the third carrier section 703 as the screen 400 slides between its slide open positions and its slide closed positions during the slide mode operation. In embodiments, both of the riders 750 on the top portion of the screen 400 may be engaged with the third carrier section 703, and thereby slidably engaged with the head 112 of the frame 100, when the screen 400 is at its closed position. When the screen 400 is at its pivot ready position, both of the riders 750 on the top portion of the screen 400 may be engaged with the second carrier section 702.

Figure 24A:
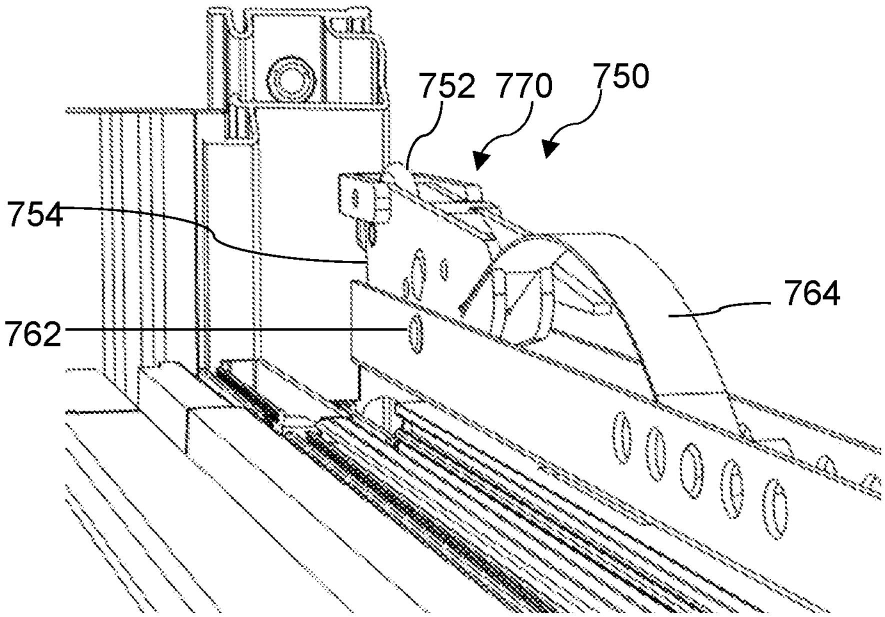
FIGS. 24A and 24B are detailed perspective illustrations of the first and second sides of a rider on a second end and top portion of the screen, and an associated disengagement structure.
Figure 24B:
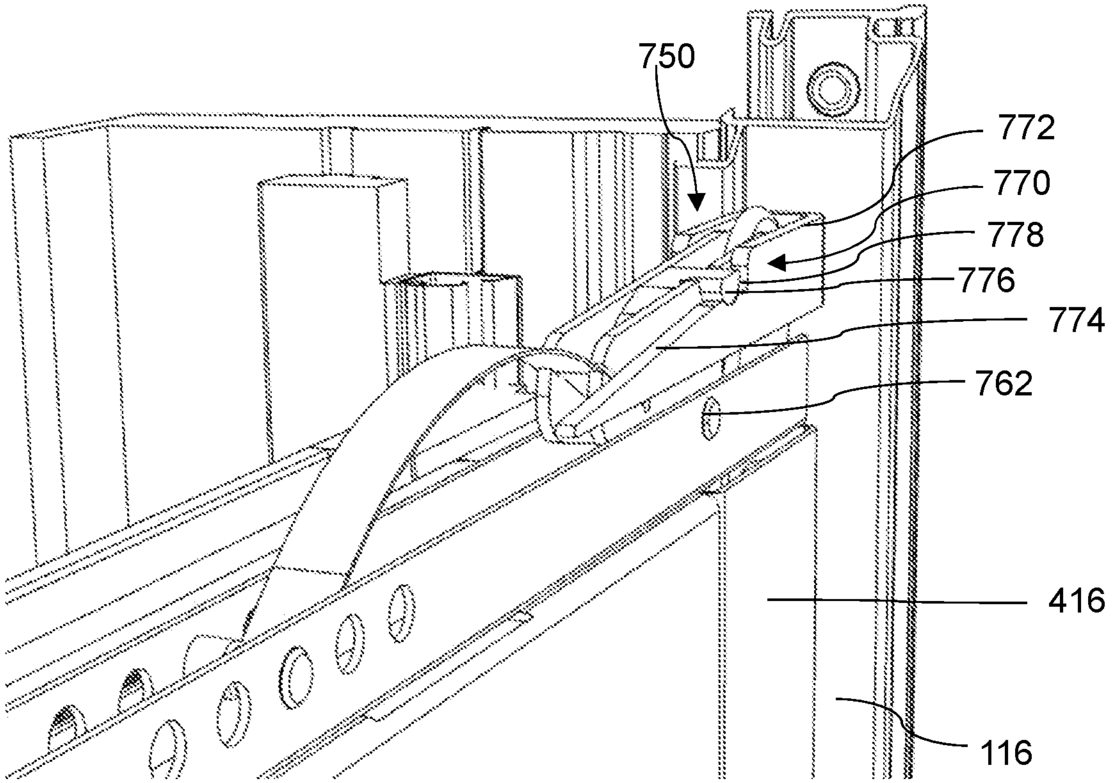

The screen carrier includes one or more disengagement structures that cause the bottom portion of the screen 400 to disengage from the first carrier section 700 and the sill 110 of the frame 100 when the screen 400 is in its pivot ready position. FIGS. 24A and 24B illustrate the first and second sides of a disengagement structure 770 that cooperates with the associated rider 750 on the second end of the top portion of the screen 400 (e.g., the side adjacent the second stile 416) to lift the second end of the screen 400 when the screen transitions to the pivot ready position during the slide mode operation, and to thereby lift and disengage the rider 720 on the second end of the bottom portion of the screen from the first carrier portion 700. As shown, the disengagement structure 770 includes a bracket 772 that defines a sloping lift or cam surface 774 on its second side. The associated rider 750 includes a lift or cam follower 776 extending from the second side of the rider 750 to cooperate with the disengagement structure 770 in the illustrated embodiments. The bracket 772 is mounted with respect to or in the second carrier section 702 (not shown in FIGS. 24A-24B), at locations where the cam follower 776 will engage the cam surface 774 as the screen 400 approaches the end of it range of travel and its pivot ready position during its slide mode operation. The cam surface 774 slopes upwardly and in a direction away from the sill 110 of the frame 100, with increasing distance toward the second jamb 116 of the frame 100, and includes a recess or detent 778 at its end. As the screen 400 slides toward its pivot ready position, the cam follower 776 on the associated rider 750 engages and slides on the cam surface 774 until the cam follower engages the detent 778. The cam follower 776 will be located in the detent 778 when the screen 400 is in its pivot ready position. As the associated rider 750 slides along the cam surface 774 of the bracket 772, its wheel 752 will continue to engage the second carrier section 702 (not shown in FIGS. 24A and 24B), and the frame 754 will rotate about the pivot 762 against the bias force of the spring 764. Although disengagement structure 770 includes a cam surface 774 on the bracket 772 in the illustrated embodiments, other embodiments include other or additional structures to provide the functionality of the disengagement structure, such as for example a cam surface incorporated into a side wall on the second side of the second carrier section 702.

Figure 25:
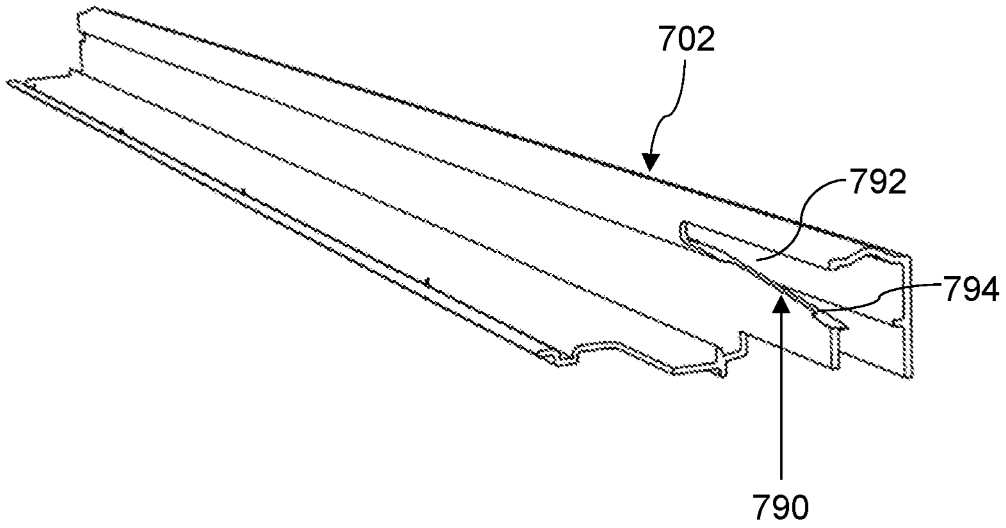
FIG. 25 is a detailed perspective illustration of the second carrier section, showing a disengagement structure.

FIG. 25 illustrates a disengagement structure 790 that cooperates with the associated rider 750 on the first end (e.g., the end adjacent to the first stile 414) and top portion of the screen 400 (shown in FIGS. 22A and 22B) to lift the first end of the screen 400 when the screen transitions to the pivot ready position during the slide mode operation, and to thereby lift and disengage the rider 720 on the first end of the bottom portion of the screen (shown in FIGS. 21A and 21B) from the first carrier portion 700 and sill 110 of the frame 100. As shown, the illustrated embodiments of the disengagement structure 790 are formed in a first side wall of the second carrier section 702, and includes a slot 792 that defines a sloping lift or cam surface 794. The associated rider 750 includes a lift or cam follower 796 (e.g., as shown in FIG. 22A) extending from the first side of the rider 750 to cooperate with the disengagement structure 790 in the illustrated embodiments. Although shown as being incorporated into the second carrier section 702 in the illustrated embodiments, the disengagement structure 790 may be formed as a separate structure, such as for example the disengagement structure 770 that is mounted to the second carrier section. The disengagement structure 790 is positioned at locations where the cam follower 796 of the associated rider 750 will engage the cam surface 794 as the screen 400 approaches the end of it range of travel and its pivot ready position during its slide mode operation. The cam surface 794 slopes upwardly and away, in a direction away from the sill 110 of the frame 100, with increasing distance toward the second end of the screen 400. As the screen slides toward its pivot ready position, the cam follower 796 of the associated rider 750 will engage and slide on the cam surface 794. As the associated rider 750 slides along the cam surface 794, its wheel 752 will continue to engage the second carrier section 702, and the frame 754 will rotate about the pivot 762 against the bias force of the spring 764. In embodiments, the second carrier section 702 has a length that extends beyond the first stile 314 of the second panel 300 to facilitate a relatively gradual slope of the cam surface 794 and a smooth transition of the screen 400 between its side mode and pivot ready positions.

FIG. 23B illustrates one or more magnetic structures 755 on the bottom portion of the screen 400 (two are shown on the bottom rail 410 in the illustrated embodiments) that cooperate with other complimentary magnetic structures (not shown) on the bottom portion of the second panel 300 to releasably retain the bottom portion of the screen on the second panel when the screen is at its pivot ready position (e.g., when the riders 720 are disengaged from the sill 110 of the frame 100. The magnetic structures 755 thereby hold the bottom portion of the screen 400 against the second panel 300 when the second panel, and the screen attached thereto, are moved to their pivot open positions. Other embodiments (not shown) include additional or alternative, or no, structures to releasably retain the bottom portion of the screen 400 to the second panel 300 during the pivot mode operation of the second panel and screen.

Various modifications and additions can be made to the exemplary embodiments described herein without departing from the spirit and scope of this disclosure. For example, while the embodiments described above refer to particular features, the scope of this disclosure also includes embodiments having different combinations of features and embodiments that do not include all of the described features. Accordingly, the scope of this disclosure is intended to embrace all such alternative, modifications, and variations as fall within the scope pf the claims, together with all equivalents thereof.

What is claimed is:

1. A fenestration unit, comprising:

a frame including a sill, a head opposite the sill, a first jamb and a second jamb opposite the first jamb;

a first panel supported by the frame; and a slide assembly coupling the first panel to the frame and to facilitate slide mode operation and pivot mode operation of the first panel, wherein during the slide mode operation the first panel can slide within the frame between the first and second jambs when the first panel is in a slide position generally parallel to the frame plane, and during the pivot mode operation the first panel can pivot outwardly beyond the frame plane, and wherein the slide assembly is configured to slide the first panel between a slide closed position, a slide open position, and a pivot ready position beyond the slide open position from the slide closed position, the slide assembly including:

a slide body configured for sliding motion between the first and second jambs during the slide mode operation;

a pivot rotatably coupling a second end portion of the first panel to a second end portion of the slide body; and a latch releasably coupling the first end portion of the first panel to a first end portion of the slide body, and operable between a latched position and an unlatched position, wherein when the latch is in the latched position the latch couples the first panel to the slide body to facilitate the slide mode operation of the first panel, and wherein when the latch is in the unlatched position the latch releases the first panel from the slide body to facilitate the pivot mode operation of the first panel, and wherein the latch includes a stop that inhibits actuation of the latch to the unlatched position unless the first panel is at the pivot ready position; and a latch actuator coupled to the latch and operable by a user to cause the latch to move between the latched position and the unlatched position.

2. The fenestration unit of claim 1, wherein the latch actuator is located on the first panel.

3. The fenestration unit of claim 1, wherein:

the frame includes a slide assembly guide track, and wherein the slide body of the slide assembly is slidably mounted in the slide assembly guide track; and the slide assembly guide track includes a structure configured to cooperate with the stop of the latch when the first panel is at the pivot ready position to enable the actuation of the latch to the unlatched position.

4. The fenestration unit of claim 3, wherein the guide track includes a structure configured to cooperate with the stop of the latch when the first panel is at and between its slide closed position and its slide open position, to inhibit the actuation of the latch to the unlatched position.

5. The fenestration unit of claim 1, wherein the frame includes a slide assembly guide track, and wherein the slide body of the slide assembly is slidably mounted in the slide assembly guide track.

6. The fenestration unit of claim 5, wherein:

the slide assembly guide track is on the head of the frame, and the slide assembly couples a top portion of the first panel to the head of the frame.

7. The fenestration unit of claim 1, wherein:

the first panel is defined by first and second opposite ends; and the slide body extends an entire distance between the first and second opposite ends of the first panel.

8. The fenestration unit of claim 1, wherein the latch comprises:

a catch movably mounted to the first panel; and a pin that is actuated by the latch actuator to releasably engage the catch.

9. The fenestration unit of claim 8, wherein movement of the pin causes the latch to move between the latched position and the unlatched position.

10. The fenestration unit of claim 9, wherein the catch comprises:

a base member; and an engagement member extending from the base member, wherein the engagement member includes a slot that can be engaged and disengaged by the pin.

11. The fenestration unit of claim 10, wherein:

the base member is pivotally mounted to the first panel for rotational movement about a pivot axis extending in a direction between a top portion and a bottom portion of the first panel; and the engagement member extends in a generally perpendicular direction from the base member.

12. The fenestration unit of claim 11, wherein:

the base member is pivotally mounted to one of a top portion or a bottom portion of the first panel; and the engagement member extends in a direction generally parallel to an end edge of the first panel.

13. The fenestration unit of claim 12, wherein the stop is on the base member.

14. The fenestration unit of claim 13, wherein:

the frame includes a slide assembly guide track, and wherein the slide body of the slide assembly is slidably mounted in the slide assembly guide track; and the slide assembly guide track includes a structure configured to cooperate with the stop on the base member when the first panel is at the pivot ready position to enable the actuation of the latch to the unlatched position.

15. The fenestration unit of claim 14, wherein the guide track includes a structure configured to cooperate with the stop on the base member when the first panel is at and between its slide closed position and its slide open position, to inhibit the actuation of the latch to the unlatched position.

16. The fenestration unit of claim 14, wherein the slot of the engagement member slopes to inhibit the actuation of the latch to the unlatched position when the first panel is at and between its slide closed and slide open positions.

17. The fenestration unit of claim 1, further comprising:

a second panel supported by the frame to facilitate hinge mode operation of the second panel, wherein during the hinge mode operation the second panel can pivot between a closed position generally parallel to the frame plane and an open position beyond the frame plane; and one or more stop members configured to prevent the first panel from sliding from the slide open position to the pivot ready position during the slide mode operation when the second panel is in its closed position.

18. A fenestration unit, comprising:

a frame defining a frame plane and including a sill, a head opposite the sill, a first jamb and a second jamb opposite the first jamb;

a first panel supported by the frame; and a locking pivot rider assembly coupling one of a top or bottom portion of the first panel to the frame and to facilitate slide mode operation and pivot mode operation of the first panel, wherein during the slide mode operation the first panel is in a slide position generally parallel to the frame plane and can slide within the frame between the first and second jambs, and during the pivot mode operation the first panel can pivot outwardly to a pivot open position beyond the frame plane, the locking pivot rider assembly including:

a rider coupling the first panel to the frame for the slide mode operation;

a pivot rotatably coupling the first panel to the rider for the pivot mode operation; and a lock coupled to the rider and the pivot, to releasably lock the rider with respect to the frame, wherein rotation of the pivot during the pivot mode operation of the first panel from the slide position to the pivot open position actuates the lock and causes the lock to inhibit sliding movement of the rider on the frame, and wherein rotation of the pivot during the pivot mode operation of the first panel from the pivot open position to the slide position releases the lock to allow sliding movement of the rider on the frame; and a slide assembly coupling the other of the top or bottom of the first panel to the frame and to facilitate the slide mode operation and the pivot mode operation of the first panel, the slide assembly including:

a slide body configured for sliding motion between the first and second jambs during the slide mode operation;

a pivot rotatably coupling a second end portion of the first panel to a second end portion of the slide body; and a latch releasably coupling a first end portion of the first panel to a first end portion of the slide body, and operable between a latched position and an unlatched position, wherein when the latch is in the latched position the latch couples the first panel to the slide body to facilitate the slide mode operation of the first panel, and wherein when the latch is in the unlatched position the latch releases the first panel from the slide body to facilitate the pivot mode operation of the first panel; and a latch actuator coupled to the latch and operable by a user to cause the latch to move between the latched position and the unlatched position.

19. The fenestration unit of claim 18, wherein:

the slide assembly is configured to slide the first panel between a slide closed position, a slide open position, and a pivot ready position beyond the slide open position from the slide closed position; and the latch further includes a stop that inhibits actuation of the latch to the unlatched position unless the first panel is at the pivot ready position.

20. The fenestration unit of claim 19, wherein:

the frame includes a slide assembly guide track, and wherein the slide body of the slide assembly is slidably mounted in the slide assembly guide track; and the slide assembly guide track includes a structure configured to cooperate with the stop of the latch when the first panel is at the pivot ready position to enable the actuation of the latch to the unlatched position.

21. The fenestration unit of claim 20, wherein the guide track includes a structure configured to cooperate with the stop of the latch when the first panel is at and between its slide closed position and its slide open position, to inhibit the actuation of the latch to the unlatched position.

22. The fenestration unit of claim 19, wherein:

when the first panel is in the slide closed position and the second panel is in the closed position, the first panel and the second panel are parallel with one another, and when the first panel is in the slide open position and the second panel is in the closed position, the first and second panels are parallel with one another and the first panel is at a lateral position that at least partially overlaps the second panel; and the one or more stop members comprises a bumper coupled to the second panel.

* * * * *